US008319989B2

(12) United States Patent
Mizunashi et al.

(10) Patent No.: US 8,319,989 B2
(45) Date of Patent: Nov. 27, 2012

(54) IMAGE PROCESSING APPARATUS FOR PROCESSING AND COMMUNICATING WITH AN INFORMATION PROCESSING APPARATUS WHICH DOES NOT HAVE AN IMAGE PROCESSING APPARATUS DRIVER SOFTWARE

(75) Inventors: Yohko Mizunashi, Kanagawa (JP); Katsumi Watai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1283 days.

(21) Appl. No.: 11/677,316

(22) Filed: Feb. 21, 2007

(65) Prior Publication Data

US 2007/0206088 A1 Sep. 6, 2007

(30) Foreign Application Priority Data

Feb. 21, 2006 (JP) .................. 2006-043576
Dec. 15, 2006 (JP) .................. 2006-339061
Dec. 15, 2006 (JP) .................. 2006-339062

(51) Int. Cl.
*G06F 3/12* (2006.01)
(52) U.S. Cl. ............. 358/1.15; 709/203; 709/246
(58) Field of Classification Search ......... 358/1.1–1.18
See application file for complete search history.

(56) References Cited

U.S. PATENT DOCUMENTS

| 2004/0109188 A1* | 6/2004 | Akiyoshi et al. ............. 358/1.13 |
| 2004/0145766 A1* | 7/2004 | Sugishita et al. ............ 358/1.13 |
| 2006/0164542 A1* | 7/2006 | Kondo .......................... 348/383 |
| 2006/0221357 A1* | 10/2006 | Uzawa ............................ 358/1.1 |

FOREIGN PATENT DOCUMENTS

| JP | 5-346941 | 12/1993 |
| JP | 9-106307 | 4/1997 |
| JP | 9-149397 | 6/1997 |
| JP | 9-319555 | 12/1997 |
| JP | 2000-40089 | 2/2000 |
| JP | 2000-268024 | 9/2000 |
| JP | 2000-339088 | 12/2000 |
| JP | 2001-285562 | 10/2001 |
| JP | 2001-286641 | 10/2001 |
| JP | 2001-286647 | 10/2001 |
| JP | 2002-91419 | 3/2002 |
| JP | 2002-157247 | 5/2002 |
| JP | 2002-259636 | 9/2002 |

(Continued)

OTHER PUBLICATIONS

Office Action issued Mar. 29, 2011, in Japanese Patent Application No. 2006-339062.

(Continued)

*Primary Examiner* — Benny Q Tieu
*Assistant Examiner* — Marcellus Augustin
(74) *Attorney, Agent, or Firm* — Oblon, Spivak, McClelland, Maier & Neustadt, L.L.P.

(57) ABSTRACT

A destination storing unit stores therein application destination information that contains an application display name that is a display name of a destination of an application of an information processing apparatus. The information processing apparatus is connected to a network and is capable of executing the application and an operating system that has a function of making a request for registration of the application to the image processing apparatus, to operate the image processing apparatus without installing a driver software for the image processing apparatus and to receive data generated by the image processing apparatus.

20 Claims, 68 Drawing Sheets

FOREIGN PATENT DOCUMENTS

| | | |
|---|---|---|
| JP | 2003-167696 | 6/2003 |
| JP | 2003-296275 | 10/2003 |
| JP | 3529130 | 3/2004 |
| JP | 2004-135300 | 4/2004 |
| JP | 2004-213397 | 7/2004 |
| JP | 2004-214854 | 7/2004 |
| JP | 2005-24411 | 1/2005 |
| JP | 2005-38268 | 2/2005 |
| JP | 2005-94358 | 4/2005 |
| JP | 2005-316852 | 11/2005 |
| JP | 2005-322170 | 11/2005 |
| JP | 2006-5889 | 1/2006 |

OTHER PUBLICATIONS

Japanese Office Action issued Jul. 10, 2012 in Patent Application No. 2006-339062.

Japanese Office Action issued Nov. 29, 2011, in Patent Application No. 2006-339062.

\* cited by examiner

FIG.2

| APPLICATION ID | APPLICATION DISPLAY NAME |
|---|---|

... | APPLICATION ID | APPLICATION DISPLAY NAME | APPARATUS ID |

| APPLICATION ID | APPLICATION DISPLAY NAME | APPARATUS ID | EXPIRATION DATE |
|---|---|---|---|
| WP001 | DOCUMENT SOFTWARE | X0001 | 2006/2/28 |
| EX001 | SPREADSHEET SOFTWARE | X0001 | 2006/2/28 |
| VW01 | DOCUMENT VIEWER | X0001 | 2006/2/28 |
| WP001 | DOCUMENT SOFTWARE | Y0002 | 2006/3/10 |
| IM002 | IMAGE EDITING SOFTWARE | Y0002 | 2006/3/10 |
| VS002 | PLOT SOFTWARE | Y0002 | 2006/3/10 |

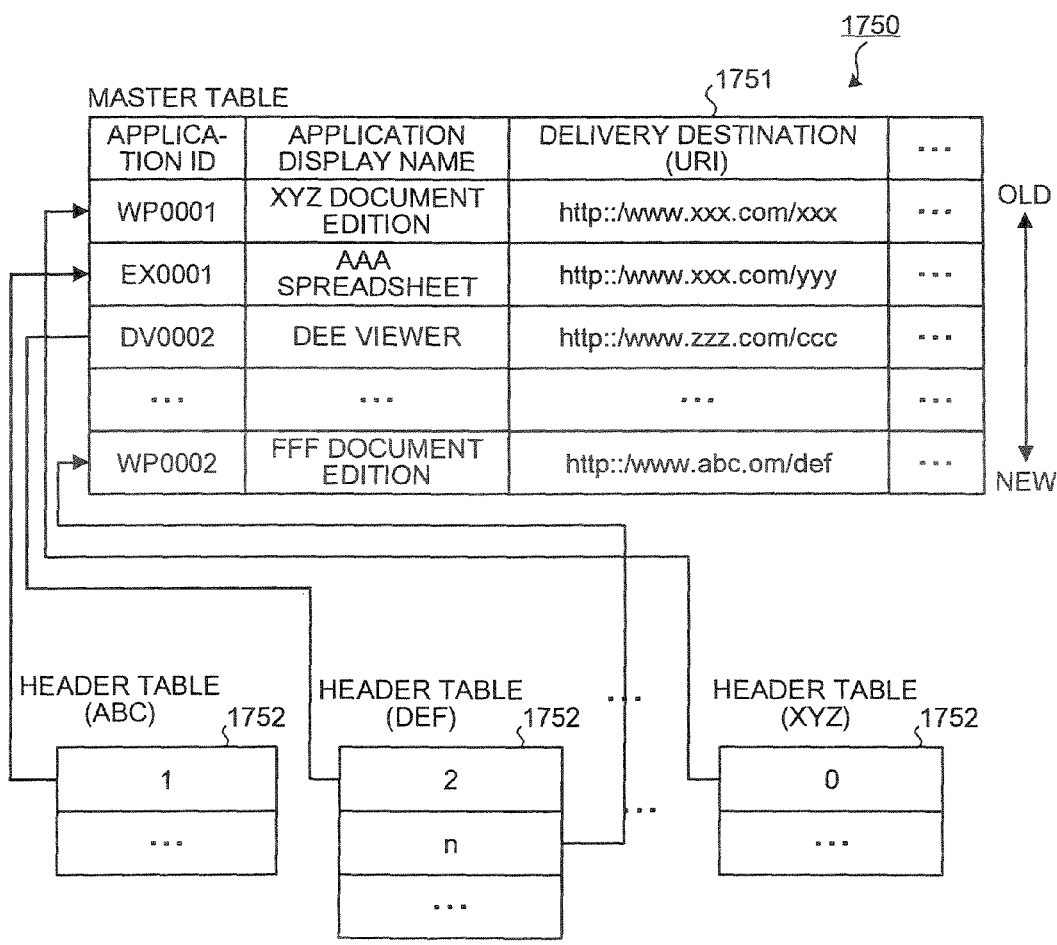

| PLEASE PERFORM SETTING FOR PC AT NETWORK CONNECTION DESTINATION | | |
|---|---|---|
| ◆USE OF DELIVERY FROM PC AT CONNECTION DESTINATION | YES | NO |
| ◆AUTOMATIC UPDATE OF DELIVERY DESTINATION OF PC AT CONNECTION DESTINATION | YES | NO |
| ◆TIMING OF AUTOMATIC UPDATE | CHANGE | |
| ◆MAXIMUM STORAGE NUMBER | CHANGE | 50CASES |
| | CANCEL | SET |

↓ CHANGE (2)

| PLEASE SET AUTOMATIC UPDATE TIMING | | |
|---|---|---|
| ◆SETTING CHANGE RELATED TO INFORMATION PROCESSING APPLICATION | AUTOMATIC UPDATE IS PERFORMED | AUTOMATIC UPDATE IS NOT PERFORMED |
| ◆SETTING CHANGE RELATED TO NETWORK | AUTOMATIC UPDATE IS PERFORMED | AUTOMATIC UPDATE IS NOT PERFORMED |
| ◆CHANGE APPLICATION | AUTOMATIC UPDATE IS PERFORMED | AUTOMATIC UPDATE IS NOT PERFORMED |
| ◆INDIVIDUAL LOGIN | AUTOMATIC UPDATE IS PERFORMED | AUTOMATIC UPDATE IS NOT PERFORMED |
| ◆POWER SUPPLY RESTORATION | AUTOMATIC UPDATE IS PERFORMED | AUTOMATIC UPDATE IS NOT PERFORMED |
| ◆TIMER TIME   5 MINUTES | CHANGE | AUTOMATIC UPDATE IS NOT PERFORMED |
| | CANCEL | SET |

FIG.51

| APPLICATION ID | APPLICATION DISPLAY NAME |
|---|---|

... | APPLICATION ID | APPLICATION DISPLAY NAME | APPARATUS ID | EXPIRATION DATE |
|---|---|---|---|

FIG.60

| PLEASE PERFORM SETTING FOR NETWORK | | |
|---|---|---|
| ◆NETWORK VALID/INVALID | VALID | INVALID |
| ◆PORT FOR EXTERNAL APPARATUS CONTROL OS VALID/INVALID | VALID | INVALID |
| ◆IP ADDRESS | CHANGE | |
| | CANCEL | SET |

5120

IMAGE PROCESSING APPARATUS FOR PROCESSING AND COMMUNICATING WITH AN INFORMATION PROCESSING APPARATUS WHICH DOES NOT HAVE AN IMAGE PROCESSING APPARATUS DRIVER SOFTWARE

CROSS-REFERENCE TO RELATED APPLICATIONS

The present document incorporates by reference the entire contents of Japanese priority document, 2006-043576 filed in Japan on Feb. 21, 2006 and 2006-339061 and 2006-339062 filed in Japan on Dec. 15, 2006.

BACKGROUND OF THE INVENTION

1. Field of the Invention

The present invention relates to a technology for transmitting an image scanned by a scanning unit to an information processing apparatus connected to a network.

2. Description of the Related Art

Conventionally, there are known image processing apparatuses such as a scanner that can scan an original with a scanner unit and transmit a scan image to an image processing apparatus connected to a network and a multifunction product (MFP) including a scanner function. Such image processing apparatuses transmit the scan image to the information processing apparatus according to file transfer using an electronic mail and a protocol such as a file transfer protocol (FTP) (see, for example, Japanese Patent Application Laid-Open No. 2005-244411 (hereinafter referred to as first document)).

Such image processing apparatuses usually include, as a database (DB) for managing destinations such as email addresses and IP addresses to which the scan image is transferred, a local user DB for managing user information dedicated to the image processing apparatuses managed in the image processing apparatuses, a delivery user DB in which user information as destinations managed by a delivery server on a network is temporarily acquired and stored on the image processing apparatuses side, and a lightweight directory access protocol (LDAP) user DB in which user information as destinations stored in an LDAP server on a network is temporarily acquired and stored.

The information processing apparatuses receives the scan image, converts the scan image into a data format corresponding to an application for displaying, editing, or printing a document and an image, and displays, edits, or prints data after conversion with the application.

In recent years, an operating system (OS) in which an application allows an external apparatus to use arbitrary data even if driver software is not installed is proposed. In an information processing apparatus such as a personal computer (PC) installed with such an OS, the OS has a function of making it possible to use an information processing apparatus on a network even if driver software for an image processing apparatus such as a scanner apparatus is not installed.

Such an OS transmits a registration request for an application executed on the information processing apparatus side installed with the OS to the image processing apparatus. The information processing apparatus receives data corresponding to the application registered in the image processing apparatus from the image processing apparatus. Consequently, the information processing apparatus can execute the data with the application without installing the driver software for the image processing apparatus.

On the information processing apparatus side installed with such an OS, it is desired that a function for allowing the image information processing apparatus side to manage destinations for the OS as transmission destination of a scan image without installing the driver software for the image processing apparatus is implemented in the image processing apparatus.

SUMMARY OF THE INVENTION

It is an object of the present invention to at least partially solve the problems in the conventional technology.

An image processing apparatus according to one aspect of the present invention includes at least a scanning unit that scans an image and processes the image scanned by the scanning unit. The image processing apparatus includes a first destination storing unit that stores therein application destination information in which an application display name that is a display name of a destination of an information processing application of an information processing apparatus is included. The information processing application is a software for an information processing. The information processing apparatus is connected to a network and is capable of executing the information processing application and an operating system that has a function of making a request for registration of the information processing application to the image processing apparatus, to operate the image processing apparatus without installing a driver software for the image processing apparatus and to receive data generated by the image processing apparatus.

An image processing apparatus according to another aspect of the present invention includes at least a scanning unit that scans an image and processes the image scanned by the scanning unit. The image processing apparatus includes a storing unit that that stores therein application destination information in which application identification information unique to an application of an information processing apparatus is associated with an application display name that is a display name of the application, the information processing apparatus being connected to a network and sending a request for registration of the application to the image processing apparatus; a receiving unit that receives the request for registration of the application including the application identification information and the application display name from the information processing apparatus; a timing determining unit that determines whether it is predetermined timing at which the application destination information is not used; and an updating unit that extracts, when it is determined by the timing determining unit that it is the predetermined timing, the application identification information and the application display name from the request for registration of the application received by the receiving unit, and stores extracted application identification information and application display name in the storing unit as the application destination information in association with each other.

An image processing method according to still another aspect of the present invention is for an image processing apparatus that includes at least a scanning unit that scans an image and processes the image scanned by the scanning unit. The image processing apparatus includes a first destination storing unit that stores therein application destination information in which an application display name that is a display name of a destination of an information processing application of an information processing apparatus is included, where the information processing application being a software for an information processing, and the information processing apparatus being connected to a network and capable of executing the information processing application and an operating system that has a function of making a request for registration of the information processing application to the image processing apparatus, to operate the image processing apparatus without installing a driver software for the image processing apparatus and to receive data generated by the image processing apparatus, a second destination storing unit that stores therein application destination information for display generated based on the application destination information, in which application identification information unique to the information processing application, the application display name, and delivery destination information concerning the information processing apparatus that made the request for registration of the information processing application are associated with each other, an operation displaying unit that displays thereon various screens with which a user is capable of performing an input operation, and a display control unit that reads the application display name registered in the application destination information for display, and displays an application screen on which the application display name is rendered to allow the user to input the application display name on the operation displaying unit. The image processing method includes receiving the request for registration of the information processing application including the application display name and the delivery destination information from the information processing apparatus; extracting the application display name and the delivery destination information from the request for registration of the information processing application; registering extracted application display name and delivery destination information in the application destination information stored in the first storing unit; registering, based on the application destination information stored in the first storing unit, the application identification information, the application display name, and the delivery destination information in the application destination information for display stored in the second destination storing unit; reading the application display name registered in the application destination information for display stored in the second destination storing unit; and displaying an application screen on which read application display name is rendered to allow the user to input the application display name on the operation display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram for explaining a data structure of a registration request;

FIG. 3 is a diagram for explaining an example of content of an information-processing-application-destination DB;

FIG. 18 is a diagram for explaining an example of a data structure of an information-processing-application-destination DB according to the third embodiment;

FIG. 19 is a diagram for explaining an example of a data structure of an information-processing-application-destination DB for display according to the third embodiment;

FIG. 31 is a diagram for explaining an example of an initial-setting-menu screen for using a function of an image-processing-control OS installed in each of a PC-A, PC-B, and PC-C at network connection destinations shown in FIG. 17;

FIG. 51 is a diagram for explaining a data structure of a registration request according to the fourth embodiment;

FIG. 60 is a diagram of an example of a network setting screen displayed on the LCD touch panel of the operation panel;

DETAILED DESCRIPTION OF THE PREFERRED EMBODIMENTS

Exemplary embodiments of the present invention are explained in detail below with reference to the accompanying drawings.

Figure 1:
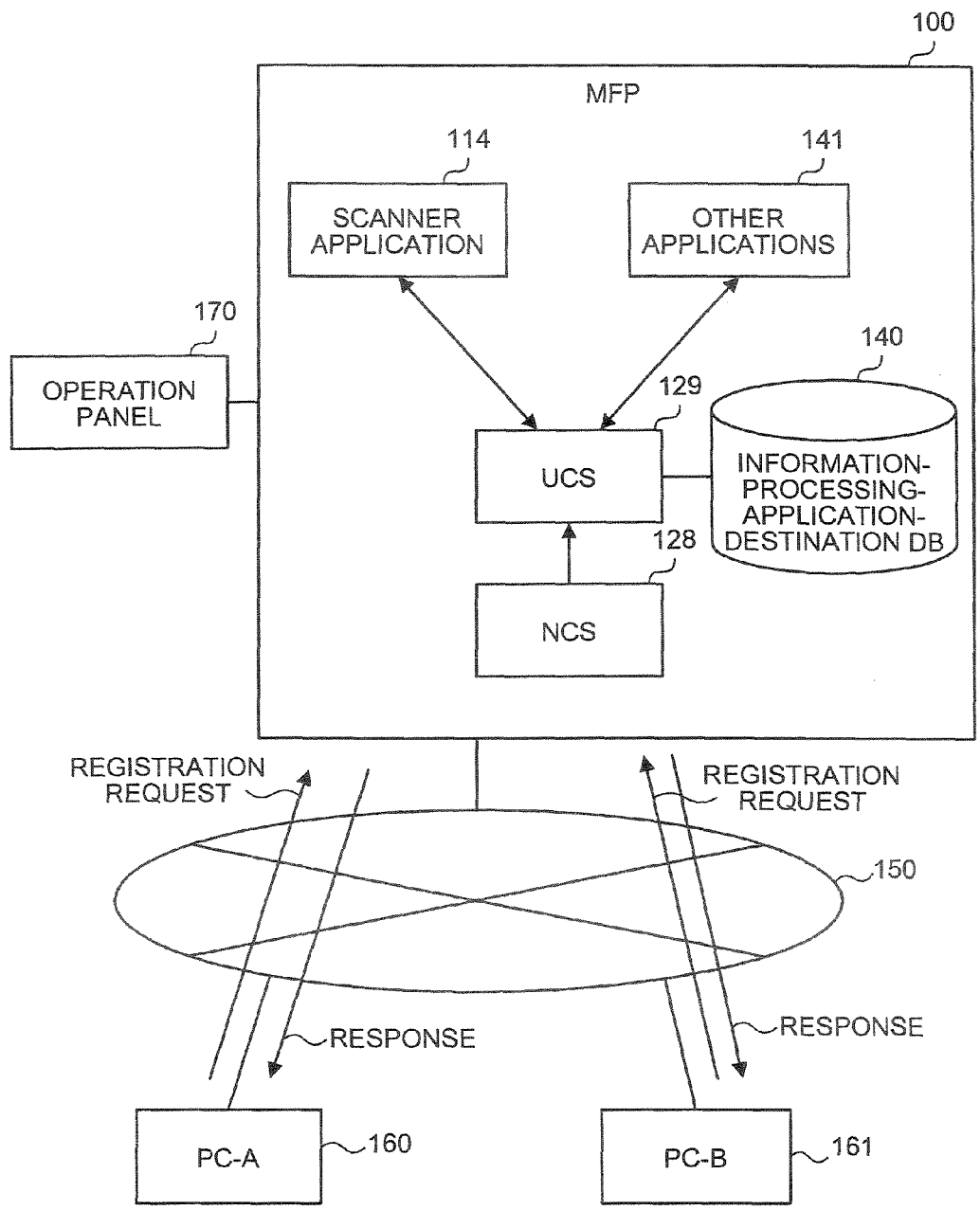
FIG. 1 is a block diagram of a network structure of an image processing system and a main structure of an MFP according to a first embodiment of the present invention.

FIG. 1 is a block diagram of a network structure of an image processing system and a main structure of an MFP according to a first embodiment of the present invention. In the image processing system according to the first embodiment, an MFP 100 as an image processing apparatus in which functions related to image processing of a copying machine, a scanner, a FAX, and a printer are stored in one housing and a plurality of PCs including a PC-A 160 and a PC-B 161 are connected to a network 150 such as the Internet or a local area network (LAN).

The PC-A 160 and the PC-B 161 include a control device such as a central processing unit (CPU), storage devices such as a read only memory (ROM) and a random access memory (RAM), an hard disk drive (HDD), an external storage device such as a compact disk (CD) drive device, a display device such as a display, and input devices such as a keyboard and a mouse. The PC-A 160 and the PC-B 161 have a hardware configuration in which a normal computer is used.

In the PC-A 160 and the PC-B 161, an operation system (OS) and applications for various kinds of information processing (hereinafter, "information processing application") such as a document application and a spreadsheet application running on the OS are installed.

This OS has a function of sending a registration request for the information processing application described later to the MFP 100 to cause the MFP 100 to operate without installing driver software for the MFP 100 and receive data generated by the MFP 100 (this OS is hereinafter referred to as "image-processing-control OS"). Therefore, the driver software for the MFP 100 is not installed in the PC-A 160 and the PC-B 161. The PC-A 160 and the PC-B 161 send registration requests for the information processing application installed to the MFP 100 on the network according to the function of the information-processing-control OS.

FIG. 2 is a diagram for explaining a data structure of a registration request. The registration request requests the MFP 100 to hold a plurality of pairs of application IDs peculiar to information processing applications running on the PC-A 160 or the PC-B 161 and application display names as display names of the information processing applications and apparatus IDs peculiar to the PC-A 160 and the PC-B 161 and register the information processing applications running on the PC-A 160 and the PC-B 161. Actually, the registration request shown in FIG. 2 is formed by data of an eXtended Markup Language (XML) format. The application IDs, the application display names, the apparatus IDs, and the like are described in the registration request with a representation structured by tags.

Referring back to FIG. 1, the MFP 100 mainly includes a scanner application 114 that performs scanner processing, other applications 141, a user control service (UCS) 129, a network control service (NCS) 128, an information-processing-application-destination DB 140, and an operation panel 170. As shown in FIG. 1, the MFP 100 receives registration requests from the PC-A 160 and the PC-B 161, performs, for example, processing for registering information-processing-application-destination information (records) described later, and then transmits a response to the PC-A 160 and the PC-B 161 from which the registration requests are received.

The information-processing-application-destination DB 140 is a DB in which information on information processing applications installed in the PC-A 160 and the PC-B 161 as destinations, to which an image scanned by the scanner application 114 is transmitted, is registered.

FIG. 3 is a diagram for explaining an example of content of the information-processing-application-destination DB 140. In the information-processing-application-destination DB 140, as shown in FIG. 3, a plurality of pieces of information-processing-application-destination information that associate application IDs, application display names, apparatus IDs of the PC-A 160 and the PC-B 161, and expiration dates included in the registration requests received from the PC-A 160 and the PC-B 161 are registered.

The expiration date means a final deadline until which it is possible to effectively use the information-processing-application-destination information as a destination. When this expiration date has elapsed, it is impossible to use the information-processing-application-destination information as a destination of a scan image.

The NCS 128 operates as a process for performing, as receiving means and transmitting means, processing for receiving the registration requests transmitted from the PC-A 160 and the PC-B 161 and transmitting a response to the registration requests and scan data to the PC-A 160 and the PC-B 161.

The NCS 128 is also a process for providing the applications such as the scanner application 114 and the other applications 141 on the MFP 100, which require a network I/O, with services that can be used in common. The NCS 128 mediates allocation of data received from the network side by respective protocols to the respective applications and transmission of data from the applications to the network side.

The UCS 129 operates as a process for performing, as destination managing means, processing for registering or updating the information-processing-application-destination information in the information-processing-application-destination DB 140 and transmitting, with inter-process communication, update start notification and update completion notification to the applications running on the MFP 100 such as the scanner application 114.

Besides, the UCS 129 performs, using a not-shown user DB or the like, management of information on a user who uses the MFP 100. The UCS 129 also performs processing for determining a storage device in which user information corresponding to a request is stored, acquiring the user information from the storage device, and supplying the user information to the respective applications.

The operation panel 170 has a liquid crystal display unit that displays various screens to allow a user to touch and input the screens and an operation unit in which the user can input operation. The operation panel 170 causes the user to perform display and operation for the various screens.

Figure 4:
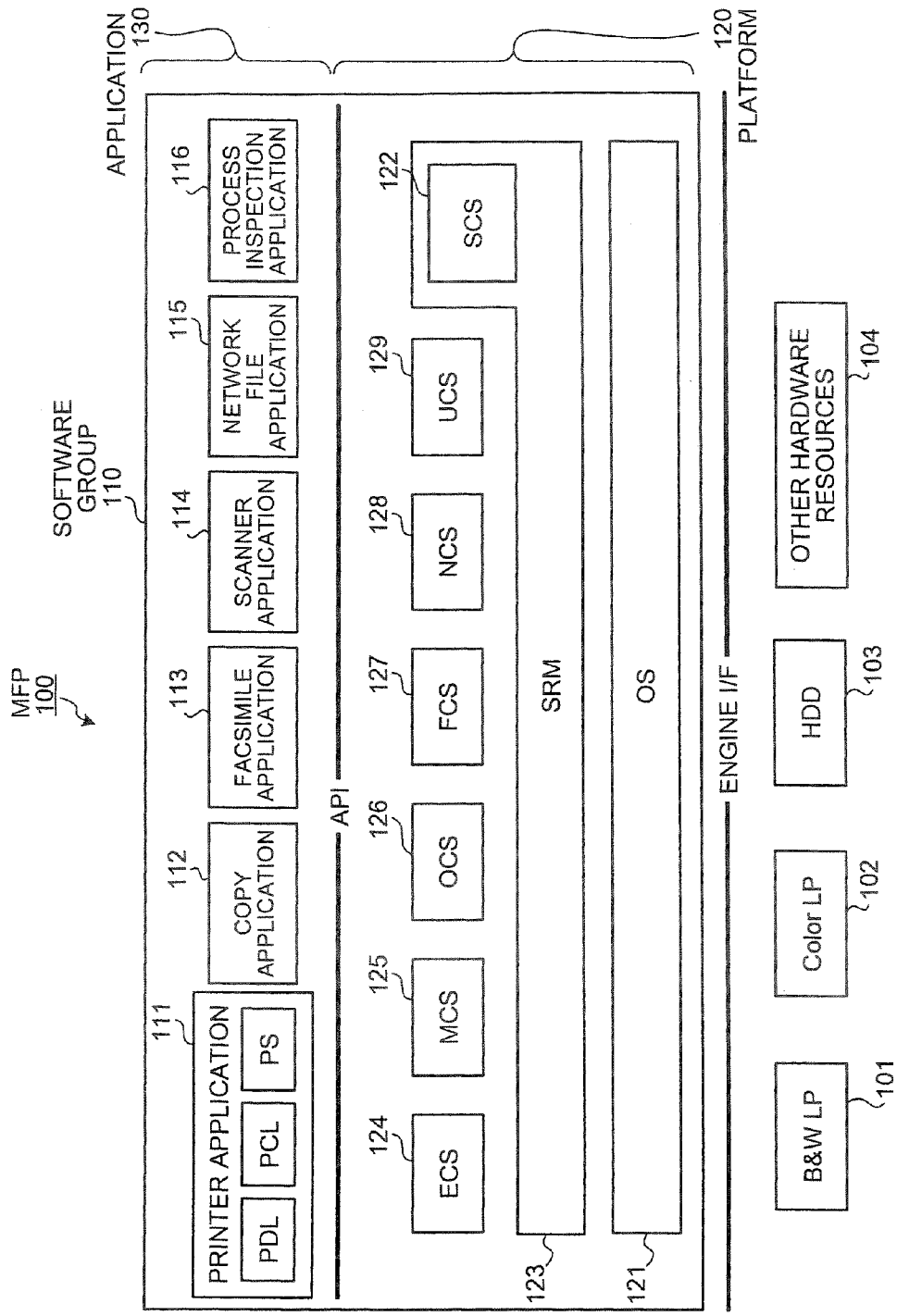
FIG. 4 is a block diagram of an overall structure of the MFP according to the first embodiment.

FIG. 4 is a block diagram of an overall structure of the MFP 100 according to the first embodiment.

As shown in FIG. 4, the MFP 100 includes a black-and-white line printer (B&W LP) 101, a color line printer (color LP) 102, a hard disk device (HDD) 103, hardware resources 104 such as a scanner, a FAX, a memory, and a network interface, and a software group 110. The software group 110 includes a platform 120 and an application 130.

The platform 120 includes a control service for interpreting a processing request from the application 130 and generating an acquisition request for hardware resources, a system resource manager (SRM) 123 that performs management of one or more hardware resources and mediates acquisition requests from the control service, and an operating system (OS) 121.

The control service includes one or more service modules such as a system control service (SCS) 122, an engine control service (ECS) 124, a memory control service (MCS) 125, an operation-panel control service (OCS) 126, a FAX control service (FCS) 127, the NCS 128, and the UCS 129.

The platform 120 includes an application program interface (API) that makes it possible to receive a processing request from the application 130 according to a function defined in advance.

The OS 121 is a general-purpose operating system such as UNIX (registered trademark). The OS 121 executes respective kinds of software of the platform 120 and the application 130 in parallel as processes.

A process of the SRM 123 performs control of the system and management of the resources in conjunction with the SCS 122. For example, the process of the SRM 123 performs mediation and controls execution according to requests from a higher layer that uses hardware resources such as engines of a scanner unit, a printer unit, and the like, a memory, a hard disk device (HDD) file, a host interface (I/O) (a centro-interface, a network interface, an IEEE1394 interface, an RS232C interface, etc.).

Specifically, the SRM 123 determines whether a hardware resource requested is usable (whether the hardware resource is not used by another request) and, if the hardware resource is usable, informs the higher layer that the hardware resource requested is usable. The SRM 123 performs scheduling for use of a hardware resource in response to a request from the higher layer and, for example, directly carries out, using the printer engine, content of the request such as sheet conveyance, an image forming operation, securing of a memory, and file generation.

A process of the SCS 122 performs application management, operation unit control, system screen display, light emitting diode (LED) display, resource management, interrupt application control, and the like. Specific processing performed by the SCS 122 in the embodiment is described later.

A process of the ECS 124 performs control of an engine of the hardware resource 104 including the B&W LP 101, the color LP 102, the HDD 103, the scanner, and the FAX.

A process of the MCS 125 performs acquisition and release of an image memory, use of the hard disk device (HDD), compression and expansion of image data, and the like.

A process of the OCS 126 performs control of the operation panel serving as information transmitting means between an operator and main body control.

A process of the FCS 127 provides, from respective application layers of a system controller, applications for performing FAX transmission and reception using a PSTN or ISDN network, registration and citation of various FAX data managed by a backup SRAM (BKM), FAX reading, FAX reception and printing, and linkage transmission and reception.

The OCS 126 performs control of the operation panel 170 serving as information transmitting means between the operator (the user) and the main body control. The OCS 126 includes a section of an OCS process for acquiring key press (or touch operation) from the operation panel as a key event and transmitting a key event function corresponding to the key acquired to the SCS 122 and a section of an OCS library in which a rendering function for rendering and outputting various screens on the operation panel according to a request from the application 130 or the control service, a function for performing other control on the operation panel, and the like are registered in advance. This OCS library is implemented to be linked to the respective modules of the application 130 and the control service. All the sections of the OCS 126 may operate a process or may be an OCS library. The UCS 129 and the NCS 128 function as explained with reference to FIG. 1.

The application 130 includes a printer application 111 that is an application for a printer having a page description language (PDL), a processor control language (PCL), and a post script (PS), a copy application 112 that is an application for a copying machine, a FAX application 113 that is an application for a FAX, the scanner application 114 that is an application for a scanner, a network file application 115 that is an application for a network file, and a process inspection application 116 that is an application for process inspection.

The respective processes of the application 130 and the respective processes of the control service realize user services related to image formation processing such as a copying machine, a printer, a scanner, and a FAX while performing inter-process communication according to function invocation, transmission of a return value of the function invocation, and transmission and reception of a message.

As described above, the MFP 100 according to the first embodiment includes a plurality of applications 130 and a plurality of control services. All the applications 130 and the control services operate as processes. In the respective processes, one or more threads are generated and parallel execution is performed in a unit of thread. The control services provide the applications 130 with a common service. Therefore, the large number of processes provides user services related to image formation processing such as a copying machine, a printer, a scanner, and a FAX while performing cooperative operations by performing parallel operations and parallel operations of the threads to communicate with one another.

Figure 5:
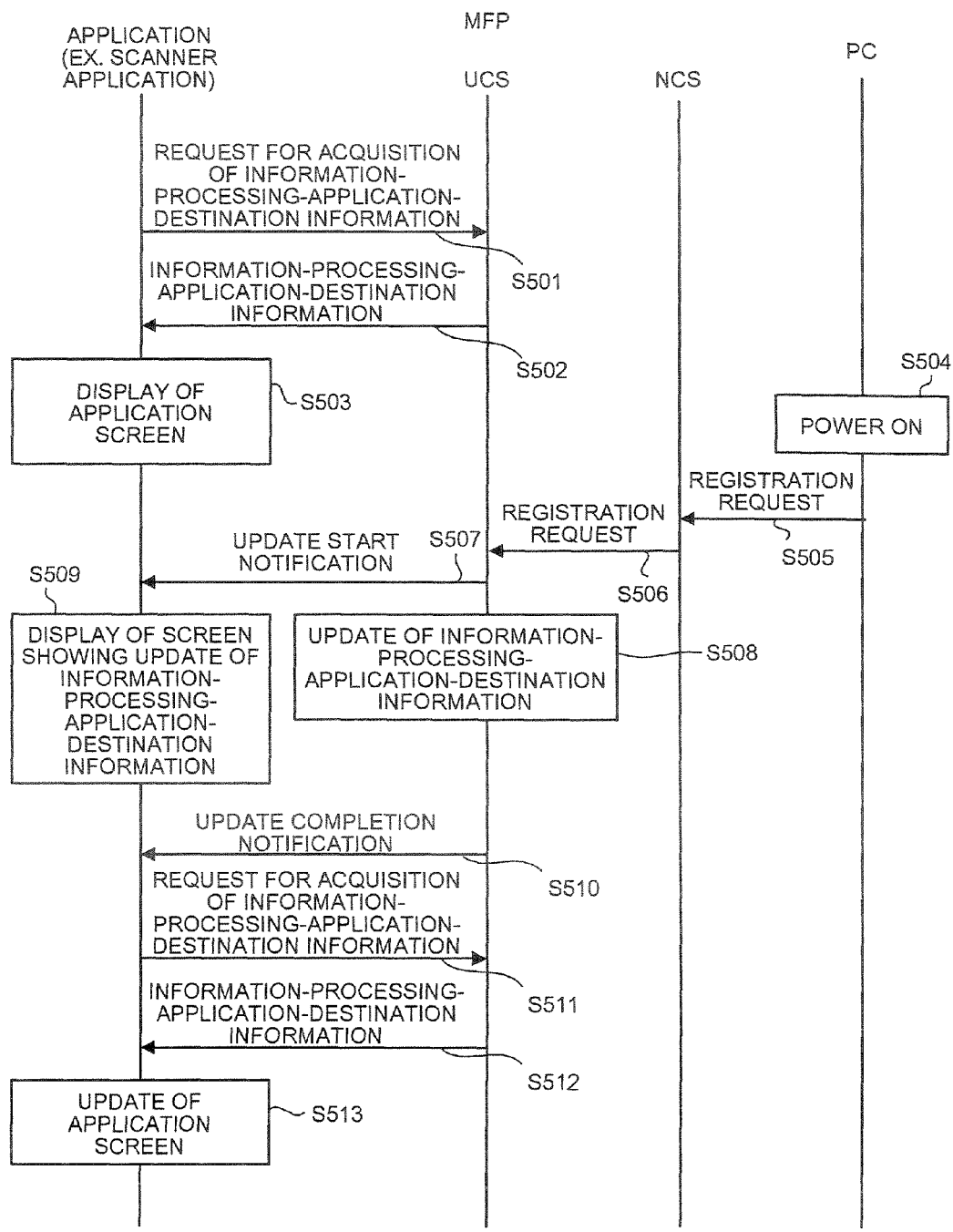
FIG. 5 is a sequence chart of an overall flow of processing for registering and displaying destination information by the image processing system according to the first embodiment.

FIG. 5 is a sequence chart of an overall flow of processing for registering and displaying destination information by the image processing system according to the first embodiment.

It is assumed that a plurality of pieces of information-processing-application-destination information for the PC-A 160 and the PC-B 161 shown in FIG. 3 are registered in the information-processing-application-destination DB 140. In FIG. 5, the PC-A 160 and the PC-B 161 are simply shown as PC.

When the application 130 on the MFP 100 such as the scanner application 114 transmits a scan image to a destination of an information processing application of the PC-A 160 or the PC-B 161, to designate the destination, first, the application 130 transmits a request for acquisition of information-processing-application-destination information to the UCS 129 (step S501). The UCS 129 receives such an acquisition request. The UCS 129 accesses the information-processing-application-destination DB 140, reads the information-processing-application-destination information, and transmits the information-processing-application-destination information read to the application 130 (step S502).

The application 130 receives the information-processing-application-destination information. The application 130 extracts an application display name, an application ID, and the like of the information-processing-application-destination information received, generates an application screen, and displays the application screen on the liquid crystal display unit of the operation panel 170 via the OCS 126 (step S503). Details of the application screen are described later.

It is conceivable that the PC on the network is turned on while the application screen is displayed. When the PC is turned on (step S504), according to a function of the image-processing-control OS, the PC transmits a registration request for registration of the information processing application on the PC in the MFP 100 to the MFP 100 (step S505).

The MFP 100 receives the registration request from the PC in the NCS 128 and transfers the registration request received to the UCS 129 (step S506). The UCS 129 receives the registration request from the NCS 128. Since it is necessary to update the information-processing-application-destination DB 140 and, therefore, it is likely that the application screen displayed on the operation panel 170 at present becomes unusable as a result of the update, the UCS 129 transmits update start notification to the application 130 (step S507). The UCS 129 updates the information-processing-application-destination information registered in the information-processing-application-destination DB 140 based on the registration request received (step S508).

The application 130 receives the update start notification. To make an input from the user on the application screen displayed at present impossible, the application 130 displays, via the OCS 126, a popup screen indicating that the information-processing-application destination is being updated (step S509).

When the update of the information-processing-application-destination DB by the UCS 129 is completed, the UCS 129 transmits update completion notification to the application 130 (step S510). The application 130 receives the update completion notification To display the application screen again using information-processing-application-destination information of the information-processing-application-destination DB 140 updated, the application 130 transmits a request for acquisition of the information-processing-application-destination information to the UCS 129 (step S511). The UCS 129 receives the acquisition request. The UCS 129 accesses the information-processing-application-destination DB 140 updated and transmits the information-processing-application-destination information read to the application 130 (step S512).

The application 130 receives the information-processing-application-destination information. The application 130 extracts an application display name, an application ID, and the like of the information-processing-application-destination information received, generates an application screen, and displays the application screen on the liquid crystal display unit of the operation panel 170 via the OCS 126 to update the application screen (step S513).

According to the processing described above, the application screen is displayed on the liquid crystal display unit of the operation panel 170. The user is capable of selecting, with this application screen, an information processing application on the PC that is a destination of the scan image.

Figure 6:
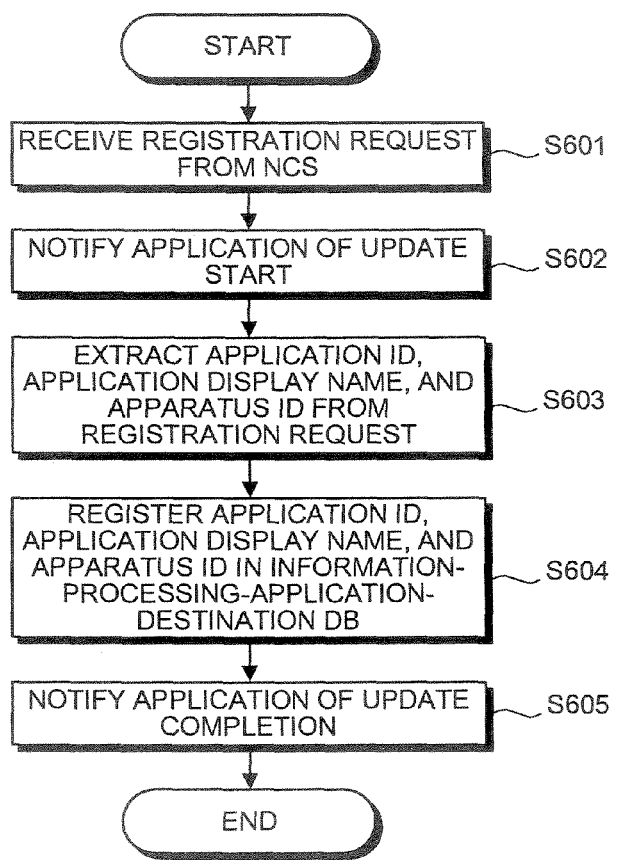
FIG. 6 is a flowchart of a procedure of processing for registering information-processing-application-destination information by a UCS of the MFP according to the first embodiment.

FIG. 6 is a flowchart of a procedure of processing for registering information-processing-application-destination information by the UCS 129 of the MFP 100 according to the first embodiment.

The UCS 129 receives a registration request, which is received from the PC-A 160 or the PC-B 161, from the NCS 128 (step S601) and transmits update start notification concerning update of the information-processing-application-destination DB 140 to the application 130 (step S602). The UCS 129 extracts an application ID, an application display name, and an apparatus ID from the registration request received (step S603). The UCS 129 registers the application ID, the application display name, and the apparatus ID in association with one another in the information-processing-application-destination DB 140 as information-processing-application-destination information (step S604). Consequently, the information-processing-application-destination DB 140 is updated. The UCS 129 transmits update completion notification concerning the update of the information-processing-application-destination DB to the application 130 (step S605). According to such processing by the UCS 129, new information-processing-application-destination information is registered and the information-processing-application-destination DB 140 is updated.

Figure 7:
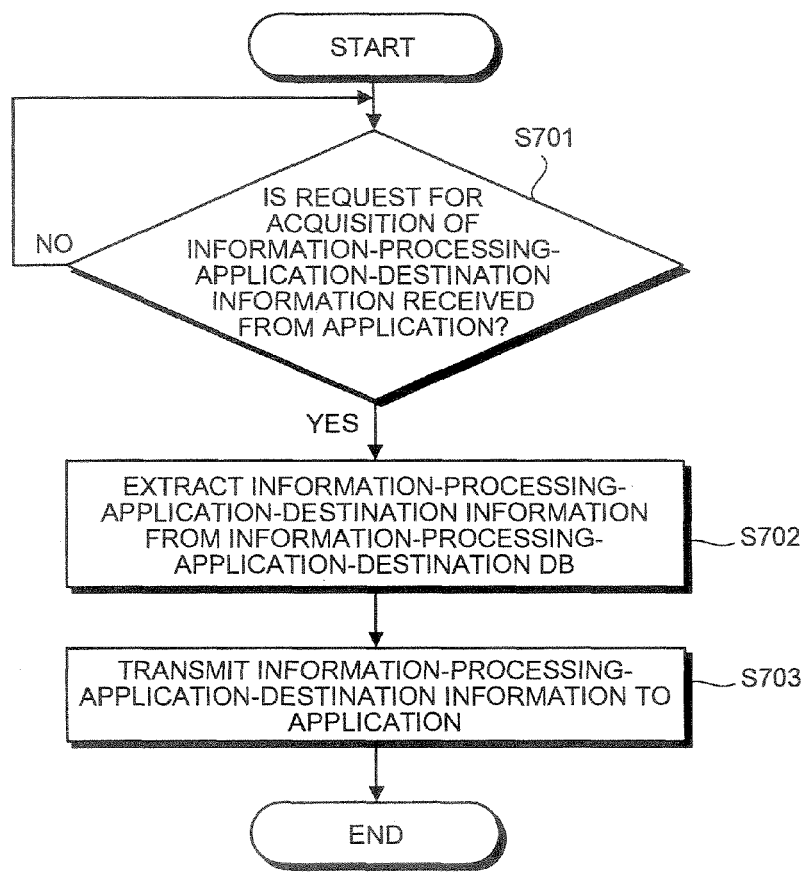
FIG. 7 is a flowchart of a procedure of processing for extracting the information-processing-application-destination information from the information-processing-application-destination DB by the UCS of the MFP according to the first embodiment.

FIG. 7 is a flowchart of a procedure of processing for extracting information-processing-application-destination information from the information-processing-application-destination DB 140 by the UCS 129 of the MFP 100 according to the first embodiment.

The UCS 129 is usually in a state of wait for reception of a request for acquisition of information-processing-application-destination information from the application 130 (step S701). When the UCS 129 receives a request for acquisition of information-processing-application-destination information from the application 130 ("Yes" at step S701), the UCS 129 extracts all pieces of information-processing-application-destination information (the records in FIG. 3) associated with an application ID, an application display name, an apparatus ID, and an expiration date (step S702). The UCS 129 transmits all the pieces of information-processing-application-destination information extracted to the application 130 (step S703).

When the present date and time has passed the expiration date of the information-processing-application-destination information extracted, the information-processing-application-destination information is not transmitted to the application 130. According to the processing described above, all the pieces of information-processing-application-destination information registered in the information-processing-application-destination DB 140 are extracted and transmitted to the application 130.

Figure 8:
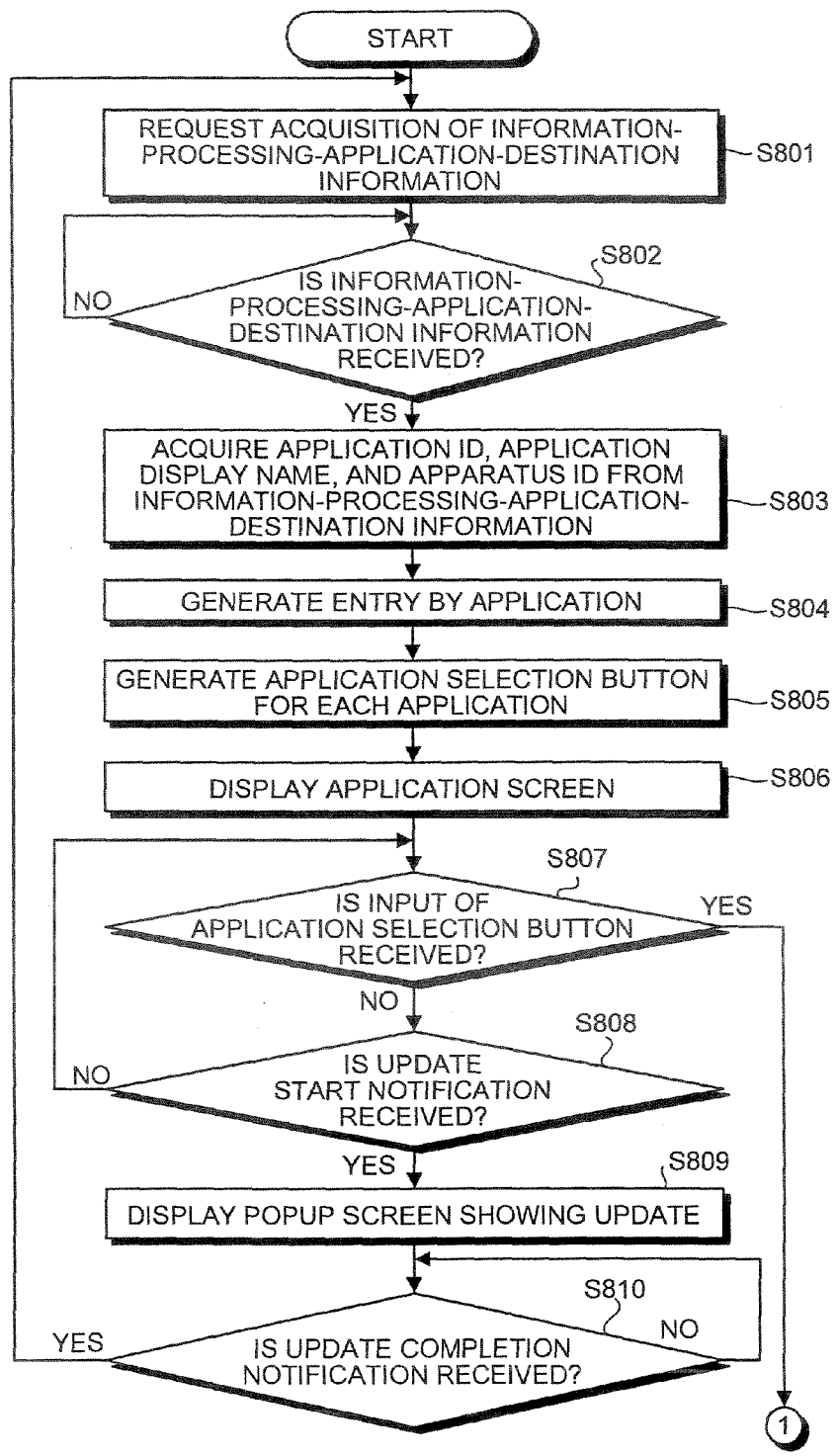
FIG. 8 is a flowchart of a procedure of processing for displaying an application screen and processing for designating a destination by an application of the MFP according to the first embodiment.
Figure 9:
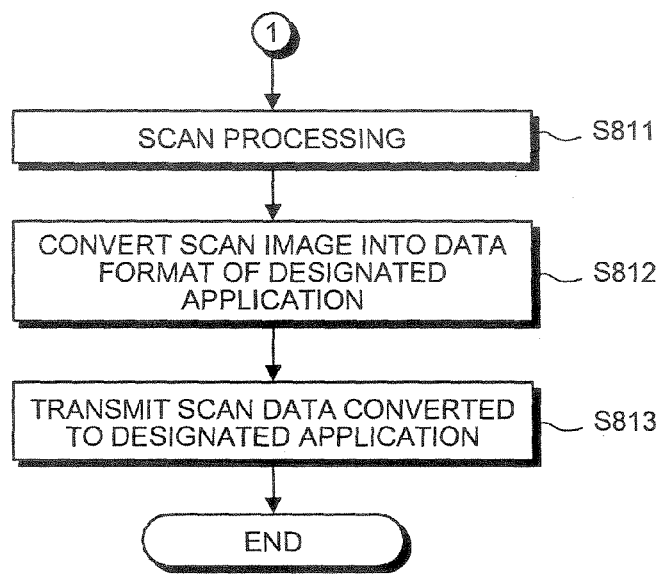
FIG. 9 is a flowchart of the procedure of the processing for displaying an application screen and the processing for designating a destination by the application of the MFP according to the first embodiment.

FIGS. 8 and 9 are flowcharts of a procedure of processing for displaying an application screen and processing for designating a destination by the application 130 of the MFP 100 according to the first embodiment. The scanner application 114 is explained as an example of the application 130. The same explanation is applied to the other applications 130.

First, the scanner application 114 transmits a request for acquisition of information-processing-application-destination information to the UCS 129 (step S801) and comes into a state of wait for reception of information-processing-application-destination information (step S802). When the scanner application 114 receives information-processing-application-destination information from the UCS 129 ("Yes" at step S802), the scanner application 114 extracts application IDs, application display names, and apparatus IDs from all pieces of information-processing-application-destination information received (step S803).

The scanner application 114 generates an entry by application from all the application IDs, application display names, and apparatus IDs extracted (step S804). The entry by application is a correspondence list of a display name of the PC-A 160 or the PC-B 161 indicated by an application ID and an apparatus ID for each application display name as described below. Correspondence between the apparatus ID and the PC-A 160 or the PC-B 161 only has to be stored in a storage medium such as an HD in advance.

Document software: PC-A: WP001
Spreadsheet software: PC-A: EX001
Document software: PC-B: WP001

The scanner application 114 generates an application selection button for each application from the entry by application generated (step S805). The scanner application 114 displays an application screen, on which the application selection button generated is rendered to allow the user to touch and input the button, on the liquid crystal display unit of the operation panel 170 (step S806). The generation of the application selection button and the display of the application screen are performed according to issuance of a function or the like provided by the OCS 126.

Figure 10:
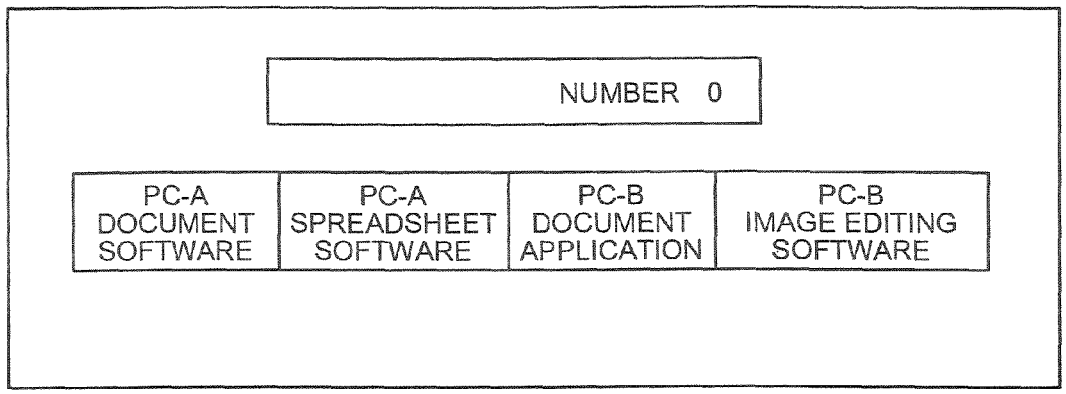
FIG. 10 is a schematic of an example of content of an application screen according to the first embodiment.

FIG. 10 is a schematic of an example of content of an application screen according to the first embodiment. As shown in FIG. 10, an application display name and an application selection button including a display name of the PC-A 160 or the PC-B 161 are displayed for each application on the application screen.

When the application screen is displayed, the scanner application 114 enters a state of wait for an input of the application selection button from the application screen by the user (step S807). When the input of the application selection button is received from the application screen ("Yes" at step S807), the scanner application 114 executes scan processing using a scanner engine (step S811) and converts a scan image into a data format of the information processing application on the PC designated by the application selection button (step S812). For example, when a document viewer such as Acrobat Reader® is selected, the scanner application 114 converts the scan image into a PDF format that is a data format treated in the document viewer.

The scanner application 114 transmits scan data, which is data obtained by converting the scan image into the data format of the application, to the application designated via the NCS 128 (step S813). Address information such as IP addresses of the PC-A 160 and the PC-B 161 installed with applications and email addresses of users on the PC-A 160 and the PC-B 161 is stored in an address DB or the like in association with apparatus IDs in advance. Address information is acquired based on an apparatus ID of the application designated and the scan data is transmitted to a destination indicated by the address information. Consequently, the scan data is transmitted to the application.

In this way, the scan image is converted into the data format treated by the designated application and transmitted to the PC-A 160 and the PC-B 161. Thus, the PC-A 160 and the PC-B 161 can directly display the scan data in the application. It is unnecessary to install the driver software for the MFP 100 in the PC-A 160 and the PC-B 16.

It is conceivable that, when the input of the application selection button is not performed at step S807 in a state in which the application screen is displayed ("No" at step S807), the PC-A 160 or the PC-B 161 is turned on.

Figure 11:
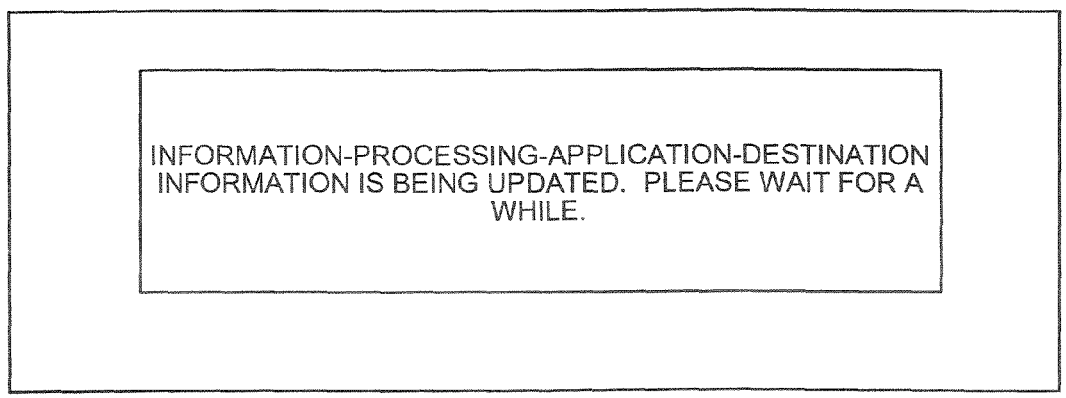
FIG. 11 is a schematic of a popup screen during update of the information-processing-application-destination information.

In such a case, the scanner application 114 receives update start notification concerning update of the information-processing-application-destination DB 140 from the UCS 129 ("Yes" at step S808). Thus, it is likely that the application selection button of the application screen displayed at present becomes a button corresponding to an application that is not present any more because of the update of the information-processing-application-destination DB 140. Therefore, the scanner application 114 displays a popup screen indicating that the information-processing-application-destination information is being updated shown in FIG. 11 to be superimposed on the application screen (step S809). Consequently, the input by the application selection button is limited.

The scanner application 114 comes into a state of wait for reception of update completion notification from the UCS 129 (step S810). When update completion notification is received ("Yes" at step S810), the scanner application 114 performs the processing from step S801 to step S806 again and displays an application screen, on which an application selection button is rendered, from the information-processing-application-destination DB 140 updated.

Figure 12:
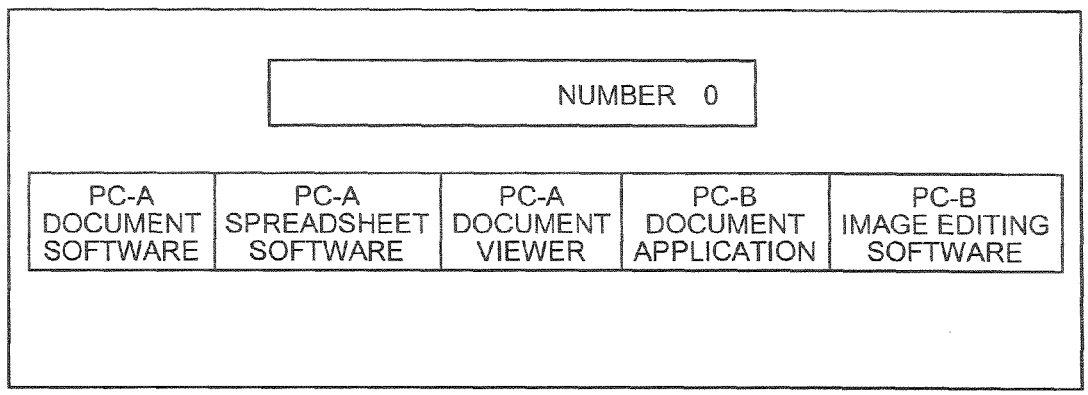
FIG. 12 is a schematic of an example of an application screen updated from the application screen shown in FIG. 10.

FIG. 12 is a schematic of an example of an application screen updated from the application screen shown in FIG. 10. As shown in FIG. 12, it is seen that, in the application screen after the update, a document viewer for the PC-A 160 is added to the application screen shown in FIG. 10. Consequently, even when the information-processing-application-destination DB 140 is updated, the user can always select an application selection button of a latest application.

As described above, the image processing system according to the first embodiment includes the information-processing-application-destination DB in which application IDs, application display names, and apparatus IDs of information processing applications on the PC-A 160 and the PC-B 161 are associated with one another. Thus, it is possible to easily transmit a scan image to the PC-A 160 or the PC-B 161 that sends a registration request for an information processing application on the PC. Moreover, it is possible to realize the scan processing function of the MFP 100 without installing the driver software for the MFP 100 on the PC-A 160 and PC-B 161 side.

In the image processing system according to the first embodiment, a registration request including an application ID, an application display name, and an apparatus ID is received from the PC-A 160 or the PC-B 161 and the application ID, the application display name, and the apparatus ID are registered in the information-processing-application-destination DB 140 in association with one another. Thus, it is possible to easily transmit scan data to the PC-A 160 or the PC-B 161 that sends a registration request for the information processing application. Moreover, it is possible to realize the scan processing function of the MFP 100 without installing the driver software for the MFP 100 on the PC-A 160 and PC-B 161 side.

In the MFP 100 according to the first embodiment, the application selection button displayed on the application screen is displayed for each application. However, in an MFP according to a second embodiment of the present invention, an application selection button is displayed for each PC.

A network structure of an image processing system and a structure of the MFP 100 according to the second embodiment are the same as those in the first embodiment shown in FIGS. 1 and 4. Content of a registration request transmitted from the PC-A 160 or the PC-B 161 is the same as that in the first embodiment shown in FIG. 2. A data structure of the information-processing-application-destination DB 140 is the same as that in the first embodiment shown in FIG. 3.

Figure 13:
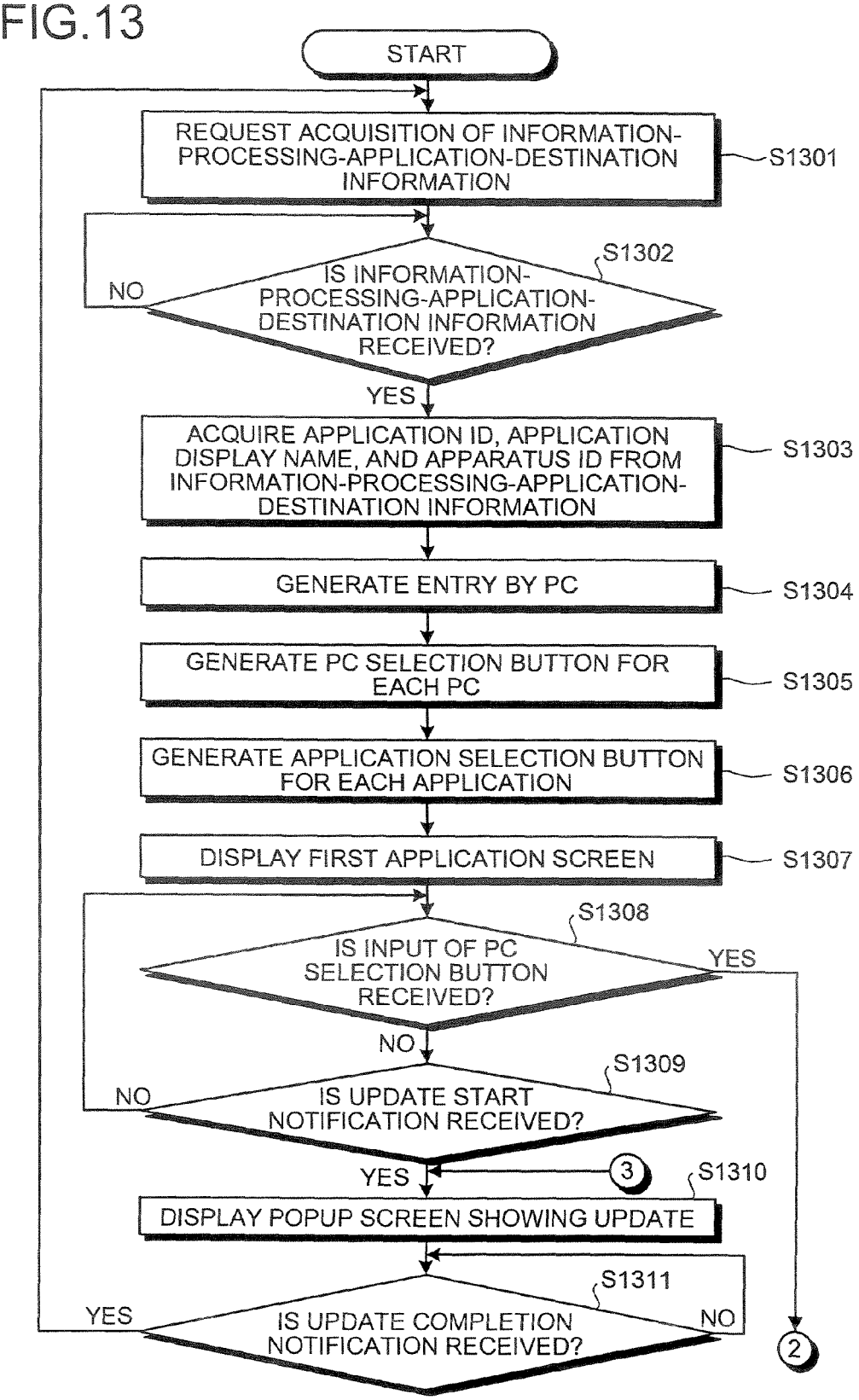
FIG. 13 is a flowchart of a procedure of processing for displaying an application screen and processing for designating a destination by an application of an MFP according to a second embodiment of the present invention.
Figure 14:
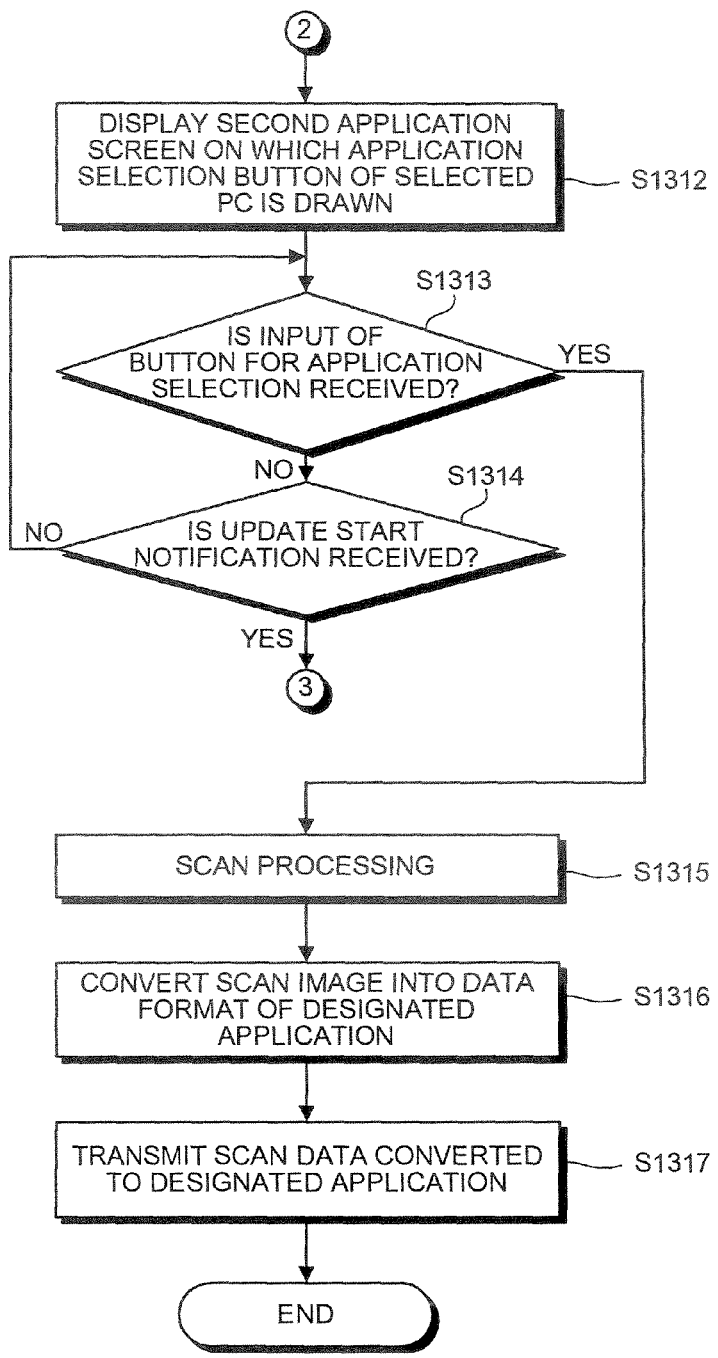
FIG. 14 is a flowchart of the procedure of the processing for displaying an application screen and the processing for designating a destination by the application of the MFP according to the second embodiment.

FIGS. 13 and 14 are flowcharts of a procedure of processing for displaying an application screen and processing for designating a destination by the application 130 of the MFP 100 according to the second embodiment. The scanner application 114 is explained as an example of the application 130. The same explanation is applied to the other applications 130.

Processing from transmission of a request for acquisition of information-processing-application-destination information to the UCS 129 to extraction of application IDs, application display names, and apparatus IDs from all pieces of information-processing-application-destination information (steps S1301 to S1303) is performed in the same manner as the processing by the scanner application in the first embodiment (steps S801 to S803).

The scanner application 114 generates an entry by PC from all the application IDs, application display names, and apparatus IDs extracted (step S1304). The entry by PC is a correspondence list of an application display name and an application ID for each display name of the PC. As in the first embodiment, a correspondence between the apparatus ID and the PC-A 160 or the PC-B 161 only has to be stored in a storage medium such as an HD in advance as described below.

PC-A: document software: PC-A: WP001
PC-A: spreadsheet software: EX001
PC-B: document software: WP001

The scanner application 114 generates a PC selection button for each PC from the entry by PC generated (step S1305). The scanner application 114 generates an application selection button for each application from the entry by PC generated (step S1306). The scanner application 114 displays a first application screen, on which the PC selection button generated is rendered to allow a user to touch and input the button, on the liquid crystal display unit of the operation panel 170 (step S1307). The generation of the PC selection button and the application selection button and the display of the first application screen are performed by issuance of a function or the like provided by the OCS 126.

Figure 15:
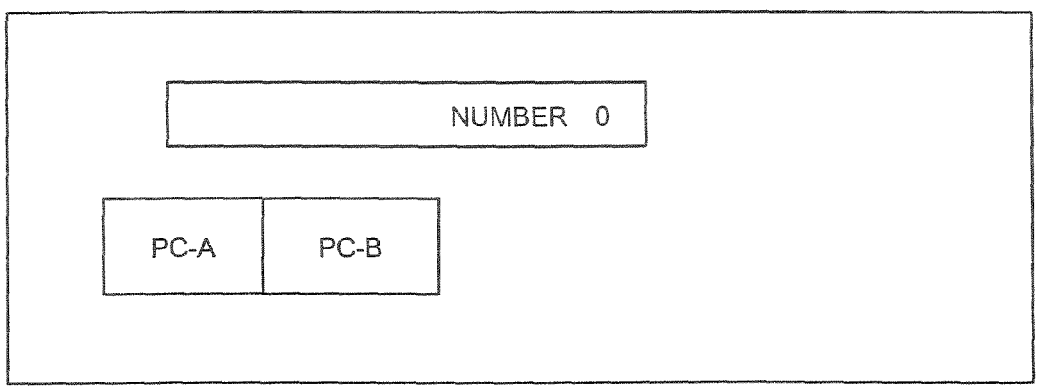
FIG. 15 is a schematic of an example of content of a first application screen on which a PC selection button is displayed in the MFP according to the second embodiment.

FIG. 15 is a schematic of an example of content of the first application screen on which the PC selection button is displayed in the MFP according to the second embodiment. As shown in FIG. 15, on the first application screen, a button for selecting the PC-A 160 and a button for selecting the PC-B 161 are displayed.

When the first application screen is displayed, the scanner application 114 comes into a state of wait for an input of a PC selection button by the user from the first application screen (step S1308). When an input of the PC selection button is received from the first application screen ("Yes" at step S1308), the scanner application 114 displays a second application screen, on which an application selection button of an information processing application corresponding to the PC of the PC selection button selected is rendered on the first application screen, on the liquid crystal display unit of the operation panel 170.

The information processing application corresponding to the PC of the PC selection button is determined with reference to the entry by PC. An application selection button of the information processing application determined only has to be selected out of the application selection buttons generated at step S1306 and rendered on the first application screen to display the second application screen.

Figure 16:
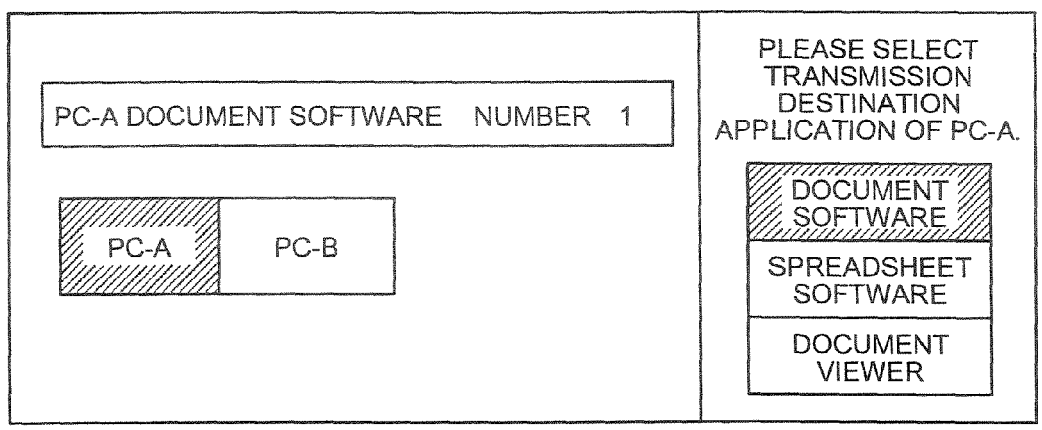
FIG. 16 is a schematic of an example of content of the first application screen on which the application selection button is displayed in the MFP according to the second embodiment.

FIG. 16 is a schematic of an example of content of the first application screen on which an application selection button is displayed in the MFP 100 according to the second embodiment. In FIG. 16, a state in which the PC selection button of the PC-A 160 is selected is shown. As shown in FIG. 16, only an application selection button corresponding to an information processing application installed in the PC-A 160 selected is displayed.

When the second application screen is displayed (step S1312), the scanner application 114 comes into a state of wait for an input of an application selection button from the application screen by the user (step S1313). When an input of an application selection button is received from the second application screen ("Yes" at step S1313), as in the first embodiment, the scanner application 114 executes scan processing using the scanner engine (step S1315) and converts a scan image into a data format of an information processing application on the PC designated by the application selection button (step S1316).

In the second embodiment, processing for updating the first application screen when the scanner application 114 receives update start notification concerning update of the information-processing-application-destination DB 140 from the UCS 129 during display of the first application screen (steps S1309 to S1311) and processing for updating the second application screen when the scanner application 114 receives update start notification concerning update of the information-processing-application-destination DB 140 from the UCS 129 during display of the second application screen (steps S1314, S1310, and S1311) are performed in the same manner as the processing for updating the application screen (steps S808 to S810) in the first embodiment.

As described above, in the MFP 100 according to the second embodiment, the apparatus IDs and the application display names registered in the information-processing-application-destination DB 140 are read and the first application screen for selecting and designating a PC corresponding to an apparatus ID is displayed on the liquid crystal display unit of the operation panel 170. The second application screen on which an application display name of an information processing application corresponding to the apparatus ID of the PC selected and designated from the first application screen is rendered to allow the user to input the application display name is displayed. Therefore, it is possible to select an information processing application with attention paid to a PC by displaying application screens such as the first application screen for each PC and the second application screen for each information processing application stepwise. Moreover, it is possible to pass data subjected to image processing to information processing application of a desired PC and realize an image processing function of an image processing apparatus without installing driver software for the MFP on the PC side.

In the MFP 100 according to the first and the second embodiments, the address information and the display names of the PC-A 160 and the PC-B 161 are stored in the DB different from the information-processing-application-destination DB. However, the address information and the display names may be stored in the information-processing-application-destination information of the information-processing-application-destination DB in association with apparatus IDs.

In the MFP 100 according to the first and the second embodiments, a single information-processing-applicationdestination DB is provided. However, an MFP according to a third embodiment of the present invention includes two information-processing-application-destination DBs for display to be displayed on an information-processing-application-destination DB and the operation panel.

Figure 17:
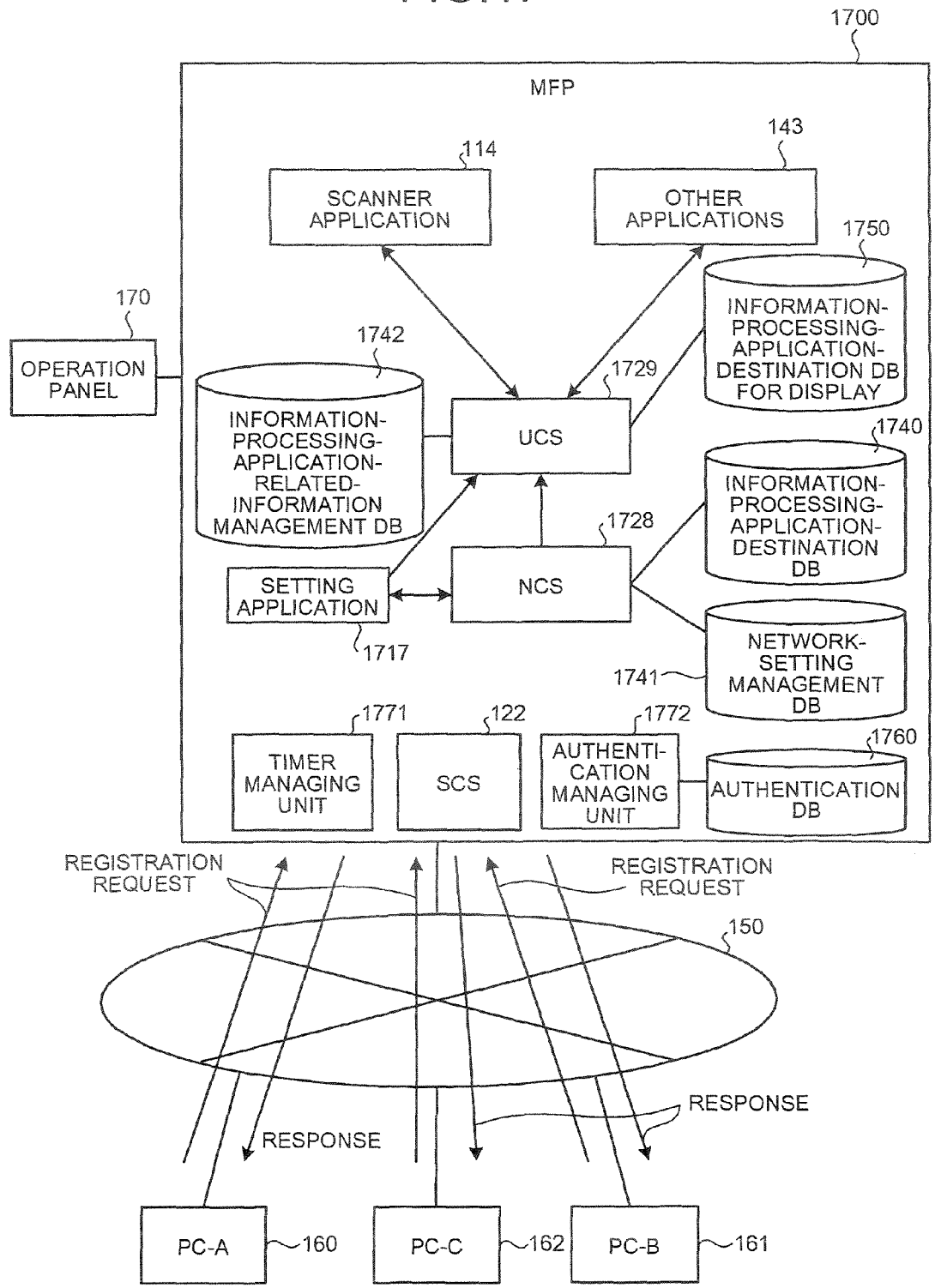
FIG. 17 is a block diagram of a network structure of an image processing system and a main structure of an MFP according to a third embodiment of the present invention.

FIG. 17 is a block diagram of a network structure of an image processing system and a main structure of an MFP according to the third embodiment. As in the first and the second embodiments, in the image processing system according to the third embodiment, an MFP 1700 and a plurality of PCs, the PC-A 160, the PC-B 161, and a PC-C 162, are connected to the network 150 such as the Internet or a local area network (LAN).

As in the first and the second embodiments, the PC-A 160, the PC-B 161, and the PC-C 162 have a hardware configuration in which a normal computer is used.

As in the first and the second embodiments, in the PC-A 160, the PC-B 161, and the PC-C 162, an image-processing-control OS and information processing applications such as a document application and a spreadsheet application running on the image-processing-control OS are installed. The image-processing-control OS has a function of sending a registration request for an information processing application to the MFP 1700 to cause the MFP 1700 to operate without installing driver software for the MFP 1700 and receive data generated by the MFP 1700. Therefore, the driver software for the MFP 1700 is not installed in the PC-A 160, the PC-B 161, and the PC-C 162. The PC-A 160, the PC-B 161, and the PC-C 162 send a registration request for the information processing application installed to the MFP 1700 on the network. A data structure of the registration request is the same as the registration request in the first and the second embodiments.

The MFP 1700 mainly includes the scanner application 114 that performs scanner processing, a setting application 1717, the other applications 141, a UCS 1729, an NCS 1728, a timer managing unit 1771, an authentication managing unit 1772, an information-processing-application-destination DB 1740, an information-processing-application-destination DB for display 1750, a network-setting management DB 1741, an information-processing-application-related-information management DB 1742, an authentication DB 1760, and the operation panel 170. As shown in FIG. 17, the MFP 1700 receives registration requests from the PC-A 160, the PC-B 161, and the PC-C 162, performs, for example, processing for registering information-processing-application-destination information, and then transmits a response to the PC-A 160, the PC-B 161, and the PC-C 162 from which the registration requests are received.

An overall structure of the MFP 1700 is the same as that of the MFP 100 according to the first and the second embodiments shown in FIG. 4. The MFP 1700 includes the hardware resource 104, the platform 120, and the application 130. The hardware resource 104 and the platform 120 have the same functions as those in the first and the second embodiments except the NCS 1728 and the UCS 1729.

The information-processing-application-destination DB 1740 is a DB in which information on information processing applications installed in the PC-A 160 the PC-B 161, and the PC-C 162 as destinations to which an image scanned by the scanner application 114 is transmitted is registered.

The information-processing-application-destination DB for display 1750 is a DB for registering the information on information processing applications installed in the PC-A 160, the PC-B 161, and the PC-C 162 as destinations to which an image scanned by the scanner application 114 is transmitted and displaying an application selection button and the like on the operation panel 170. The information-processing-application-destination DB for display 1750 is generated from content of the information-processing-application-destination DB 1740.

Details of the information-processing-application-destination DB 1740 and the information-processing-application-destination DB for display 1750 are described later.

The network-setting management DB 1741 is a DB for managing a setting for connecting the MFP 1700 to the network. The network-setting management DB 1741 is a DB in which information such as a flag indicating whether an IP address should be changed, a flag indicating whether a setting of an DNS should be changed, and a flag indicating whether a gateway address should be changed is registered as information for connection to the network.

The information-processing-application-related-information management DB 1742 is a DB for managing information related to information processing applications. The information-processing-application-related-information management DB 1742 registers, for example, a flag indicating presence or absence of use of a destination of an information processing application and the number of registrable destinations of the information processing application.

The authentication DB 1760 is a DB in which user IDs and passwords of users who can use the MFP 1700 are registered.

The information-processing-application-destination DB 1740, the information-processing-application-destination DB for display 1750, the network-setting management DB 1741, the information-processing-application-related-information management DB 1742, and the authentication DB 1760 are stored in a storage medium such as an HD.

FIG. 18 is a diagram for explaining an example of a data structure of the information-processing-application-destination DB 1740 according to the third embodiment. In records of the information-processing-application-destination DB 1740, as shown in FIG. 18, a plurality of pieces of information-processing-application-destination information in which application display names included in registration requests received from the PC-A 160, the PC-B 161, and the PC-C 162 and uniform resource identifiers (URIs) as delivery destinations of the PC-A 160, the PC-B 161, and the PC-C 162 are associated with each other are registered. A record length of the delivery destinations (URIs) is 128 bytes. In this way, in the information-processing-application-destination DB 1740 according to the third embodiment, the delivery destinations are held. Therefore, unlike the first and the second embodiments, a peculiar DB in which delivery destinations are registered is unnecessary. Besides, in each of the records, an application ID, an apparatus ID, and an expiration date (not shown) are included as in the first and the second embodiments.

FIG. 19 is a diagram for explaining an example of a data structure of the information-processing-application-destination DB for display 1750 according to the third embodiment. As shown in FIG. 19, the information-processing-application-destination DB for display 1750 includes a master table 1751 and a plurality of header tables 1752.

The master table 1751 is a table in which records that associate application IDs, application display names, and delivery destinations (URIs) can be sequentially written. It is possible to write maximum fifty records in the master table 1751. The records are arranged in order from an oldest record from the top. The application ID and the application display name are the same as those in the first and the second embodiments.

The header tables 1752 are tables in which the application display names are classified according to initial letters of the application display names of the records registered in the master table 1751 and headers are given to the application display names. In each of the header tables 1752, offsets from the top record of the master table 1751 are registered as positional information in the master table 1751 of records having the application display names classified.

As shown in FIG. 19, as the header tables 1752, there are a plurality of tables such as a header table (header: ABC) in which offsets of records with initial letters "A" to "C" of the application display names are registered and a header table (header: DEF) in which offsets of records with initial letters "D" to "F" of the application display names are registered.

Since the information-processing-application-destination DB for display 1750 includes the master table 1751 and the header tables 1752 in this way, it is possible to reduce a memory capacity in processing for searching and processing for displaying an application selection button (an application destination) of the information processing applications.

Referring back to FIG. 17, the NCS 1728 is a process for providing a service, which can be used in common, to the applications such as the scanner application 114 and the other applications 141 on the MFP 1700 that require a network I/O.

The NCS 1728 according to the third embodiment operates as a process for performing, as receiving means, processing for receiving registration requests transmitted from the PC-A 160, the PC-B 161, and the PC-C 162 and transmitting a response to the registration requests and scan data to the PC-A 160, the PC-B 161, and the PC-C 162.

The NCS 1728 performs, as network managing means, processing for extracting an application display name and a delivery destination (URI) from a registration request received, registering a record associating the application display name and the delivery destination extracted in the information-processing-application-destination DB 1740 and updating the information-processing-application-destination DB, checking whether the information-processing-application-destination DB 1740 is updated, and notifying the UCS 1729 of presence or absence of update. Further, the NCS 1728 performs exclusive control for not performing, even when registration requests are received from the PC-A 160, the PC-B 161, and the PC-C 162, update of the information-processing-application-destination DB 1740 based on the registration requests received.

Moreover, as in the first and the second embodiments, the NCS 1728 allocates data received by protocols from the network side to the respective applications and performs mediation in transmitting data from the applications to the network side.

The UCS 1729 operates as a process for performing, as destination managing means, processing for registering the record associating the application IDs and the application display names in the information-processing-application-destination DB for display 1750 from information-processing-application-destination information (records) for display recorded in the information-processing-application-destination DB 1740 and updating the information-processing-application-destination DB for display 1750 and transmitting, with inter-process communication, update start notification and update completion notification to the application 130 running on the MFP 1700 such as the scanner application 114.

Specifically, the UCS 1729 receives notification of presence or absence of update of the information-processing-application-destination DB 1740 from the NCS 1728. When notification that the information-processing-application-destination DB 1740 is updated is received, the UCS 1729 acquires an application display name and a delivery destination from the information-processing-application-destination DB 1740 and registers a record that associates the application display name and the delivery destination acquired and an application ID in the master table 1751. The UCS 1729 registers an offset from the top record in the master table 1751 of the application display name acquired in the header table 1752 of a header corresponding to an initial letter of the application display name to update the information-processing-application-destination DB 1740. On the other hand, when notification that the information-processing-application-destination DB 1740 is not updated is received from the NCS 1728, the UCS 1729 performs processing for notifying the application 130 that the information-processing-application-destination DB for display 1750 is not changed.

As timing for updating the information-processing-application-destination DB 1740 by the UCS 1729, update is performed according to a request by the user (manual update) or update is automatically performed at predetermined timing (automatic update).

In the case of manual update, the user presses an update button from the application screen displayed on the operation panel 170 by the application 130 such as the scanner application 114. Consequently, a request for update of the information-processing-application-destination DB 1740 is transmitted to the application 130. When the UCS 1729 receives such an update request, the UCS 1729 updates the information-processing-application-destination DB 1740 as described above.

In the case of the automatic update, when at least one of change of the information-processing-application-related-information management DB 1742, switching of the application 130 to be executed, and elapse of a timer set time decided in advance occurs, the UCS 1729 updates the information-processing-application-destination DB 1740 as described above.

The UCS 1729 performs exclusive control for not updating, even when an update request for the information-processing-application-destination DB 1740 is received, the information-processing-application-destination DB 1740 based on the update request received while the information-processing-application-destination DB 1740 is updated and while an application display name is read from the information-processing-application-destination DB 1740.

The UCS 1729 performs processing for searching for, when an instruction for searching for an information processing application is received from the user together with a search condition through the operation panel 170, a record having an application display name corresponding to a destination of the information processing application satisfying the search condition from the information-processing-application-destination DB 17409. The UCS 1729 performs processing for generating, in a storage medium such as a RAM, a search-result table in which positional information in the master table 1751 of a record including the application display name can be registered as a search result and registering an offset from the top record in the master table 1751 of the record in the search-result table.

The UCS 1729 performs processing for performing authentication processing for a user who logs in the MFP 1700 with authentication information (a user ID and a password) in the authentication DB 1760. The UCS 1729 also performs processing for determining a storage device in which user information corresponding to a request is stored, acquiring user information from the storage device determined, and supplying the user information to the respective applications.

The SCS 122 has the same function as that in the first and the second embodiments. The SCS 122 operates as a process for executing processing for changing the information-processing-application-related-information management DB 1742, processing for switching the application 130 executed in the MFP 1700, and processing for controlling the normal mode and the energy saving mode.

The timer managing unit 1771 is a processing unit that determines elapse of the timer set time stored in the information-processing-application-related-information management DB 1742.

The authentication managing unit 1772 is a processing unit that transmits, when an authentication result of the user is received from the UCS 1729 and the authentication result is a success, a login notification message to the application 130, the UCS 1729, and the NCS 1728 with inter-process communication.

The timer managing unit 1771 and an authentication managing unit 1722 may be constituted as the application 130 or the control service.

The setting application 1717 is the application 130 that registers information related to an information processing application, for example, a flag indicating presence or absence of use of a destination of the information processing application and the number of registrable destinations of the information processing application in the information-processing-application-related-information management DB 1742.

As in the first and the second embodiments, the OCS 126 as display control means is dynamically linked to the application 130 executed on the MFP 1700 such as the scanner application 114. Therefore, the application 130 performs, as the display control means, processing described below other than the processing peculiar to the respective applications.

The application 130 performs processing for reading an application display name of a record registered in the information-processing-application-destination DB for display 1750 and displaying an application screen, on which the application display name read is rendered to allow the user to input the application display name, on the operation panel 170. Specifically, the application 130 reads a header and reads an application display name registered in the master table 1751 based on an offset registered in the header table 1752 of the information-processing-application-destination DB for display 1750 of the header and displays an application screen, on which the header and the application display name read are rendered to allow the user to input the header and the application display name, on the operation panel 170.

The application 130 transmits an update request to the NCS 1728 when an instruction for update of the information-processing-application-destination DB for display 1750 is received from the user via the OCS 126 according to press of the update button on the application screen displayed on the operation panel 170.

The application 130 maintains the application screen displayed without changing the display of the application screen displayed on the liquid crystal display unit of the operation panel 170 when it is notified from the UCS 1729 that the information-processing-application-destination DB for display 1750 is not updated. Consequently, even when an update request is performed in a state in which the application selection button is pressed, if the information-processing-application-destination DB for display 1750 is not updated, a state of selection of the application selection button is maintained.

Figure 20:
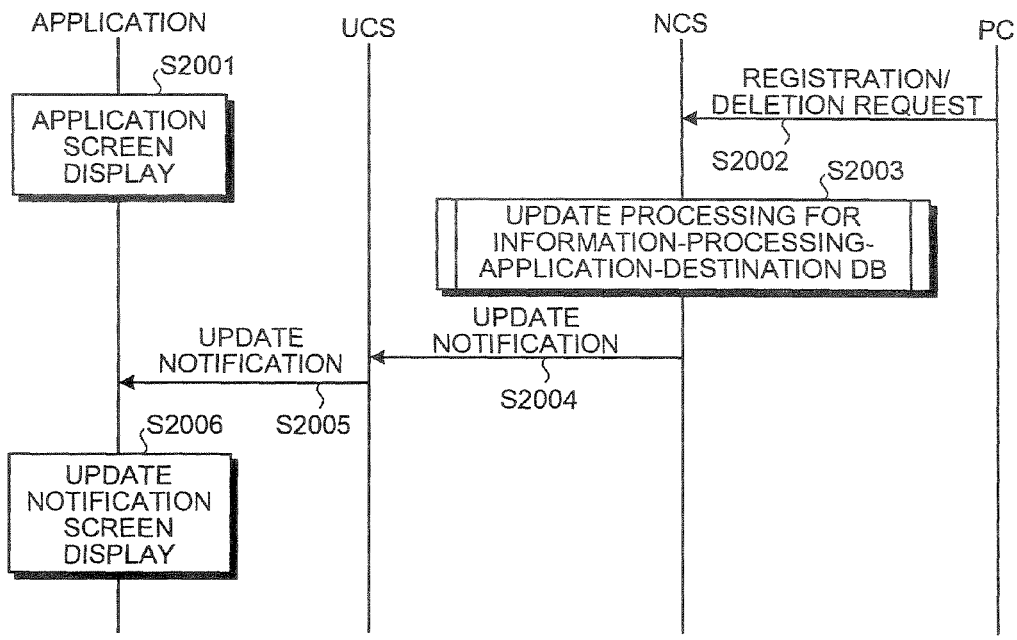
FIG. 20 is a sequence chart of a procedure of processing for notifying update when a request for registration or deletion of an information processing application is received according to the third embodiment.

FIG. 20 is a sequence chart of a procedure of processing for notifying update when a request for registration or deletion of an information processing application is received. In the figures following FIG. 20, the PC-A 160, the PC-B 161, and the PC-C 162 are represented as "PC" and the application 130 such as the scanner application 114 is represented as "application".

Figure 21:
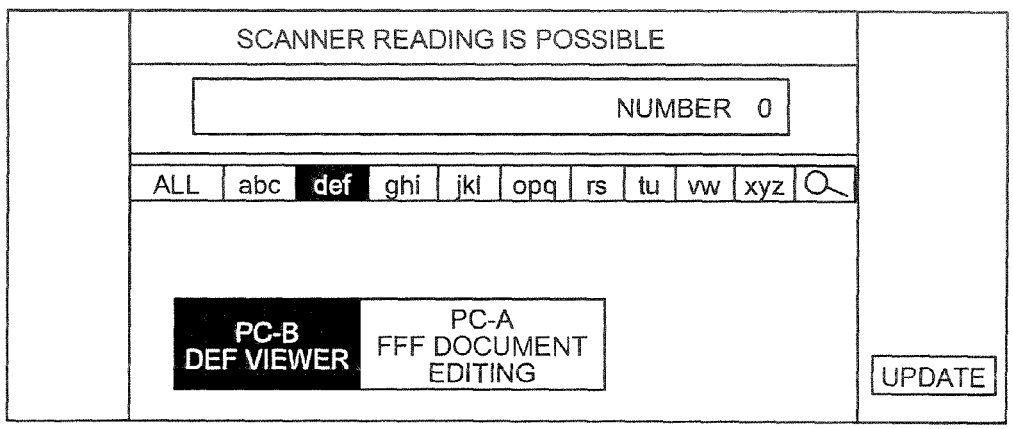
FIG. 21 is a diagram for explaining an example of an application screen according to the third embodiment.

In the MFP 1700, an application screen is displayed on the liquid crystal display unit of the operation panel 170 by the application 130 being executed at present (step S2001). FIG. 21 is a diagram for explaining an example of an application screen. As shown in FIG. 21, a list of headers such as "abc" and "def" is displayed on the application screen. An application display name of a record registered in the header table 1752 of the header "def" designated is displayed as an application selection button. In FIG. 21, a state in which an application selection button of "PC-B DEF viewer" is selected is shown.

When this application screen is displayed on the liquid crystal display unit of the operation panel 170, if a registration/deletion request message is transmitted from the PC-A 160, the PC-B 161, and the PC-C 162, the NCS 1728 receives the registration/deletion request message (step S2002). The NCS 1728 performs processing for updating the information-processing-application-destination DB 1740 (step S2003). Details of the processing for updating the information-processing-application-destination DB 1740 are described later.

When the processing for updating the information-processing-application-destination DB 1740 is completed, contents of the information-processing-application-destination DB 1740 and the information-processing-application-destination DB for display 1750 coincide with each other. Thus, the NCS 1728 transmits, with inter-processing communication, a message of update notification to the UCS 1729 (step S2004).

The UCS 1729 receives the update notification message and transmits the update notification message to the application 130 being executed at present (step S2005).

Figure 23:
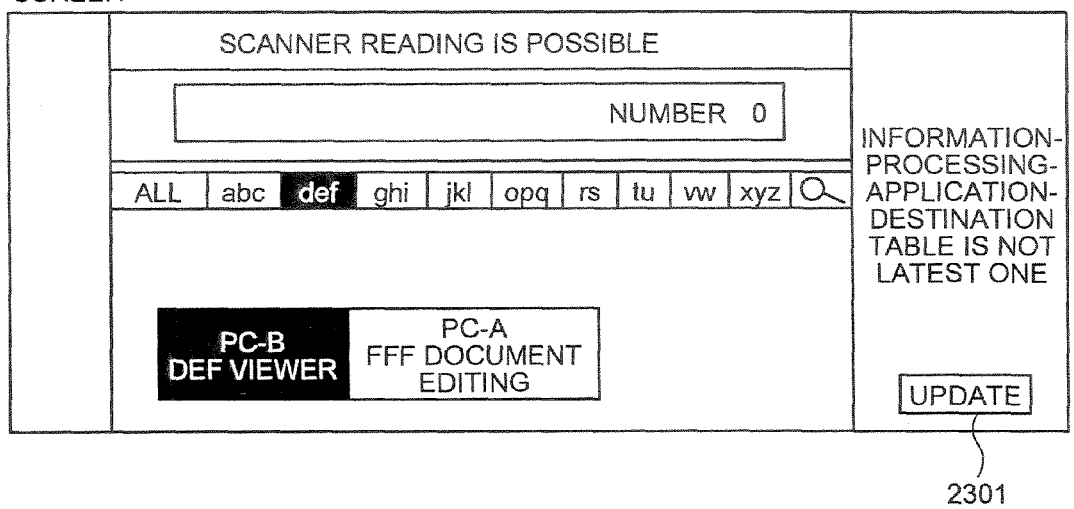
FIG. 23 is a diagram for explaining an example of an application screen on which a message of update notification is displayed.

The application 130 receives the update notification message and displays an update notification screen on the liquid crystal display unit of the operation panel 170 (step S2006). FIG. 23 is a diagram for explaining an example of the update notification screen. As shown in FIG. 23, on the update notification screen, as a result of reception of the update notification message, a message "the information-processing-application-destination table is not a latest one" is displayed to indicate that the information-processing-application-destination DB for display 1750 and the information-processing-application-destination DB 1740 do not coincide with each other.

Figure 22:
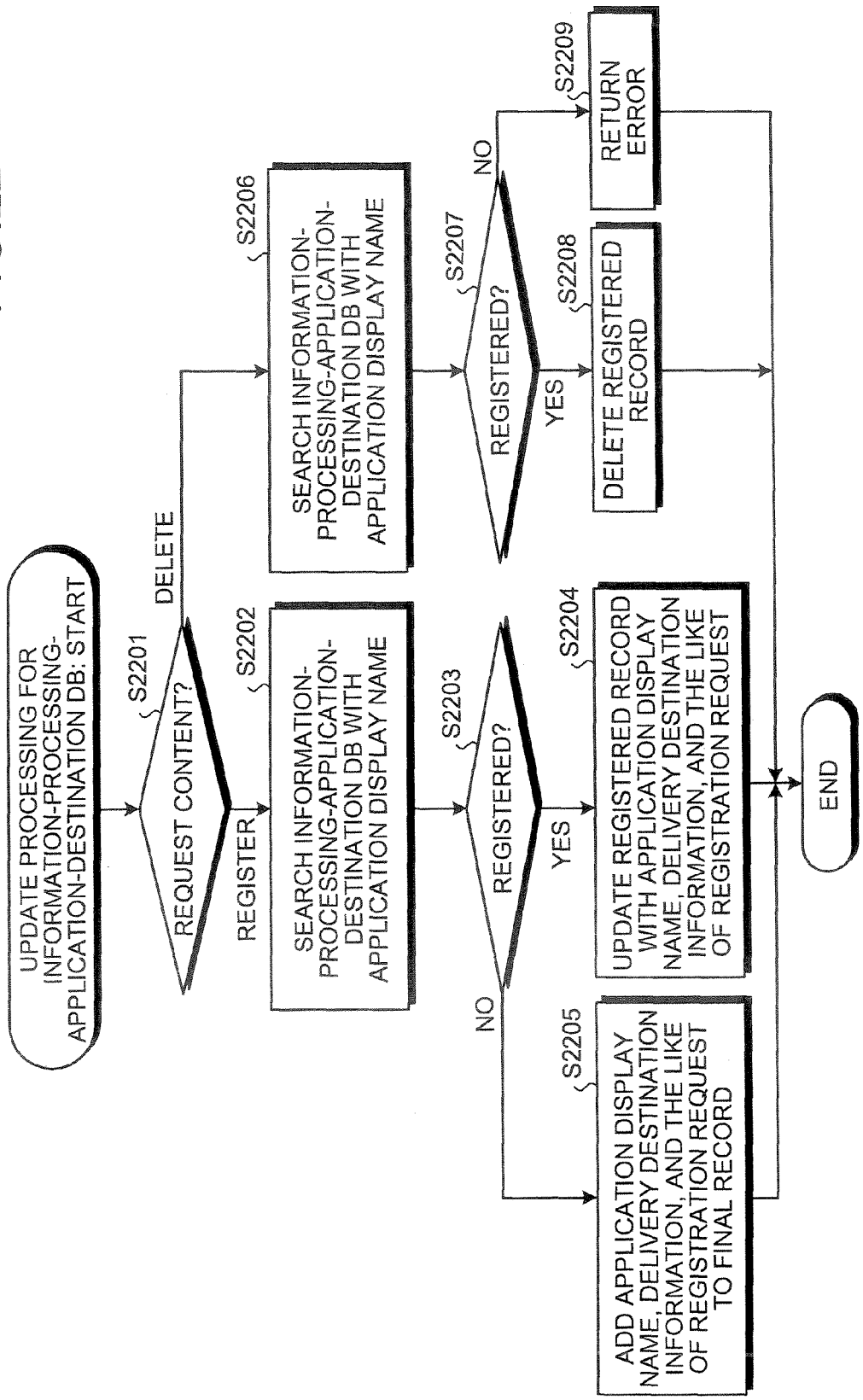
FIG. 22 is a flowchart of a procedure of processing for updating the information-processing-application-destination DB according to the third embodiment.

FIG. 22 is a flowchart of a procedure of processing for updating the information-processing-application-destination DB 1740.

First, the NCS 1728 checks content of a request of the registration/deletion request message received from the PC-A 160, the PC-B 161, or the PC-C 162 (step S2201). When the content of the request is a registration request, the NCS 1728 searches through the information-processing-application-destination DB 1740 with an application display name included in a registration/deletion high-order message of the registration request received (step S2202). The NCS 1728 determines whether the application display name is found, i.e., record including the application display name included in the message received is registered (step S2203).

As a result, when the record is registered ("Yes" at step S2203), the NCS 1728 updates the registered record with a record including an application display name, a delivery destination, and the like of the registration request message (step S2204).

On the other hand, when the record is not registered at step S2203 ("No" at step S2203), the NCS 1728 adds the record including the application display name and the delivery destination of the registration request message in a last record of the information-processing-application-destination DB 1740 (step S2205).

Referring back to step S2201, when the content of the request of the registration request message is a deletion request, the NCS 1728 searches through the information-processing-application-destination DB 1740 with an application display name included in the registration/deletion request message of the deletion request (step S2206). The NCS 1728 determines whether the application display name is found, i.e., a record including the application display name included in the message received is registered (step S2207).

As a result, when the record is registered ("Yes" at step S2207), the NCS 1728 deletes the registered record (step S2208). On the other hand, when the record is not registered at step S2207 ("No" at step S2207), the NCS 1728 transmits a response of error to the PC-A 160, the PC-B 161, or the PC-C 162, which is a transmission source of the registration/deletion request message (step S2209).

As described above, when the registration/deletion request message for the information processing application is received from the PC-A 160, the PC-B 161, or the PC-C 162, the information-processing-application-destination DB 1740 is updated by the NCS 1728.

Figure 24:
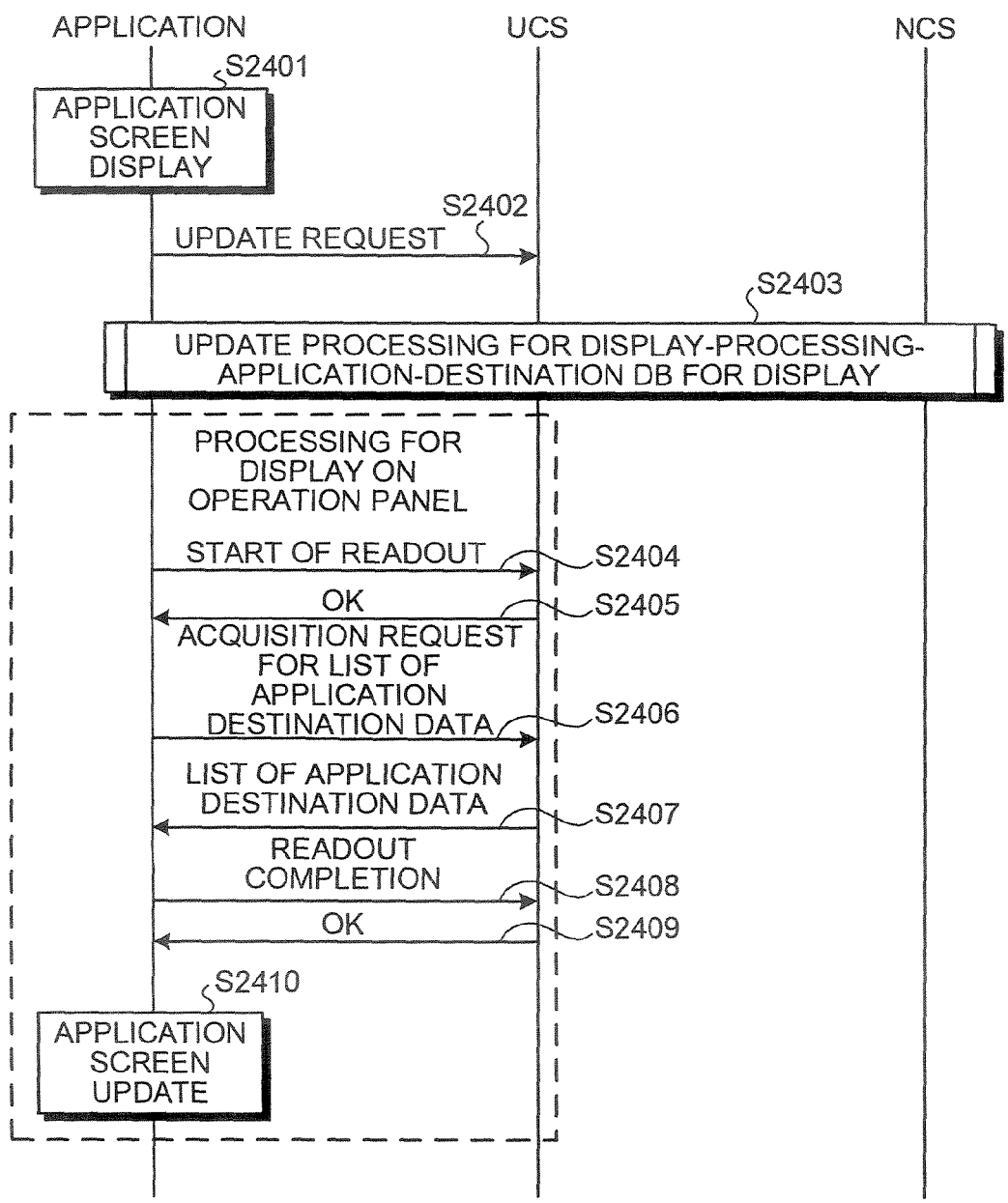
FIG. 24 is a sequence chart of a procedure of processing for manually updating an information-processing-application-destination DB for display shown in FIG. 17.

FIG. 24 is a sequence chart of a procedure of processing for manually updating the information-processing-application-destination DB for display 1750.

Figure 27:
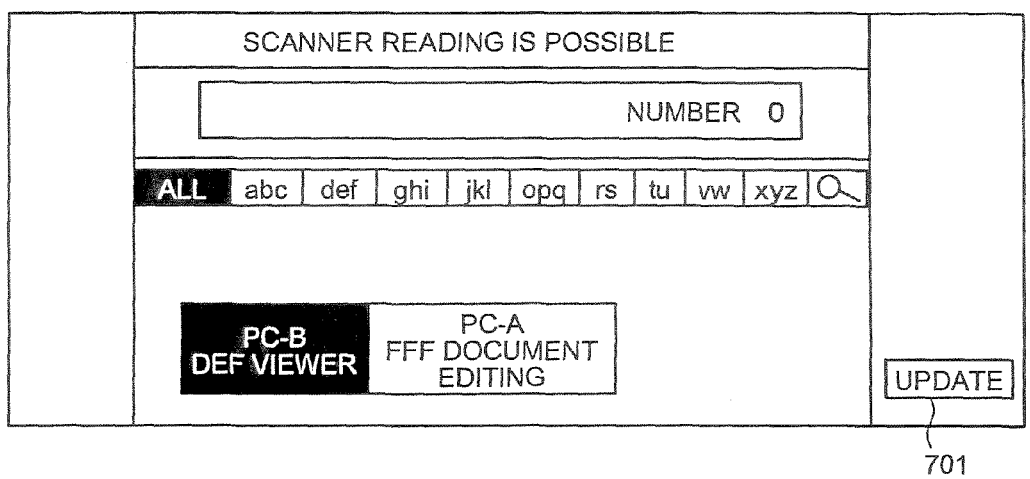
FIG. 27 is a diagram for explaining an example of an application screen.

In the MFP 1700, an application screen shown in FIG. 27 is displayed on the liquid crystal display unit of the operation panel 170 by the application 130 being executed at present (step S2401).

The application 130 receives notification of update of the information-processing-application-destination DB 1740 from the UCS 1729 and the message shown in FIG. 23 is displayed. Consequently, the user can grasp that, as a result of update of the information-processing-application-destination DB 1740, the information-processing-application-destination DB for display 1750 is not a latest one.

Therefore, to update the information-processing-application-destination DB for display 1750 to a latest state, the user touches and inputs an update button 701 on the application screen shown in FIG. 27. The touch input of the update button is received by the application 130 via the OCS 126. The application 130 transmits an update request message to the UCS 1729 (step S2402).

Figure 25:
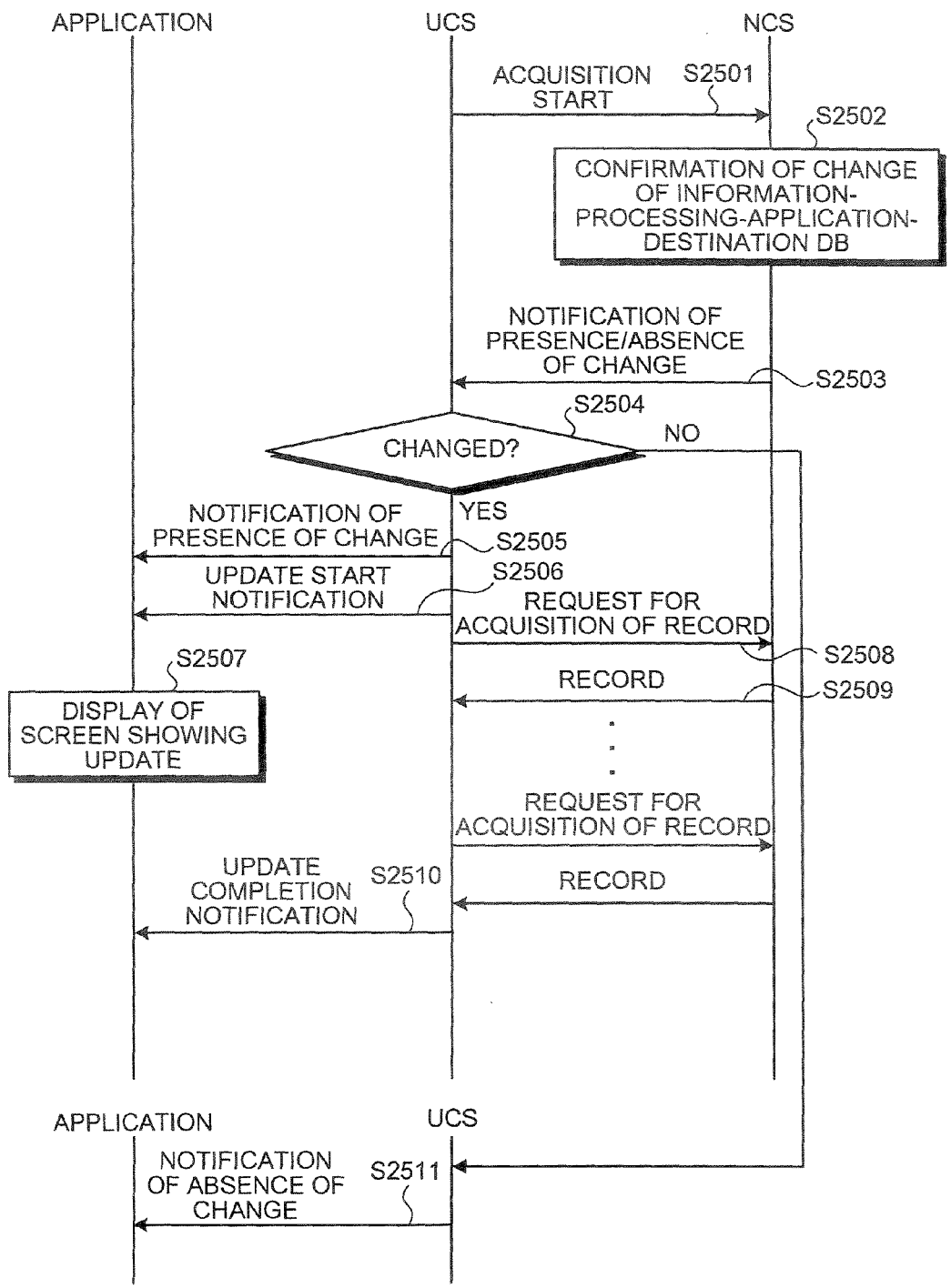
FIG. 25 is a sequence chart of the procedure of the processing for updating the information-processing-application-destination DB for display.

When the UCS 1729 receives the update request message, the UCS 1729 executes processing for updating the information-processing-application-destination DB for display 1750 (step S2403). FIG. 25 is a sequence chart of a procedure of processing for updating the information-processing-application-destination DB for display 1750.

When the UCS 1729 receives the update request message, the UCS 1729 transmits an acquisition start message, which indicates that acquisition of content of the information-processing-application-destination DB for display 1750 is started, to the NCS 1728 (step S2501). The NCS 1728 receives the acquisition start message and checks whether the information-processing-application-destination DB 1740 is changed (step S2502). Specifically, the NCS 1728 checks whether a registration/deletion request message is received from the PC-A 160, the PC-B 161, or the PC-C 162 after the NCS 1728 transmits notification of presence or absence of change to the UCS 1729.

The NCS 1728 transmits a notification message of presence or absence of change of the information-processing-application-destination DB 1740 to the UCS 1729 (step S2503).

The UCS 1729 receives the notification message of presence or absence of change. The UCS 1729 checks, from content of the message received, whether the information-processing-application-destination DB 1740 is changed (step S2504). When the information-processing-application-destination DB 1740 is not changed ("No" at step S2504), the UCS 1729 transmits a notification message of absence of change to the application 130 (step S2511).

On the other hand, when the information-processing-application-destination DB 1740 is changed at step S2504 ("Yes" at step S2504), the UCS 1729 transmits a notification message of presence of change to the application 130 (step S2505). The UCS 1729 transmits an update start notification message to the information-processing-application-destination DB 1740 (step S2506).

Figure 28:
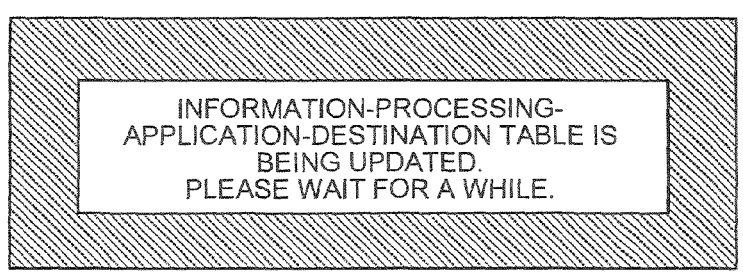
FIG. 28 is a diagram for explaining an example of an update screen.

When the application 130 receives the update start notification message, the application 130 displays an update screen shown in FIG. 28 on the liquid crystal display unit of the operation panel 170 (step S2507).

On the other hand, the UCS 1729 receives the update start notification message and transmits a message for acquisition of a record in the information-processing-application-destination DB 1740 to the NCS 1728 (step S2508). The NCS 1728 reads a record from the information-processing-application-destination DB 1740 in response to the request message and transmits the record read to the UCS 1729 (step S2509). Such processing for transmission of the record acquisition request message and the record is repeated for all the records in the information-processing-application-destination DB 1740. The UCS 1729 receives the record and registers the record received in the information-processing-application-destination DB for display 1750.

Figure 26:
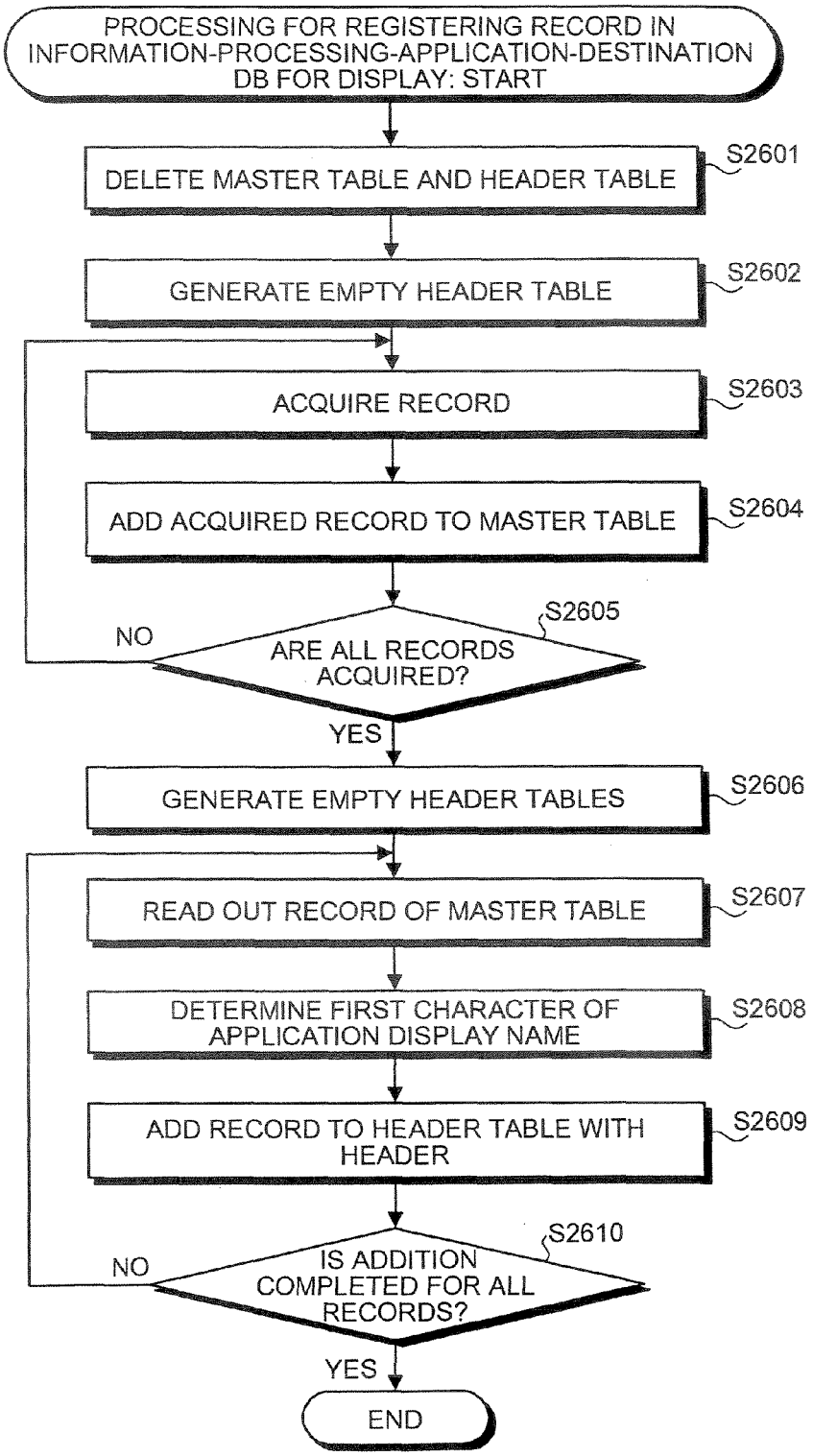
FIG. 26 is a flowchart of a procedure of processing for registering a record in the information-processing-application-destination DB for display.

FIG. 26 is a flowchart of a procedure of processing for registering a record in the information-processing-application-destination DB for display 1750. First, the UCS 1729 deletes the existing master table 1751 and all the header tables 1752 from the storage medium such as an HD (step S2601). The UCS 1729 generates an empty master table 1751 in the storage medium such as an HD (step S2602).

The UCS 1729 acquires a record (information-processing-application-destination information) in the information-processing-application-destination DB 1740 from the NCS 1728 according to steps S2508 and S2509 (step S2603). The UCS 1729 adds the record acquired to the master table 1751 (step S2604).

The UCS 1729 repeatedly executes the processing for acquisition of a record (step S2603) and additional registration of the record acquired in the master table 1751 (step S2604) until all the records in the information-processing-application-destination DB 1740 are acquired (step S2605).

When the acquisition of all the records is completed ("Yes" at step S2605), the UCS 1729 generates empty header tables 1752 in the storage medium such as an HD by the number of headers to be classified (step S2606).

The UCS 1729 reads the record (information-processing-application-destination information) registered in the master table 1751 (step S2607). The UCS 1729 determines an initial letter of an application display name included in the record read (step S2608). The UCS 1729 adds an offset from the top record in the master table 1751 of the record in the header table 1752 of a header corresponding to the initial letter as a record (step S2609).

The UCS 1729 executes the processing at steps S2607 to S2609 on all the record registered in the master table 1751 (step S2610). As described above, the processing for registering a record in the information-processing-application-destination DB for display 1750 is performed and the update of the information-processing-application-destination DB for display 1750 is completed.

Referring back to FIG. 25, when all the records are transmitted, the UCS 1729 transmits an update completion notification message, which indicates that the update of the information-processing-application-destination DB for display 1750 is completed, to the application 130 (step S2510). In this way, the processing for updating the information-processing-application-destination DB for display 1750 is completed.

Referring back to FIG. 24, when the processing for updating the information-processing-application-destination DB for display 1750 is completed and the application 130 receives the update completion notification message from the UCS 1729, the application 130 performs processing for displaying an application display name of a record registered in the information-processing-application-destination DB for display 1750 on the operation panel 170.

The processing for display on the operation panel 170 is performed as described below. The application 130 transmits a message for requesting start of read of the information-processing-application-destination DB for display 1750 to the UCS 1729 (step S2404). The UCS 1729 transmits a response indicating that the read is possible to the application 130 (step S2405). Then, the application 130 transmits a request for acquisition of a list of records (information-processing-application-destination information for display) in the information-processing-application-destination DB for display 1750 (step S2406). The UCS 1729 reads the information-processing-application-destination DB for display 1750 and transmits the list of the information-processing-application-destination information for display to the application 130 (step S2407). When the list of the information-processing-application-destination information for display is received, since it is possible to display an application selection button, the application 130 transmits a read completion message to the UCS 1729 (step S2408). In response to the read completion message, the UCS 1729 transmits an OK message to the application 130 (step S2409).

Figure 29:
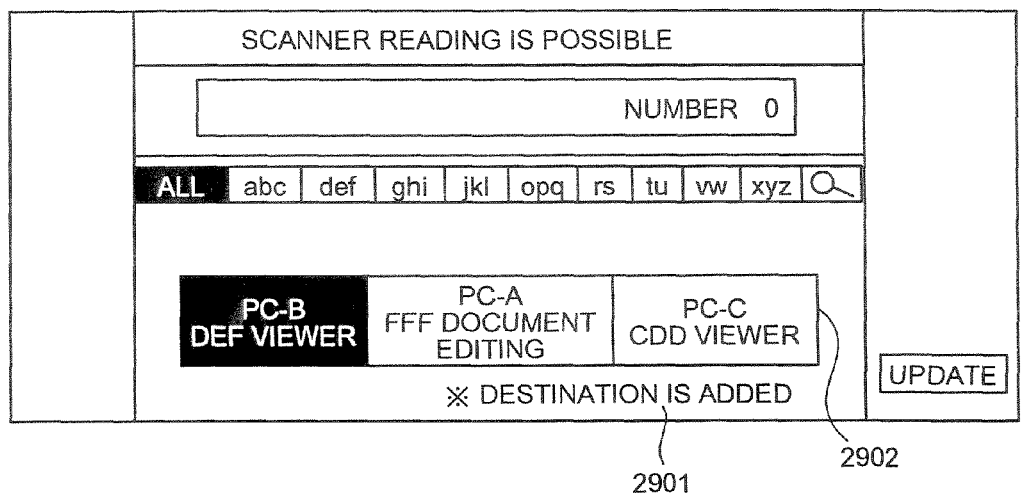
FIG. 29 is a diagram for explaining an example of an application screen updated.

The application 130 updates the application screen displayed on the liquid crystal display unit of the operation panel 170 (step S2410). FIG. 29 is a diagram for explaining an example of the application screen updated. In the updated application screen, as shown in FIG. 29, a message 2901 "a destination is added" and an application selection button 2902, on which the application display name of the information processing application of the record added to the information-processing-application-destination DB for display 1750 updated is rendered, are additionally displayed.

Figure 30:
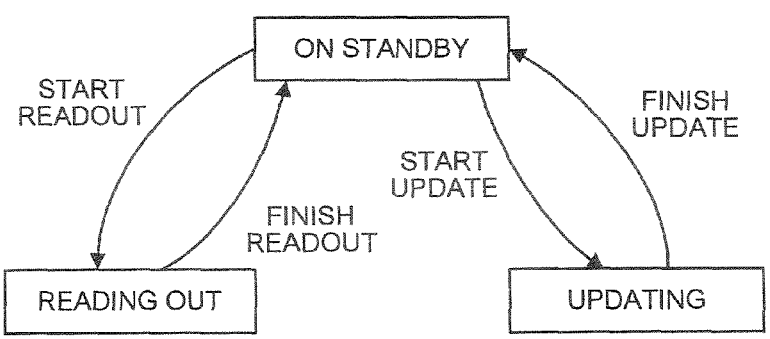
FIG. 30 is a state transition diagram of transition of states that a UCS shown in FIG. 17 can take.

FIG. 30 is a state transition diagram of transition of state that the UCS 1729 can take. As shown in FIG. 30, the UCS 1729 can take three states, namely, on standby, reading, and updating. The UCS 1729 transitions between a state of on standby and a state of reading and between the state of on standby and a state of updating.

The state of updating is a state in which the UCS 1729 is updating the information-processing-application-destination DB for display 1750. In the state of updating, the UCS 1729 can transition to the state of on standby but cannot transition to the state of reading. In FIG. 24, when the UCS 1729 is executing the processing at step S2403, the UCS 1729 is in the state of updating.

The state of reading is a state in which the information-processing-application-destination DB for display 1750 is read by the application 130. In the state of reading, the UCS 1729 can transition to the state of on standby but cannot transition to the state of updating. In FIG. 24, when the UCS 1729 is executing the processing at steps S2404 to S2409, the UCS 1729 is in the state of reading.

The state of on standby is a state in which the information-processing-application-destination DB for display 1750 is neither read nor updated. In the state of on standby, the UCS 1729 can transition to both the state of reading and the state of updating. In FIG. 24, when the UCS 1729 is executing the processing except the processing at step S2403 and the processing at steps S2404 to S2409, the UCS 1729 is in the state of on standby.

When the UCS 1729 is in the state of updating or the state of reading, even when an update request is received from the application 130, the UCS 1729 neglects such an update request and performs the exclusive control for not performing the processing for updating the information-processing-application-destination DB for display 1750.

The NCS 1728 also transitions between states same as the states shown in FIG. 30. When the NCS 1728 is updating the information-processing-application-destination DB 1740 (the state of updating, i.e., when the NCS 1728 is executing the processing at step S2003 in FIG. 20) or when the UCS 1729 is executing read of the information-processing-application-destination DB 1740 (the state of reading, i.e., the UCS 1729 is repeatedly executing the processing at steps S2508 and S2509 in FIG. 25), even if a registration/deletion request message is received from the PC-A 160, the PC-B 161, or the PC-C 162, the NCS 1728 neglects this message and does not perform update of the information-processing-application-destination DB 1740.

The automatic update of the information-processing-application-destination DB for display 1750 is explained. First, various setting contents stored in the information-processing-application-related-information management DB 1742 are explained.

When the user touches and inputs an initial setting key from a menu on a menu screen (not shown) displayed on the operation panel 170, a menu for initial setting is displayed on the liquid crystal display unit. In such a menu, it is possible to set a size of sheets stored. It is possible to move from the menu for initial setting to a setting menu for using the functions of the image-processing-control OS of the PC-A 160, the PC-B 161, or the PC-C 162.

FIGS. 31A and 31B are diagrams for explaining an example of an initial setting menu screen for using the functions of the image-processing-control OS installed in the PC-A 160, the PC-B 161, or the PC-C 162 at a network connection destination. This initial setting menu screen is displayed on the liquid crystal display unit of the operation panel 170 by the setting application 1717 via the OCS 126.

In an example of a screen indicated by (1) shown in FIG. 31, in "use of delivery from PC at connection destination", the user sets whether the functions of the image-processing-control OS installed in the PC (e.g., the PC-A 160, the PC-B 161, or the PC-C 162) should be used. In "automatic update of delivery destination of PC at connection destination", the user sets whether the information-processing-application-destination DB for display 1750 should be automatically update according to a request for registration or deletion of an information processing application transmitted from the PC-A 160, the PC-B 161, or the PC-C 162. In a maximum storage number, a maximum value of the number of records that can be stored by the information-processing-application-destination DB for display 1750 is designated. It is possible to set fifty records at the maximum. These setting contents are stored in the information-processing-application-related-information management DB 1742 by the SCS 122 according to a request including the setting contents of the setting application 1717. In an explanation of processing described later, it is assumed that these settings are valid.

In the example of the screen indicated by (1) shown in FIG. 31, when the setting application 1717 receives a touch input of a change button for setting automatic update timing, an example of a screen indicated by (2) shown in FIG. 31 is displayed.

In the example of the screen indicated by (2) shown in FIG. 31, the user sets timing for updating the information-processing-application-destination DB for display 1750. In the example of the screen indicated by (2) shown in FIG. 31, it is possible to set whether automatic update should be performed for each of "setting change related to information application", "setting change related to network", "change application", "individual login", and "power supply restoration".

In the item of "timer set time", it is possible to set a timer set time in performing automatic update according to timer setting or set that automatic update by timer setting is not performed.

It is possible that the information-processing-application-destination DB for display 1750 of the information processing application is displayed or not displayed depending on a state of the network. Since update is performed so frequently, loads on the memory and the network increase. In this case, it is conceivable that some users may consider that update should be performed only when a transmission error occurs rather than always displaying an accurate destination. Thus, it is possible to set update timing corresponding to a request of the user by performing the setting described above. This makes it possible to reduce loads on the memory and the network and establish an environment corresponding to the request of the user.

The initial setting menu screen is not limited to the examples of a screen shown in FIGS. 31A and 31B. Other screens may be used.

Automatic update is executed when at least any one of change of the setting contents of the information-processing-application-related-information management DB 1742, change of the setting contents of the network-setting management DB 1741, and switching of the application 130 executed in the MFP 1700 is executed, when the user logs in and succeeds in authentication, or when the MFP 1700 returns to the normal mode from the energy saving mode, or at intervals of the timer set time set on the screen indicated by (1) shown in FIG. 31.

Figure 32:
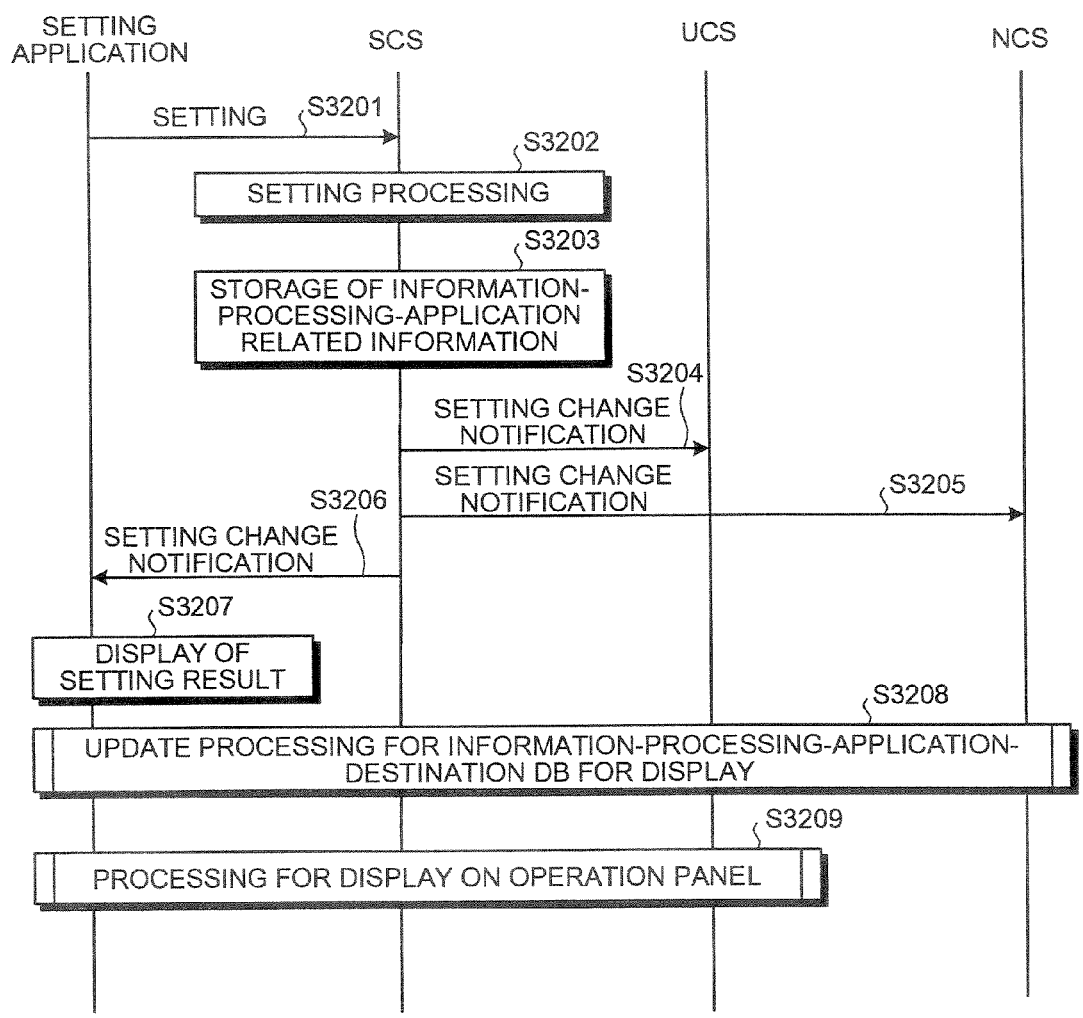
FIG. 32 is a sequence chart of a procedure of processing for automatically updating the information-processing-application-destination DB for display 1750 when setting content in an information-processing-application-related-information management DB shown in FIG. 17 is changed.

FIG. 32 is a sequence chart of a procedure of processing for automatically updating the information-processing-application-destination DB for display 1750 when the setting contents of the information-processing-application-related-information management DB 1742 are changed.

When setting concerning the PC at a network connection destination is performed from the initial setting menu screen indicated by (1) shown in FIG. 31, the setting application 1717 receives such setting input and transfers setting information to the SCS 122 (step S3201).

Figure 33:
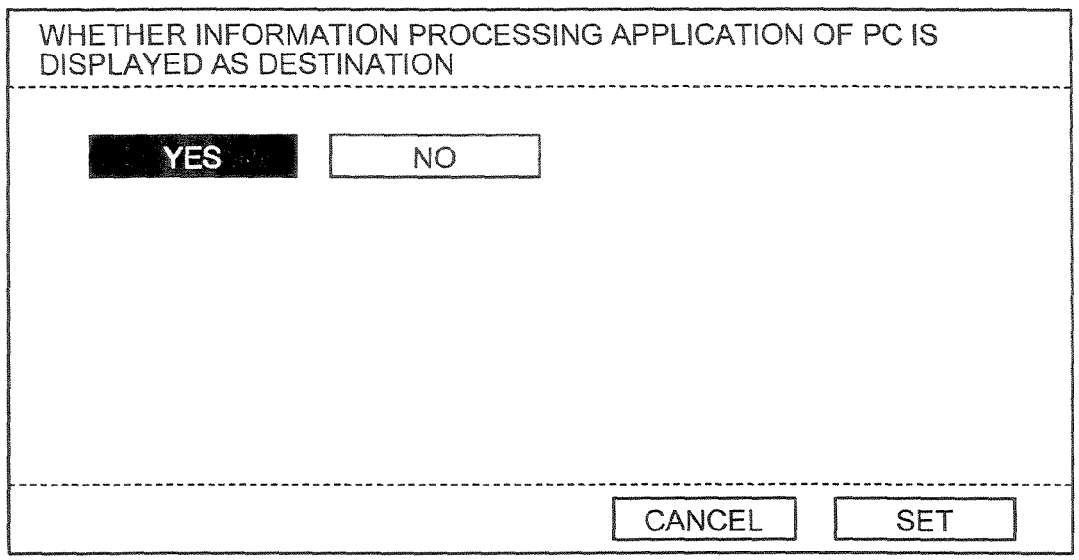
FIG. 33 is a diagram for explaining an example of a screen for changing setting information.

Other than the screen in FIGS. 31A and 31B, a screen for changing setting information shown in FIG. 33 may be displayed to receive setting contents. Such a screen for change is used for setting whether an information processing application destination (an application selection button on which an application display name is displayed) should be displayed for each application. Setting contents of the screen are held in the information-processing-application-related-information management DB 1742.

The setting according to the screen shown in FIG. 33 indicates whether an application is an application that uses the information-processing-application-destination DB for display 1750. Besides, the setting originally includes a setting for not displaying the information processing application destination even if an application is an application that uses the information-processing-application-destination DB for display 1750.

The SCS 122 performs setting processing according to the setting information received (step S3202) and stores the setting information in the information-processing-application-related-information management DB 1742 (step S3203). The SCS 122 transmits a setting change notification message concerning information-processing-application-related information to the UCS 1729, the NCS 1728, and the setting application 1717 (steps S3204 to S3206).

The setting application 1717 displays a setting result on the operation panel 170 (step S3207).

The UCS 1729 executes processing for updating the information-processing-application-destination DB for display 1750, which is the same as the processing explained with reference to FIGS. 25 and 26, and updates the information-processing-application-destination DB for display 1750 (step S3208). Subsequently, the UCS 1729 performs processing for displaying an application screen on the operation panel from the information-processing-application-destination DB for display 1750 updated in the same manner as the processing at steps S2404 to S2410 in FIG. 24 (step S3209). The UCS 1729 updates the application screen and displays an application screen to which an application selection button corresponding the new information processing application is added.

Figure 34:
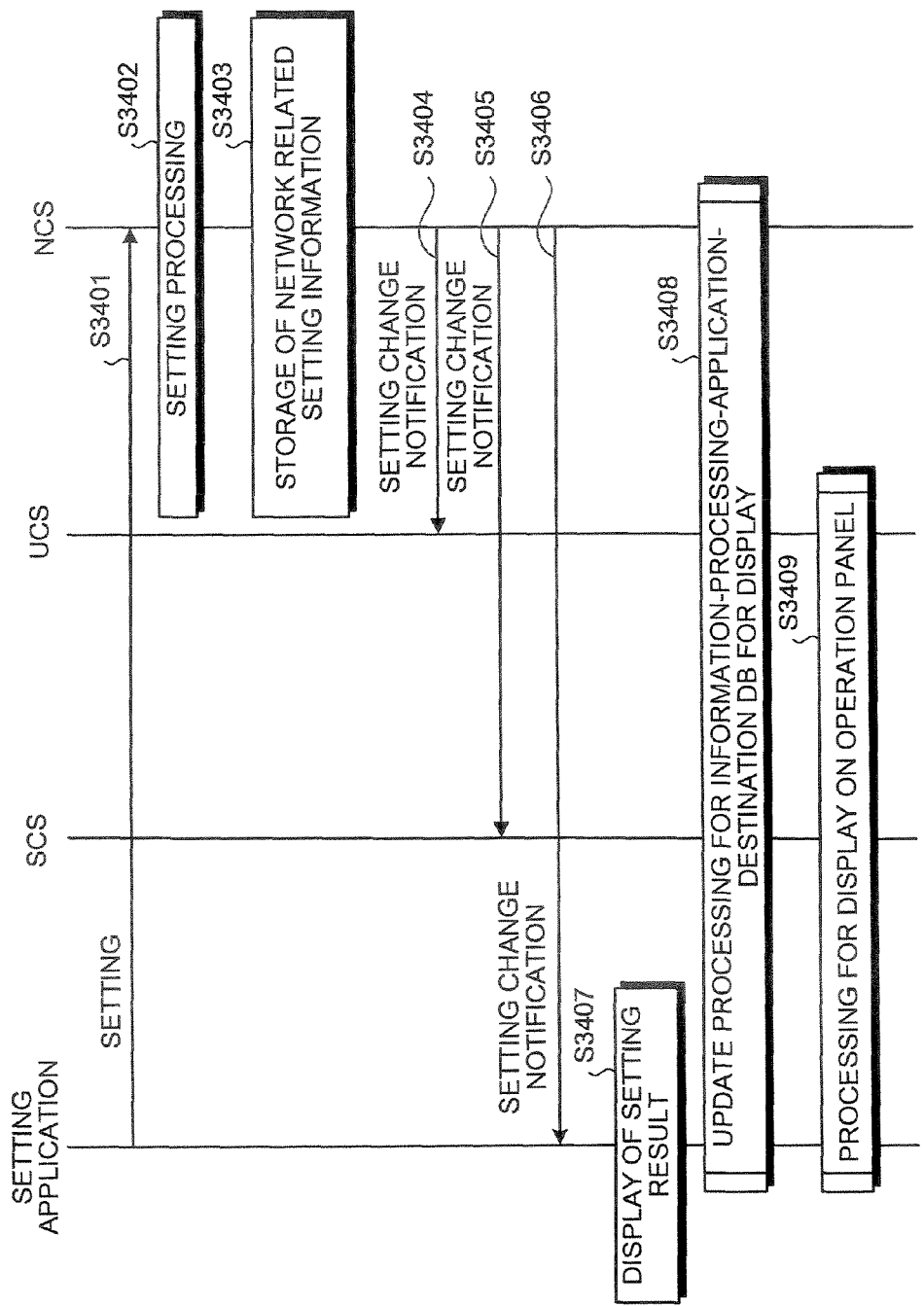
FIG. 34 is a sequence chart of a procedure of processing for automatically updating the information-processing-application-destination DB for display 1750 when network setting information in a network-setting management DB shown in FIG. 17 is changed.

FIG. 34 is a sequence chart of a procedure of processing for automatically updating the information-processing-application-destination DB for display 1750 when network setting information in the network-setting management DB 1741 is changed.

Figure 35:
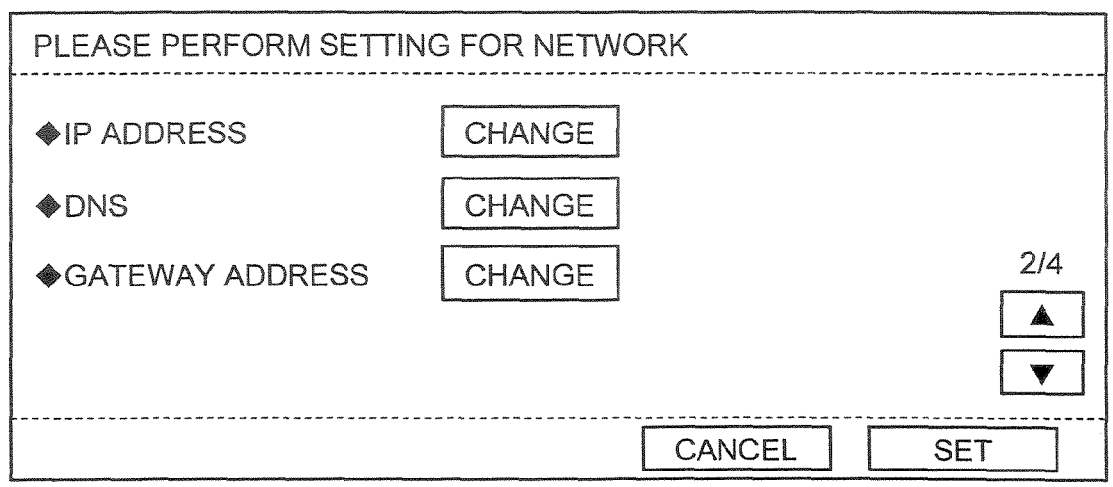
FIG. 35 is a diagram for explaining an example of a network setting screen.

First, the setting application 1717 displays a network setting screen on the liquid crystal display unit of the operation panel 170. FIG. 35 is a diagram for explaining an example of the network setting screen. In the network setting screen, change buttons are displayed for respective items to make it possible to change an IP address, a DNS, and a gateway address of the MFP 1700.

When any one of the change buttons is touched and inputted among these items, the setting application 1717 receives such touch input and transfers, for example, setting information indicating that an IP address is changed to the NCS 1728 (step S3401).

The NCS 1728 performs setting processing according to the setting information received (step S3402) and stores the setting information in the network-setting management DB 1741 (step S3403). The NCS 1728 transmits a setting change notification message concerning the setting information in the network-setting management DB 1741 to the UCS 1729, the SCS 122, and the setting application 1717 (steps S3404 to S3406).

The setting application 1717 displays a result of setting of the network-setting management DB 1741 on the operation panel 170 (step S3407).

The UCS 1729 executes processing for updating the information-processing-application-destination DB for display 1750, which is the same as the processing explained with reference to FIGS. 25 and 26, and updates the information-processing-application-destination DB for display 1750 (step S3408). Subsequently, the UCS 1729 performs processing for displaying an application screen on the operation panel from the information-processing-application-destination DB for display 1750 updated in the same manner as the processing at steps S2404 to S2410 in FIG. 24 (step S3409). The UCS 1729 updates the application screen and displays an application screen to which an application selection button corresponding to the new information processing application is added.

Figure 36:
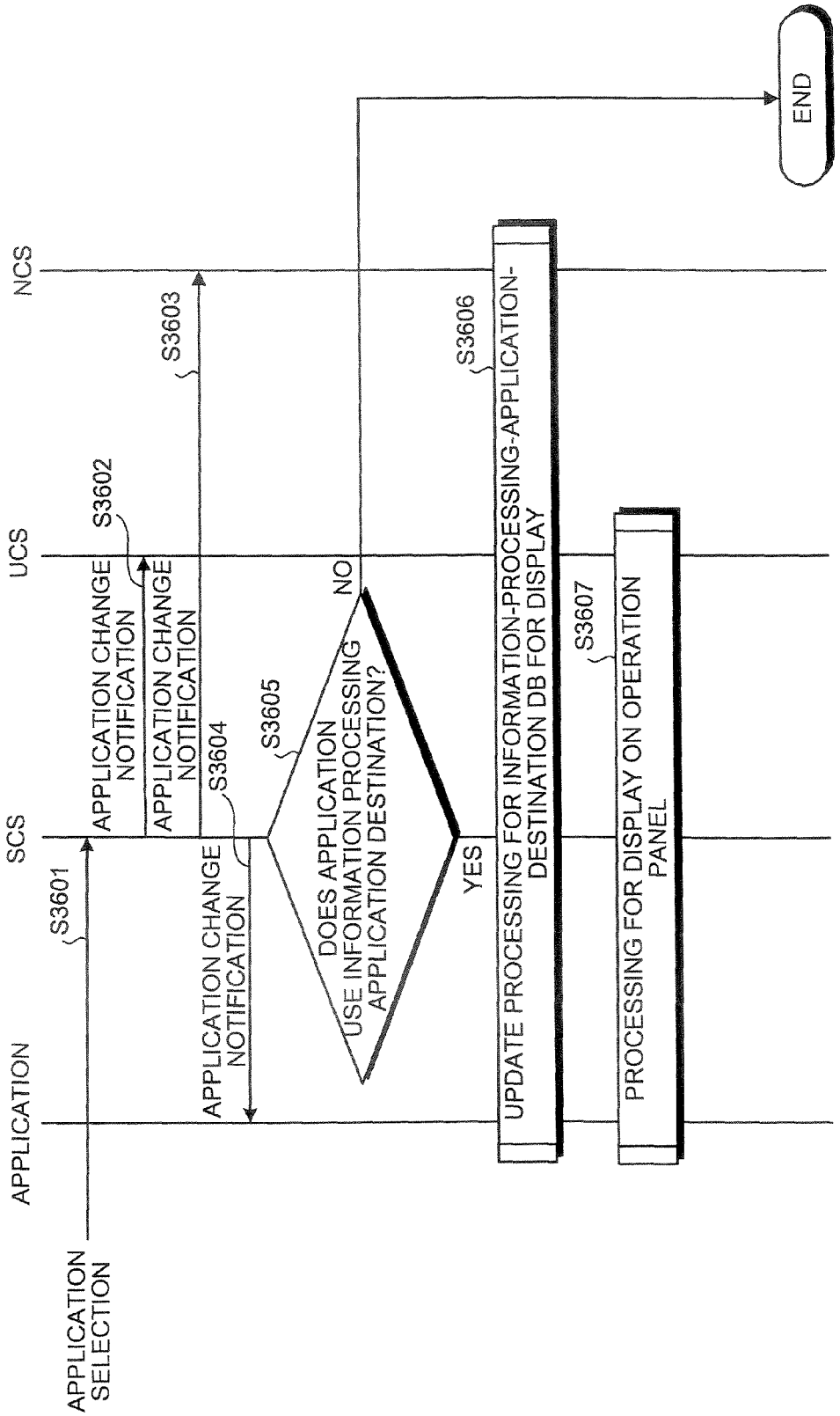
FIG. 36 is a sequence chart of a procedure of processing for automatically updating the information-processing-application-destination DB for display when an application being executed is switched.

FIG. 36 is a sequence chart of a procedure of processing for automatically updating the information-processing-application-destination DB for display 1750 when the application 130 being executed is switched.

When the user selects the application 130 from the operation panel 170, the operation panel 170 transmits an application change notification message indicating the selection of the application to the SCS 122 (step S3601).

The SCS 122 receives the application change notification message and transmits the application change notification message to the UCS 1729 and the NCS 1728 (steps S3602 and S3603). Subsequently, the SCS 122 transmits the application change notification message to the application 130 designated by the change notification (step S3604) and starts the application 130 designated. Consequently, the application 130 designated by the user is executed.

The SCS 122 determines whether the application 130 changed is the application 130 that uses an information processing application destination (step S3605). When it is determined that the application 130 changed is the application 130 that uses the information processing application destination ("Yes" at step S3605), to perform automatic update, the SCS 122 executes processing for updating the information-processing-application-destination DB for display 1750, which is the same as the processing explained with reference to FIGS. 25 and 26, and updates the information-processing-application-destination DB for display 1750 (step S3606).

Subsequently, the UCS 1729 performs processing for displaying an application screen on the operation panel from the information-processing-application-destination DB for display 1750 updated in the same manner as the processing at steps S2404 to S2410 in FIG. 24 (step S3607). The UCS 1729 updates the application screen and displays an application screen to which an application selection button corresponding to the new information processing application is added.

On the other hand, when it is determined in step S3605 that the application 130 changed is not the application 130 that uses the information processing application destination ("No" at step S3605), the SCS 122 finishes the processing without performing automatic update.

Figure 37:
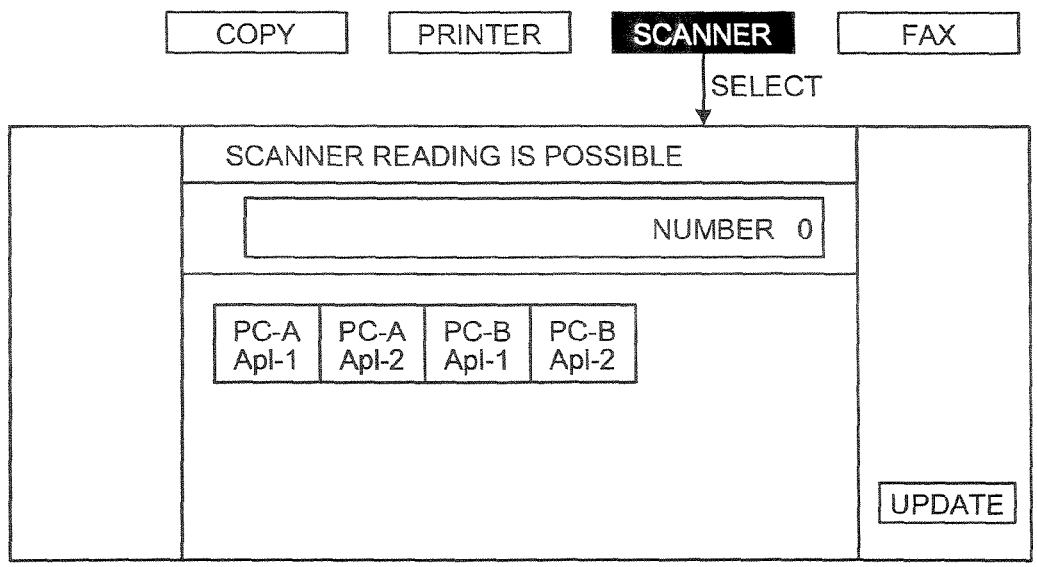
FIG. 37 is a diagram for explaining an example of an application screen of a scanner application displayed when a scanner key provided in an operation unit of an operation panel is pressed.

FIG. 37 is a diagram for explaining an example of an application screen of the scanner application 114 displayed when a scanner key provided in the operation unit of the operation panel 170 is pressed. As shown in FIG. 37, in the example of the application screen of the scanner application 114, it is possible to select information processing applications "PC-A Apl1", "PC-A Apl2", "PC-B Apl1", and "PC-B Apl2" of application display names displayed in a list of information-processing-application-destination information.

Figure 38:
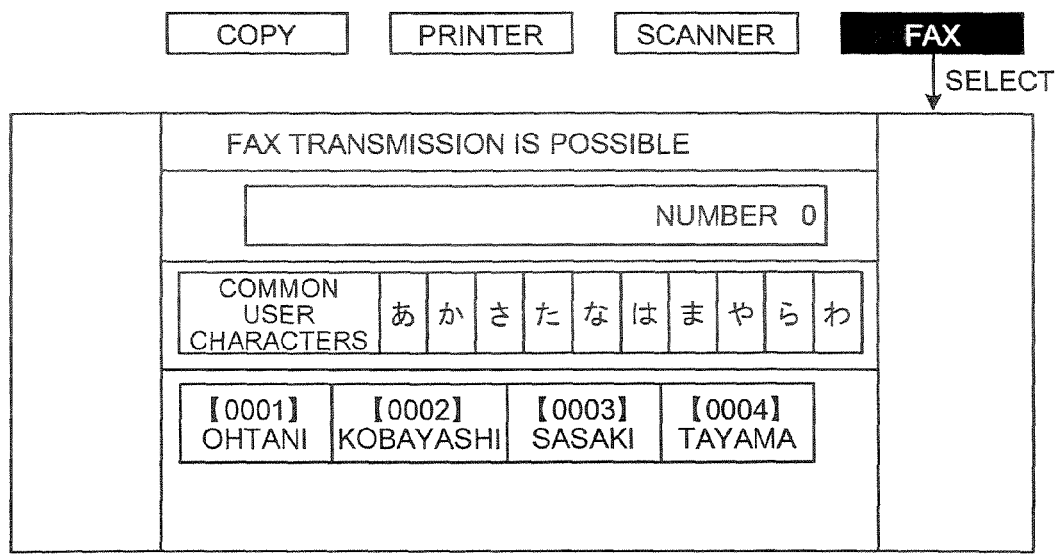
FIG. 38 is a diagram for explaining an example of an application screen of a facsimile (FAX) application displayed when a FAX key of an operation panel shown in FIG. 17 is pressed.

FIG. 38 is a diagram for explaining an example of an application screen of the FAX application 113 displayed when a FAX key of the operation panel 170 is pressed. As shown in FIG. 38, in the example of the screen of the FAX application 113, it is impossible to select an information processing application.

When the information processing application selected in this way is the application 130 that can use an information processing apparatus in the PC-A 160, the PC-B 161, and the PC-C 162 and uses an information processing application destination such as the scanner application 114, i.e., the application 130 that uses the information-processing-application-destination DB for display 1750, automatic update is performed.

On the other hand, when the information processing application is an application that cannot use the information processing application in the PC-A 160, the PC-B 161, and the PC-C 162 or can use the information processing application but does not use an information processing application destination such as the FAX application 113, i.e., the application 130 that does not use such as the scanner application 114 and the information processing application selected in this way is the application 130, automatic update is not performed and the processing is finished.

It is set in advance on the setting screen shown in FIG. 33 whether the application 130 is the application 130 that can use an information processing application and setting information is stored in the information-processing-application-related-information management DB 1742 in advance. In the processing at step S3605, it is determined whether the application 130 changed is the application 130 that uses an information processing application destination with reference to such setting information.

Figure 39:
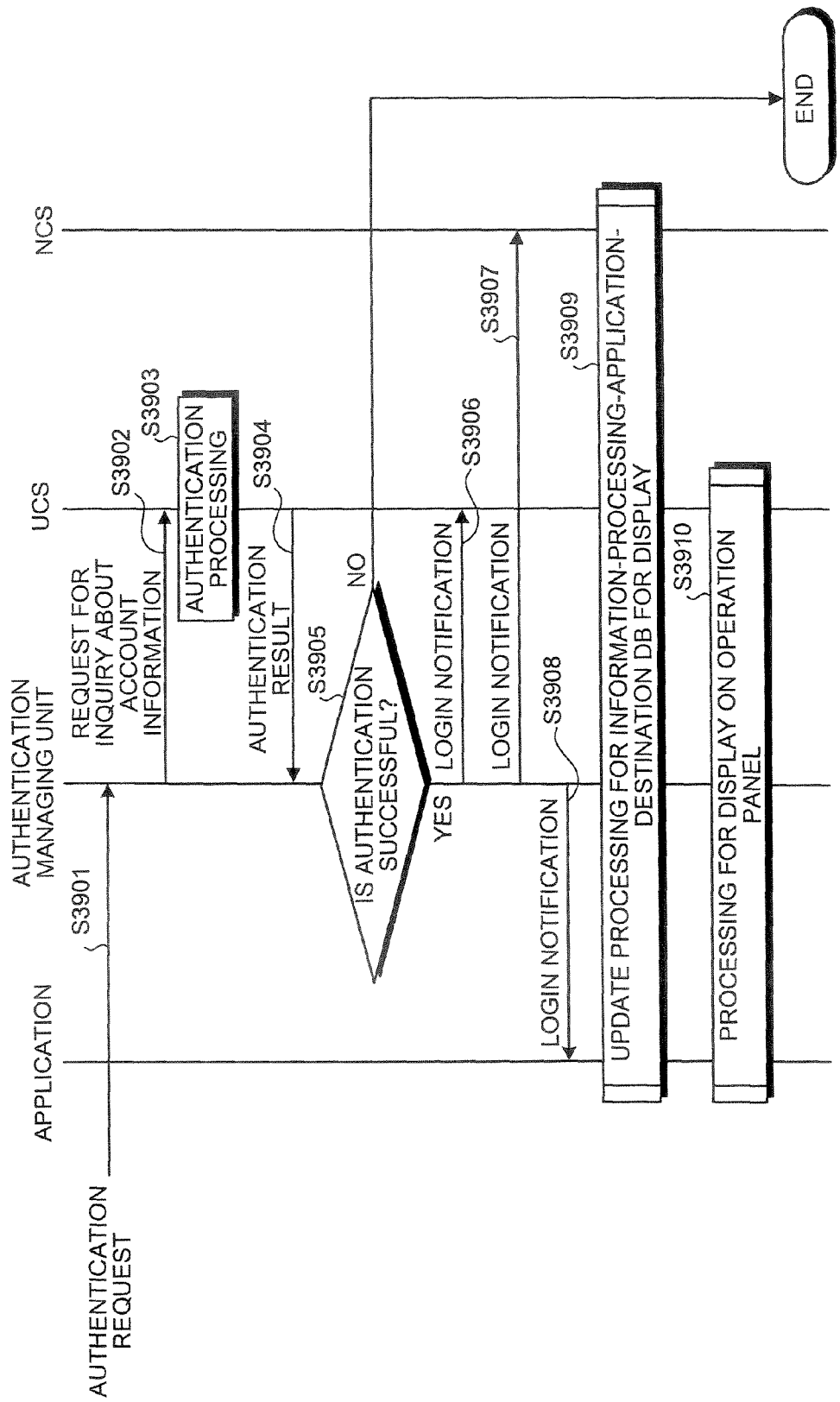
FIG. 39 is a sequence chart of a procedure of processing for automatically updating the information-processing-application-destination DB for display when a user logs in and succeeds in authentication.

FIG. 39 is a sequence chart of a procedure of processing for automatically updating the information-processing-application-destination DB for display 1750 when the user logs in and succeeds in authentication.

When the user performs operation for login from the operation panel 170, the operation panel 170 transmits authentication information indicating this login request to the authentication managing unit 1772 (step S3901). This authentication information includes a user ID and a password of the user who performed the operation for login.

Figure 40:
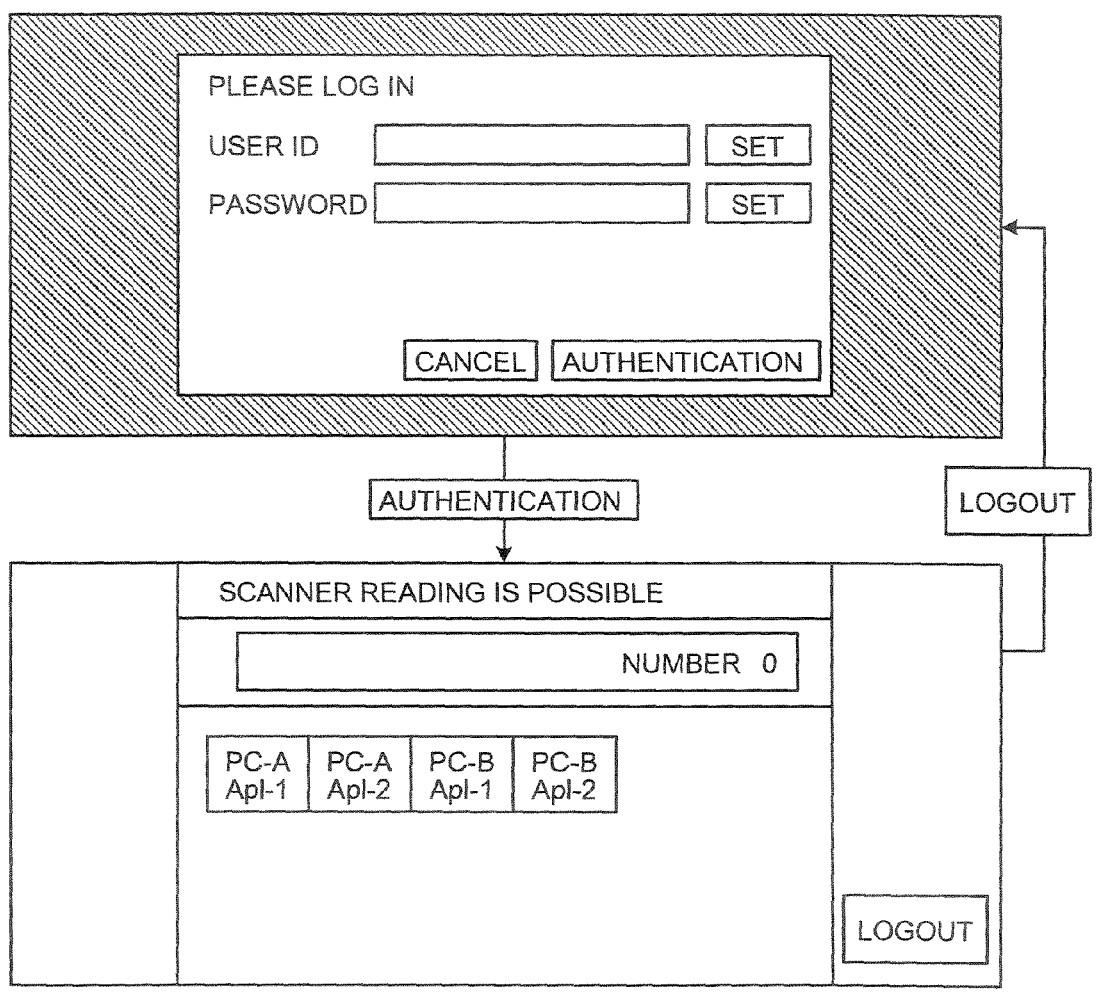
FIG. 40 is a diagram for explaining transition of a login screen displayed on the operation panel.

FIG. 40 is a diagram for explaining transition of a login screen displayed on the operation panel 170. As shown in FIG. 40, on the login screen, when the user touches and inputs an authentication button after inputting the user ID and the password, a login request is performed.

Referring back to FIG. 39, the authentication managing unit 1772 receives the authentication information and transmits a request message for an inquiry about account information to the UCS 1729 (step S3902). This request message for an inquiry about account information includes the user ID and the password of the user. The UCS 1729 receives the inquiry request, searches through the authentication DB 1760 with the user ID and the password included in the account inquiry request message as a key, and performs authentication processing for the user (step S3903). After the authentication processing is finished, the UCS 1729 transmits an authentication result to the authentication managing unit 1772 (step S3904). The authentication managing unit 1772 determines from the authentication result received whether the authentication of the user is successful (step S3905).

When it is determined that the authentication of the user has failed ("No" at step S3905), the authentication managing unit 1772 finishes the processing without performing update of the information-processing-application-destination DB for display 1750.

On the other hand, when it is determined in step S3905 that the authentication of the user is successful ("Yes" at step S3905), the authentication managing unit 1772 transmits a login notification message indicating that the user has logged in to the UCS 1729, the NCS 1728, and the application 130 being executed at present (steps S3906 to S3908).

The UCS 1729 executes processing for updating the information-processing-application-destination DB for display 1750, which is the same as the processing explained with reference to FIGS. 25 and 26, and updates the information-processing-application-destination DB for display 1750 (step S3909). Subsequently, the UCS 1729 performs processing for displaying an application screen on the operation panel from the information-processing-application-destination DB for display 1750 updated in the same manner as the processing at steps S2404 to S2410 in FIG. 24 (step S3910). The UCS 1729 updates the application screen and displays an application screen to which an application selection button corresponding to the new information processing application is added.

Figure 41:
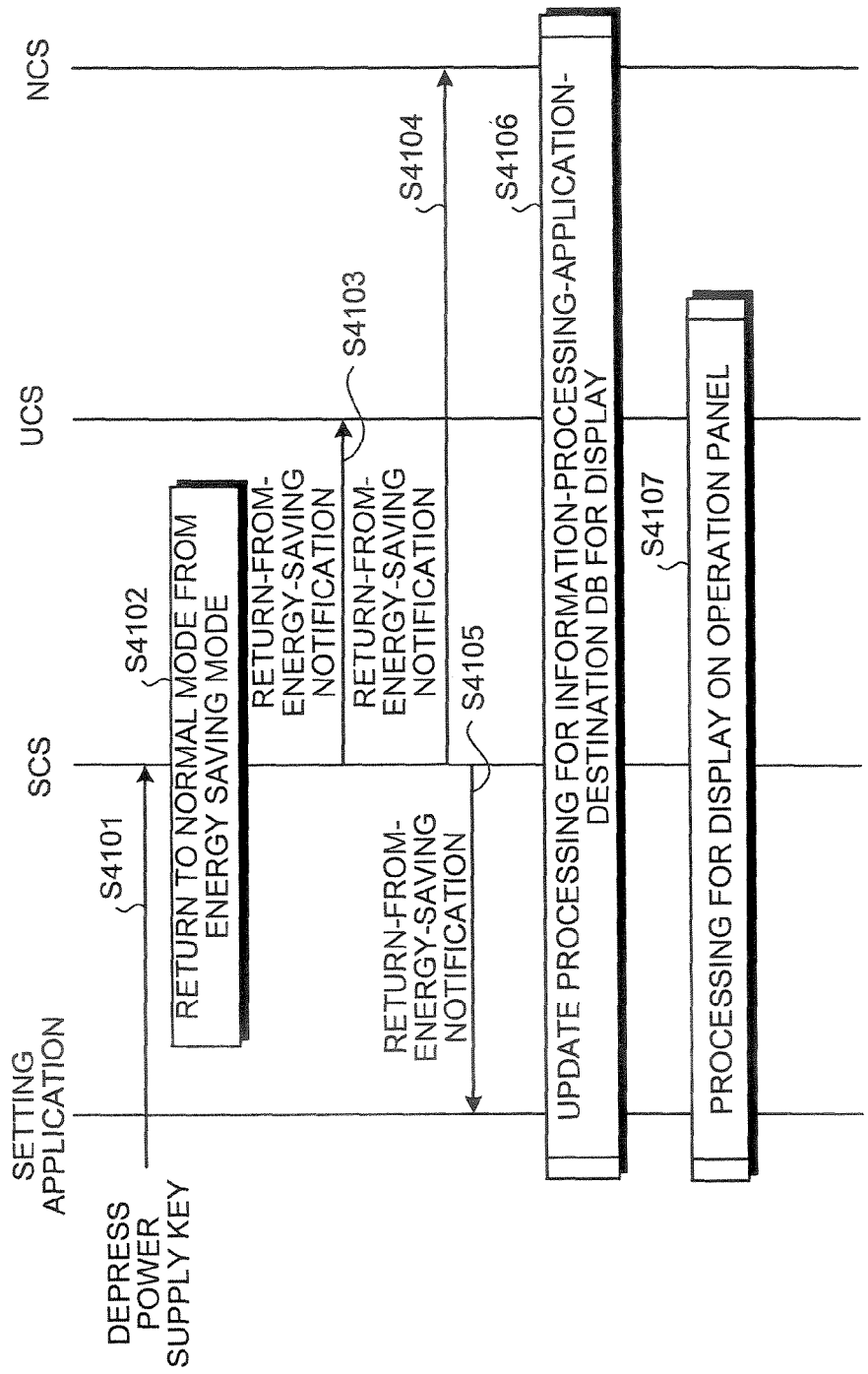
FIG. 41 is a sequence chart of a procedure of processing for automatically updating the information-processing-application-destination DB for display when the system returns to a normal mode from an energy saving mode.

In the embodiment, the information-processing-application-destination DB for display 1750 is updated when the user logs in. However, the information-processing-application-destination DB for display 1750 may be updated when the user logs off FIG. 41 is a sequence chart of a procedure of processing for automatically updating the information-processing-application-destination DB for display 1750 when the MFP 1700 returns to the normal mode from the energy saving mode.

The user presses a power supply key provided in the MFP 1700 (step S4101). In that case, since the power supply key is pressed, processing for returning to the normal mode from the energy saving mode is applied to the SCS 122 (step S4102).

The SCS 122 transmits a return-from-energy-saving notification message indicating that the MFP 1700 has returned to the normal mode from the energy saving mode to the UCS 1729, the NCS 1728, and the setting application 1717 (steps S4103 to S4105).

The UCS 1729 executes processing for updating the information-processing-application-destination DB for display 1750, which is the same as the processing explained with reference to FIGS. 25 and 26, and updates the information-processing-application-destination DB for display 1750 (step S4106). Subsequently, the UCS 1729 performs processing for displaying an application screen on the operation panel from the information-processing-application-destination DB for display 1750 updated in the same manner as the processing at steps S2404 to S2410 in FIG. 24 (step S4107). The UCS 1729 updates the application screen and displays an application screen to which an application selection button corresponding to the new information processing application is added.

Figure 42:
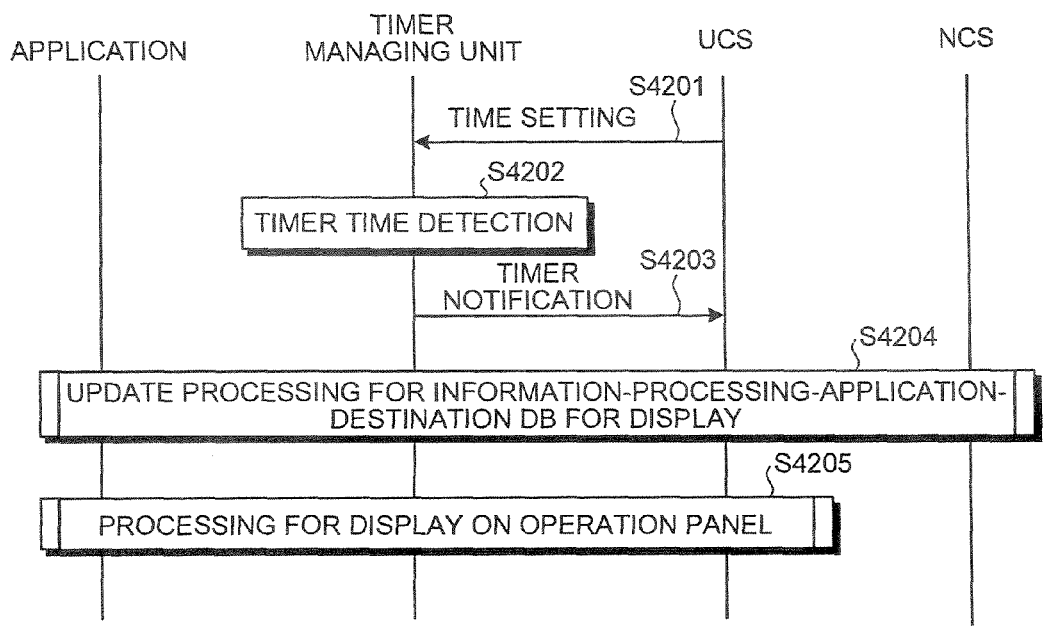
FIG. 42 is a sequence chart of a procedure of processing for automatically updating the information-processing-application-destination DB for display when a timer set time has elapsed.

FIG. 42 is a sequence chart of a procedure of processing for automatically updating the information-processing-application-destination DB for display 1750 when a timer set time has elapsed.

First, the UCS 1729 transmits a timer set time set in the information-processing-application-related-information management DB 1742 to the timer managing unit 1771 via the setting application 1717 to apply time setting for the timer set time to the timer managing unit 1771 (step S4201).

The timer managing unit 1771 detects the timer set time set (step S4202). When the timer set time has elapsed, the timer managing unit 1771 transmits a timer notification message indicating that the timer set time has elapsed to the UCS 1729 (step S4203).

The UCS 1729 executes processing for updating the information-processing-application-destination DB for display 1750, which is the same as the processing explained with reference to FIGS. 25 and 26, and updates the information-processing-application-destination DB for display 1750 (step S4204). Subsequently, the UCS 1729 performs processing for displaying an application screen on the operation panel from the information-processing-application-destination DB for display 1750 updated in the same manner as the processing at steps S2404 to S2410 in FIG. 24 (step S4205). The UCS 1729 updates the application screen and displays an application screen to which an application selection button corresponding to the new information processing application is added.

As explained above, when change of the setting contents of the information-processing-application-related-information management DB 1742, change of the setting contents of the network-setting management DB 1741, and switching of the application 130 executed in the MFP 1700 are executed, when the user logs in and succeeds in authentication, and when the MFP 1700 returns to the normal mode from the energy saving mode, automatic update of the information-processing-application-destination DB for display 1750 is performed at intervals of the timer set time set on the screen indicated by (1) shown in FIG. 31. Thus, it is possible to maintain the information-processing-application-destination DB for display 1750 in a latest state at appropriate timing without affecting an application screen being operated that is displayed on the liquid crystal display unit of the operation panel 170 by the application 130 being executed at present.

Figure 43:
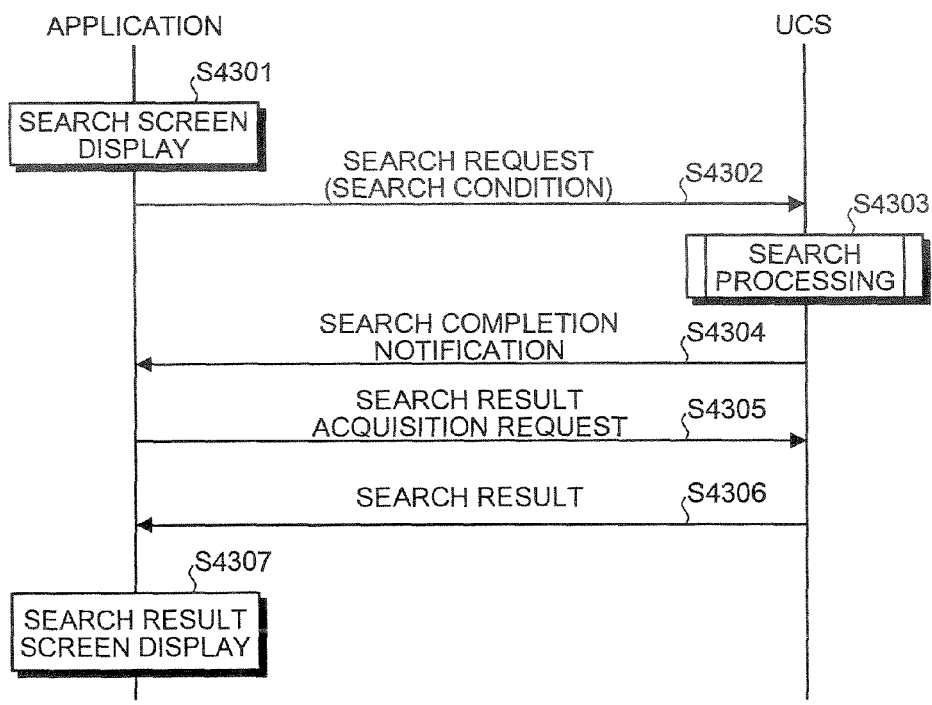
FIG. 43 is a sequence chart of an overall flow of processing for searching for an information-processing-application destination from the information-processing-application-destination DB for display.

FIG. 43 is a sequence chart of an overall flow of processing for finding an information processing application destination from the information-processing-application-destination DB for display 1750.

Figure 44:
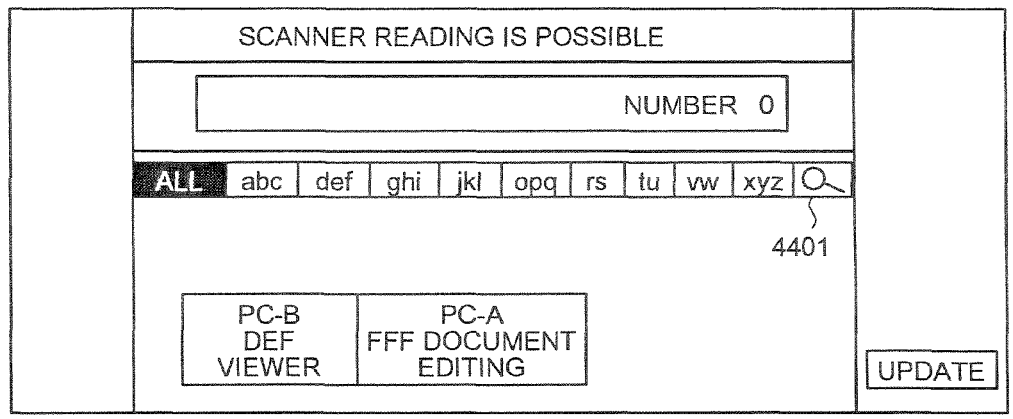
FIG. 44 is a diagram for explaining an example of an application screen.

When the user touches and inputs a search button 4401 from an application screen shown in FIG. 44 displayed on the liquid crystal display unit of the operation panel 170, the application 130 receives such touch input and displays a search screen (step S4301).

Figure 45:
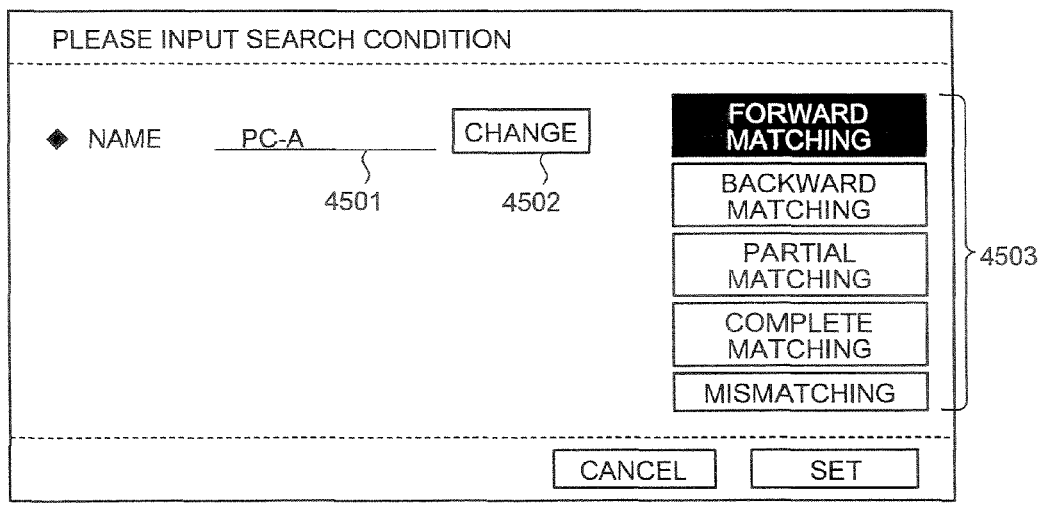
FIG. 45 is a diagram for explaining an example of a search screen.

FIG. 45 is a diagram for explaining an example of the search screen. As shown in FIG. 45, on the search screen, a field 4501 for inputting an application display name of an information processing application to be searched for, a change button 4502 for changing the application display name inputted, and condition designation buttons 4503 for designating conditions such as forward matching and backward matching are displayed.

The user inputs an application display name of an information processing application to be searched for from this search screen, selects any one of the condition designation buttons 4503, and touches and inputs a set button to start search.

Consequently, the application 130 receives the input and the selection and transmits a search request message including the application display name inputted and the condition designated as search conditions to the UCS 1729 (step S4302).

When the UCS 1729 receives the search request message, the UCS 1729 extracts the application display name and the condition and executes search processing (step S4303).

Figure 46:
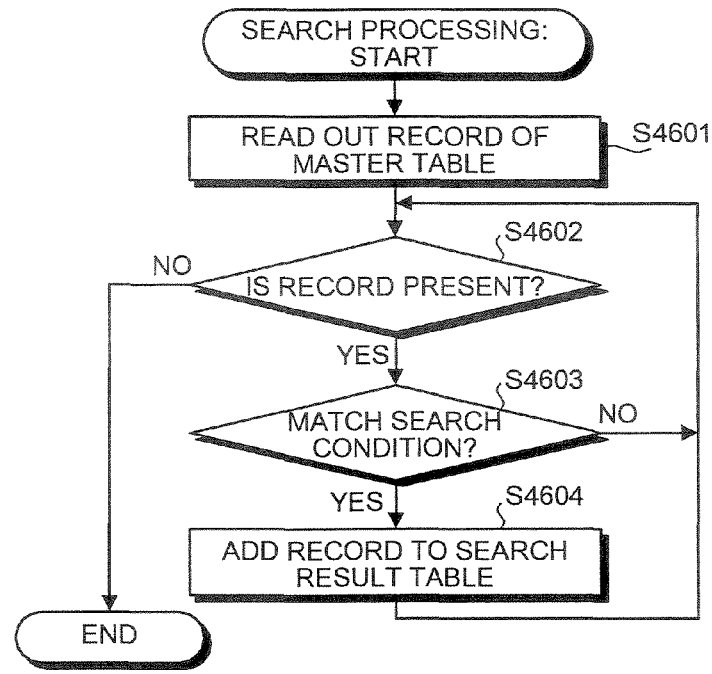
FIG. 46 is a flowchart of a procedure of search processing by the UCS.

FIG. 46 is a flowchart of a procedure of the search processing by the UCS 1729. The UCS 1729 reads all the records (information-processing-application-destination information for display) registered in the master table 1751 of the information-processing-application-destination DB for display 1750 (step S4601).

The UCS 1729 checks whether a record is present (step S4602). When a record is present ("Yes" at step S4602), the UCS 1729 determines whether the record matches the search condition in a unit of record (step S4603). Specifically, the UCS 1729 checks whether the record matches the condition of forward matching or the like designated with the application display name included in the search request message as a key. When the record does not match the search condition, the UCS 1729 determines that the record is not the record searched for, returns to step S4602, and checks whether the next record is present.

On the other hand, when it is determined in step S4603 that the record matches the search condition ("Yes" at step S4603), the UCS 1729 determines that the record is the record searched for and adds the record to the search-result table (step S4604). The UCS 1729 returns to step S4602 and checks whether the next record is present (step S4602). When the next record is present ("Yes" at step S4602), the UCS 1729 repeats the processing at steps S4603 and S4604. When it is determined in step S4602 that the next record is not present ("No" at step S4602), i.e., when the processing at steps S4603 and S4604 is completed for all the records registered in the master table 1751, the UCS 1729 finishes the search processing.

Figure 47:
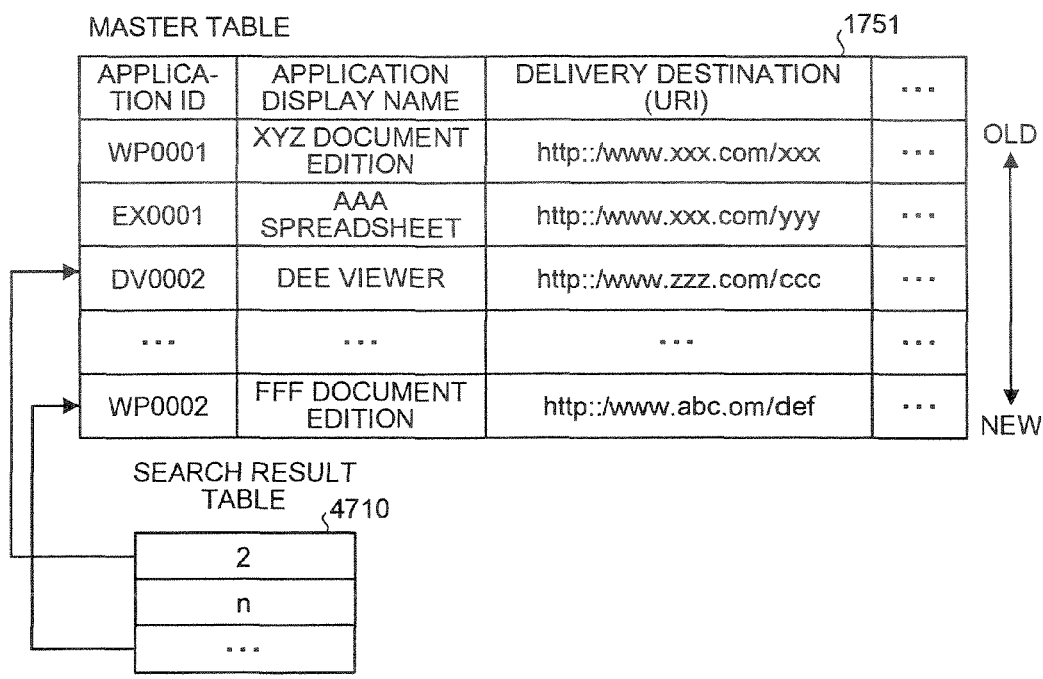
FIG. 47 is a diagram for explaining an example of a search-result table and a relation between a master table and the search-result table.

FIG. 47 is a diagram for explaining an example of the search-result table and a relation between the master table 1751 and the search-result table.

As shown in FIG. 47, like the header table 1752, a search-result table 4710 is a table in which an offset from the top record in the master table 1751 of a record matching a search condition is registered. It is possible to realize reduction of a memory capacity in the search processing by using such a search-result table.

Therefore, at step S4604, specifically, an offset from the top record in the master table 1751 of a record matching a search condition is added to the search-result table. First, when it is determined that a record matches a search condition, a search-result table is generated on a storage medium such as a memory and then an offset of the record is added to the search-result table. As described above, the search processing is performed and the offset of the record, i.e., information-processing-application-destination information matching the search condition is registered in the search-result table.

Referring back to FIG. 43, when the search processing is finished, the UCS 1729 transmits a search result completion notification message to the application 130 (step S4304). The application 130 receives the search result completion notification message and, to acquire the search result, transmits a search result acquisition request message to the UCS 1729 (step S4305).

When the UCS 1729 receives the search result acquisition request message, the UCS 1729 transmits the search result to the application 130 (step S4306). Specifically, when a record matching the search condition is present, i.e., when a search-result table is generated, the UCS 1729 transmits the search-result table generated to the application 130. On the other hand, when there is no record matching the search condition and a search-result table is not generated, the UCS 1729 transmits an indication that information-processing-application-destination information for display of the information processing application searched for is not present to the application 130 as a search result.

The application 130 receives the search result and displays a search result display screen from the search result (step S4307). Specifically, when the search-result table is transmitted as the search result, the application 130 reads all the records (information-processing-application-destination information for display) corresponding to offsets registered in the search-result table from the master table 1751 and displays a search result display screen, on which application names and delivery destinations (URIs) of the records are displayed, on the liquid crystal display unit of the operation panel 170.

Figure 48:
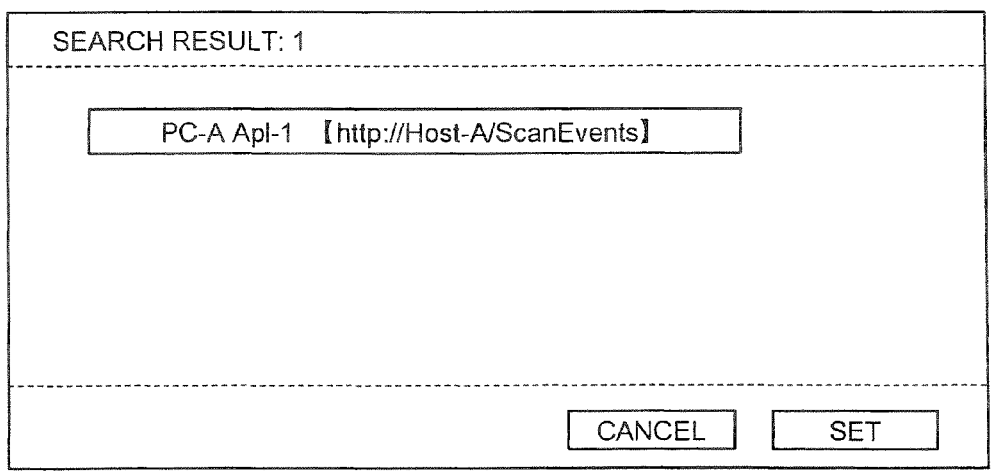
FIG. 48 is a diagram for explaining an example of a search-result-display screen.

FIG. 48 is a diagram for explaining an example of the search result display screen. As shown in FIG. 48, on the search result display screen, an application display name and a delivery destination of an information processing application found are displayed.

On the other hand, when the application 130 receives, as the search result, the indication that information-processing-application-destination information for display of the information processing application searched for is not present, the application 130 displays a message indicating that the information processing application searched for is not present as a search result screen instead of the search result display screen in FIG. 48.

In this way, the information processing application is found from the information-processing-application-destination DB for display 1750 with the application display name as a search key.

Figure 49:
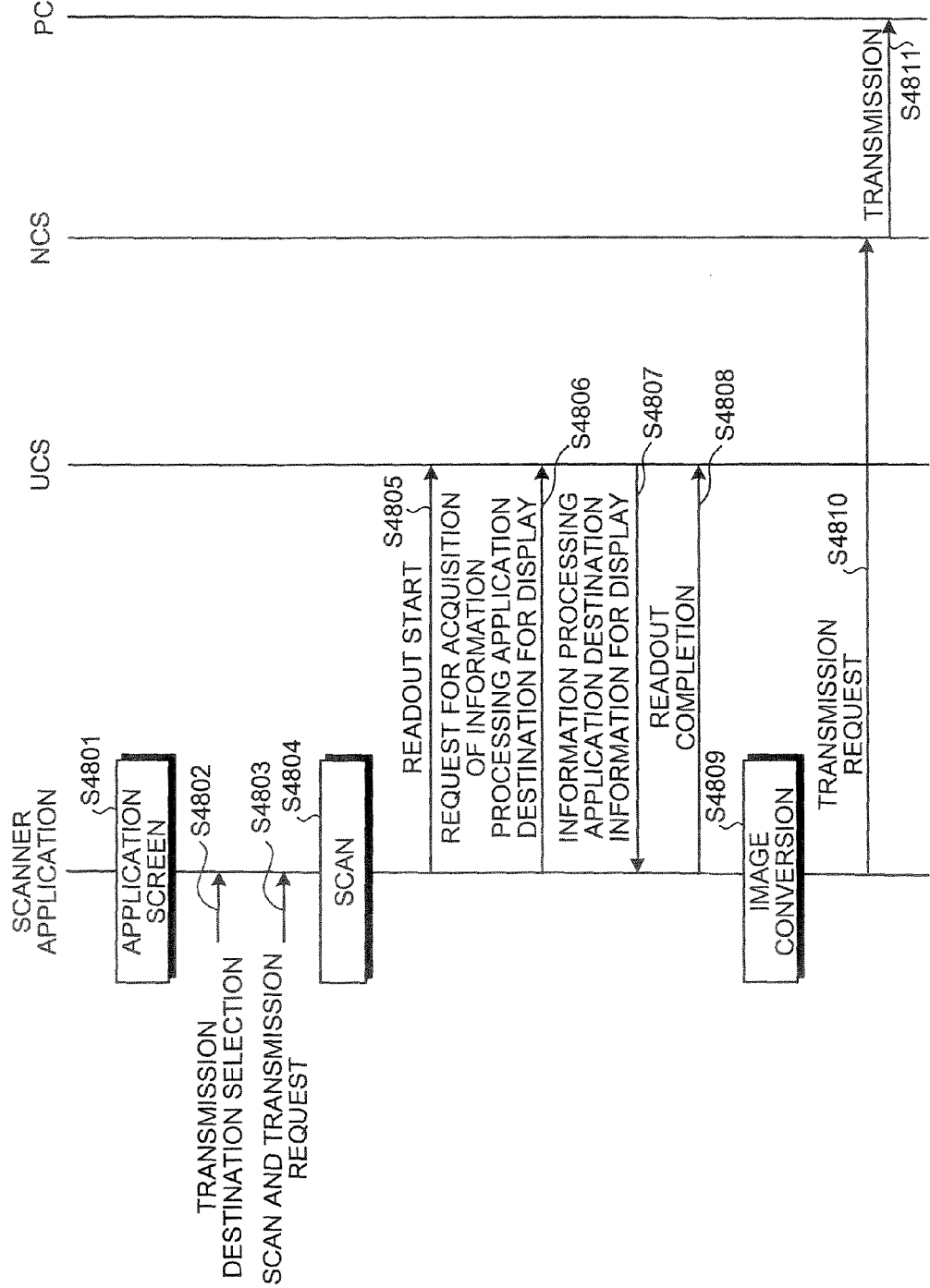
FIG. 49 is a sequence chart of a flow of scan processing according to the third embodiment.

FIG. 49 is a sequence chart of a flow of scan processing according to the third embodiment.

First, the scanner application 114 displays an application screen, on which an application destination (an application selection button) is displayed, on the liquid crystal display unit of the operation panel 170 (step S4801). On the application screen, to designate an application destination of an information processing application as a transmission destination, the user touches and inputs an application selection button of a desired information processing application and designates a transmission destination (step S4802). The user sets an original and presses a start button from the operation unit of the operation panel 170 to send a scan and transmission request (step S4803). The scanner application 114 receives the touch input of the application selection button and the scan and transmission request and executes scanning of the original (step S4804).

To transmit a scan image to the PC and acquire a delivery destination, the scanner application 114 transmits a request message for read of the information-processing-application-destination DB for display 1750 to the UCS 1729 (step S4805). The scanner application 114 transmits a request message for acquisition of information-processing-application-destination information for display including the application display name of the information processing application corresponding to the application selection button selected (step S4806).

The UCS 1729 extracts the application display name from the acquisition request message received, searches through the information-processing-application-destination DB for display 1750 with the application display name extracted as a key according to the search processing described above, and transmits information-processing-application-destination information for display, which is a record including an application display name and a delivery destination found, to the scanner application 114 (step S4807).

When the scanner application 114 receives the information-processing-application-destination information for display, the scanner application 114 transmits a read completion notification message to the UCS 1729 (step S4808). The scanner application 114 converts a scan image into data of a data format for the information processing application of the application display name (step S4809).

The scanner application 114 extracts the delivery destination of the information processing application from the information-processing-application-destination information for display received and transmits a transmission request message including the delivery destination and the data subjected to the image conversion to the NCS 1728 (step S4810).

The NCS 1728 receives the transmission request message, extracts the delivery destination of the information processing application and the data subjected to the image conversion from the transmission request message, and transmits the data subjected to the image conversion to a URI designated by the delivery designation (step S4811).

Consequently, the data is received on the PC side at the delivery destination. Since the data is converted into the data format that can be treated by the information processing application executed on the PC, it is possible to display or edit the data of the scan image obtained by the MFP 1700 without installing the driver software for the MFP 1700 on the PC.

As described above, the MFP 1700 according to the third embodiment has the information-processing-application-destination DB 1740 and the information-processing-application-destination DB for display 1750 separately. The information-processing-application-destination DB 1740 holds application display names of information processing applications of the PC-A 160, the PC-B 161, and the PC-C 162 that are capable of executing the information processing applications and the operating system that has the function of sending a request for registration of the information processing applications to the MFP 1700 to cause the MFP 1700 to operate without installing the driver software for the MFP 1700 and receive data generated by the MFP 1700. The information-processing-application-destination DB for display 1750 is generated based on the information-processing-application-destination DB 1740 and stores application IDs, the application display names, and delivery destinations concerning the PC-A 160, the PC-B 161, and the PC-C 162 requesting registration in association with one another. The MFP 1700 receives a registration request including an application display names and a delivery destination from the PC-A 160, the PC-B 161, or the PC-C 162, extracts the application display name and the delivery destination from the registration request received, registers the application display name and the delivery destination extracted in the information-processing-application-destination DB 1740, registers an application ID, the application display name, and the delivery destination in the information-processing-application-destination DB for display 1750 based on the information-processing-application-destination DB 1740, reads the application display name registered in the information-processing-application-destination DB for display 1750, and displays an application screen on which the application display name read is rendered to allow the user to input the application display name. Thus, when the application screen is displayed on the liquid crystal display unit of the operation panel 170 according to execution of the application 130, even if a registration request is sent from the PC-A 160, the PC-B 161, or an information processing application is registered in the information-processing-application-destination DB 1740, the application screen is displayed based on the information-processing-application-destination DB for display 1750. Therefore, it is possible to easily transmit data subjected to image processing to the PC-A 160, the PC-B 161, or the PC-C 162, which requests registration of the application 130, without adversely affecting the application screen. Moreover, it is possible to realize the image processing function of the MFP 1700 on the PC-A 160, the PC-B 161, or the PC-C 162 side without installing the driver software for the MFP 1700.

Figure 50:
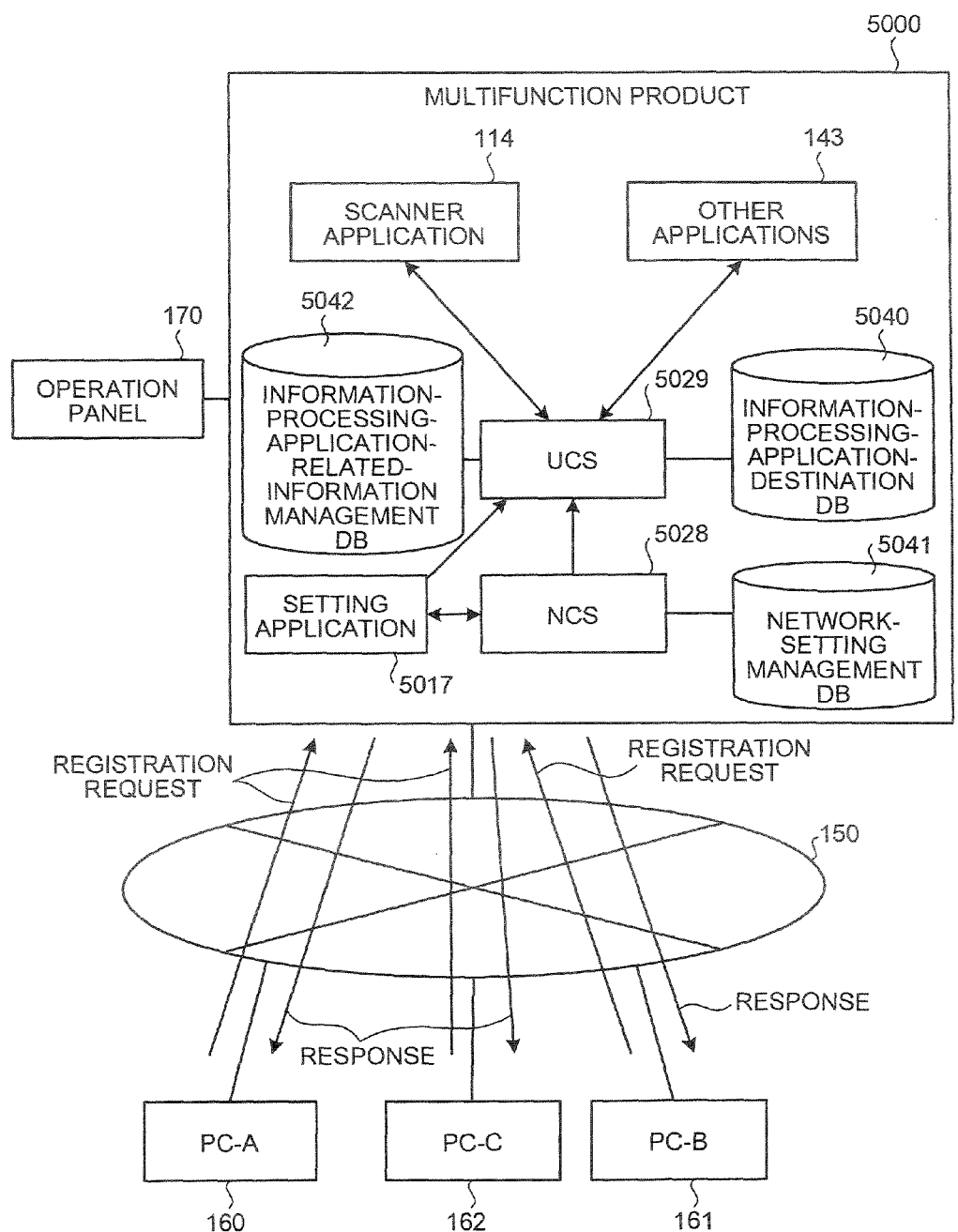
FIG. 50 is a block diagram of a network structure of an image processing system and a main structure of an MFP according to a fourth embodiment of the present invention.

FIG. 50 is a block diagram of a network structure of an image processing system and a main structure of an MFP according to a fourth embodiment of the present invention. As in the embodiments described above, the PC-A 160 or the PC-B 161 requests an MFP 5000 on a network to register an information processing application installed therein according to a function of an image-processing-control OS.

FIG. 51 is a diagram for explaining a data structure of a registration request according to the embodiment. The registration request shown in FIG. 51 is different from the registration request shown in FIG. 2 in that an expiration date is added.

When a new registration request for an application for which the expiration date is set is not received by the expiration date, the MFP 5000 deletes information on the application from an information-processing-application-destination DB 5040 described later.

The information processing application indicates an application on the image-processing-control OS of the PC-A 160, the PC-B 161, or the PC-C 162. When the PC-A 160, the PC-B 161, or the PC-C 162 requests registration of the information processing application, it is possible to use an external apparatus such as the MFP 5000 without installing the driver software. When the MFP 5000 receives the registration request, the MFP 5000 can output data to the information processing application.

Referring back to FIG. 50, the MFP 5000 mainly includes the scanner application 114 that performs scanner processing, a setting application 5017, other applications 143, a user control service (UCS) 5029, a network control service (NCS) 5028, the information-processing-application-destination DB 5040, a network-setting management DB 5041, an information-processing-application-related-information management DB 5042, and the operation panel 170.

As shown in FIG. 50, the MFP 5000 receives a registration request from the PC-A 160, the PC-B 161, or the PC-C 162, performs, for example, processing for registering information-processing-application-destination information described later, and then transmits a response to the PC-A 160, the PC-B 161, or the PC-C 162 from which the registration request is received.

The information-processing-application-destination DB 5040 is a DB in which information on an application installed in an information processing apparatus communicatable via the network is registered as a destination for transmitting an image scanned by the scanner application 114. The communicatable information processing apparatus according to the embodiment is the PC-A 160, the PC-B 161, or the PC-C 162. The application registered in the PC-A 160, the PC-B 161, or the PC-C 162 is registered in the information-processing-application-destination DB 5040.

The network-setting management DB 5041 is a DB for managing setting for connecting the MFP 5000 to the network. The network-setting management DB 5041 manages information such as a flag indicating whether a network should be activated, a flag indicating whether a port of the image-processing-control OS should be activated, and an IP address for identifying the MFP 5000 as the information for connection to the network.

The information-processing-application-related-information management DB 5042 manages information related to an information processing application. For example, the information-processing-application-related-information management DB 5042 manages a flag indicating presence or absence of use of a destination of an information processing application and the number of registrable destinations of the information processing application.

The NCS 5028 operates as a processing process that performs, as receiving means and transmitting means, processing for reception and processing for transmission The NCS 5028 receives, as receiving means, a registration request transmitted from the PC-A 160, the PC-B 161, or the PC-C 162.

The NCS 5028 performs, as transmitting means, processing for transmitting, when it is determined by the UCS 5029 that it is timing for updating the information-processing-application-destination DB 5040 as described later, an inquiry request, which indicates whether a registration request should be transmitted, to the PC-A 160, the PC-B 161, or the PC-C 162. The NCS 5028 performs processing for transmitting a response to the registration request and scan data to the PC-A 160, the PC-B 161, or the PC-C 162.

The NCS 5028 is a process for providing a service that can be used in common to applications such as the scanner application 114 and the other applications 143 on the MFP 5000 that require a network I/O. The NCS 5028 performs mediation in allocating data received by respective protocols from the network side to the respective applications and transmitting data from the applications to the network side.

The UCS 5029 operates as a process for performing, as timing determining means and updating means described later, processing for determining timing and processing for update.

The UCS 5029 performs, as timing determining means, processing for detecting timing when a user is not operating the applications such as the scanner application 114 from the operation panel 170 described later and determines the timing detected as timing for updating the information-processing-application-destination DB 5040.

The UCS 5029 updates, as updating means, information-processing-application-destination information stored in the information-processing-application-destination DB 5040 according to a registration request.

The UCS 5029 performs processing for transmitting, with inter-process communication, update start notification and update completion notification concerning update of the information-processing-application-destination DB 5040 to the applications running on the MFP 5000 such as the scanner application 114.

The UCS 5029 determines, as determining means, whether use of the information-processing-application-destination information stored in the information-processing-application-destination DB 5040 should be finished. The UCS 5029 performs, as deleting means, processing for initializing, or deleting, the information-processing-application-destination information stored in the information-processing-application-destination DB 5040 when it is determined that the use should be finished.

Besides, the UCS 5029 manages, using a not-shown user DB or the like, information on a user who uses the MFP 5000. The UCS 5029 also performs processing for determining a storage device in which user information corresponding to a request is stored, acquiring the user information from the storage device determined, and supplying the user information to the respective applications.

The setting application 5017 is an application that registers information related to an information processing application, for example, a flag indicating presence or absence of use of a destination of the information processing application and the number of registrable destinations of the information processing application in the information-processing-application-related-information management DB 5042.

The operation panel 170 has a liquid crystal display unit that displays various screens to allow the user to touch and input the screens and an operation unit on which an operation input from the user is possible. The operation panel 170 causes the user to display and operate the various screens.

Figure 52:
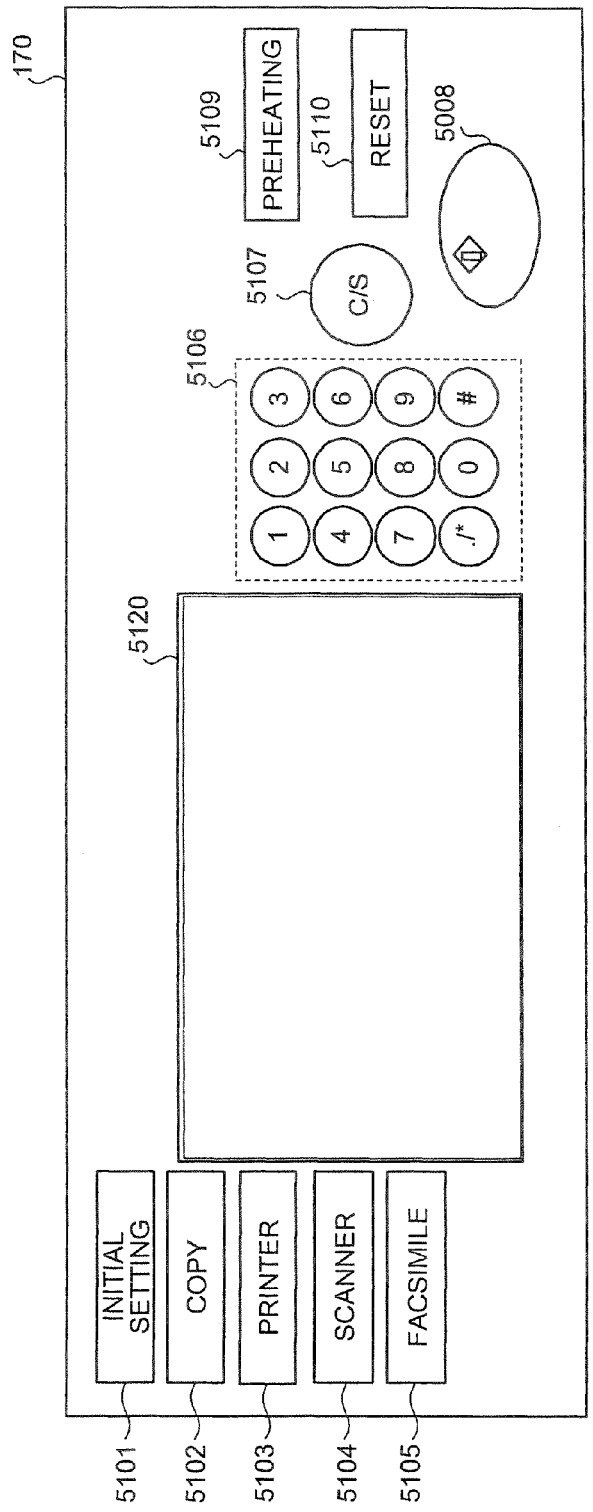
FIG. 52 is a diagram of an example of an operation panel of the MFP.

FIG. 52 is a diagram of an example of the operation panel 170 of the MFP 5000. As shown in the figure, the operation panel 170 includes an initial setting key 5101, a copy key 5102, a printer key 5103, a scanner key 5104, a FAX key 5105, a ten key 5106, a clear/stop key 5107, a start key 5108, a preheating key 5109, a reset key 5110, and a LCD touch panel 5120.

When the user touches the initial setting key 5101, a menu for initial setting is displayed on the LCD touch panel 5120. In such a menu, it is possible to set a size of sheets stored and the like. It is possible to move from the menu for initial setting to a setting menu for using the function of the image-processing-control OS of the PC-A 160, the PC-B 161, or the PC-C 162.

Referring back to FIG. 52, the user touches the copy key 5102, the printer key 5103, the scanner key 5104, and the FAX key 5105 when the user desires to perform copying, operation for printer, scanning, and operation for FAX, respectively, menus corresponding to the keys are displayed on the LCD touch panel 5120.

Figure 53:
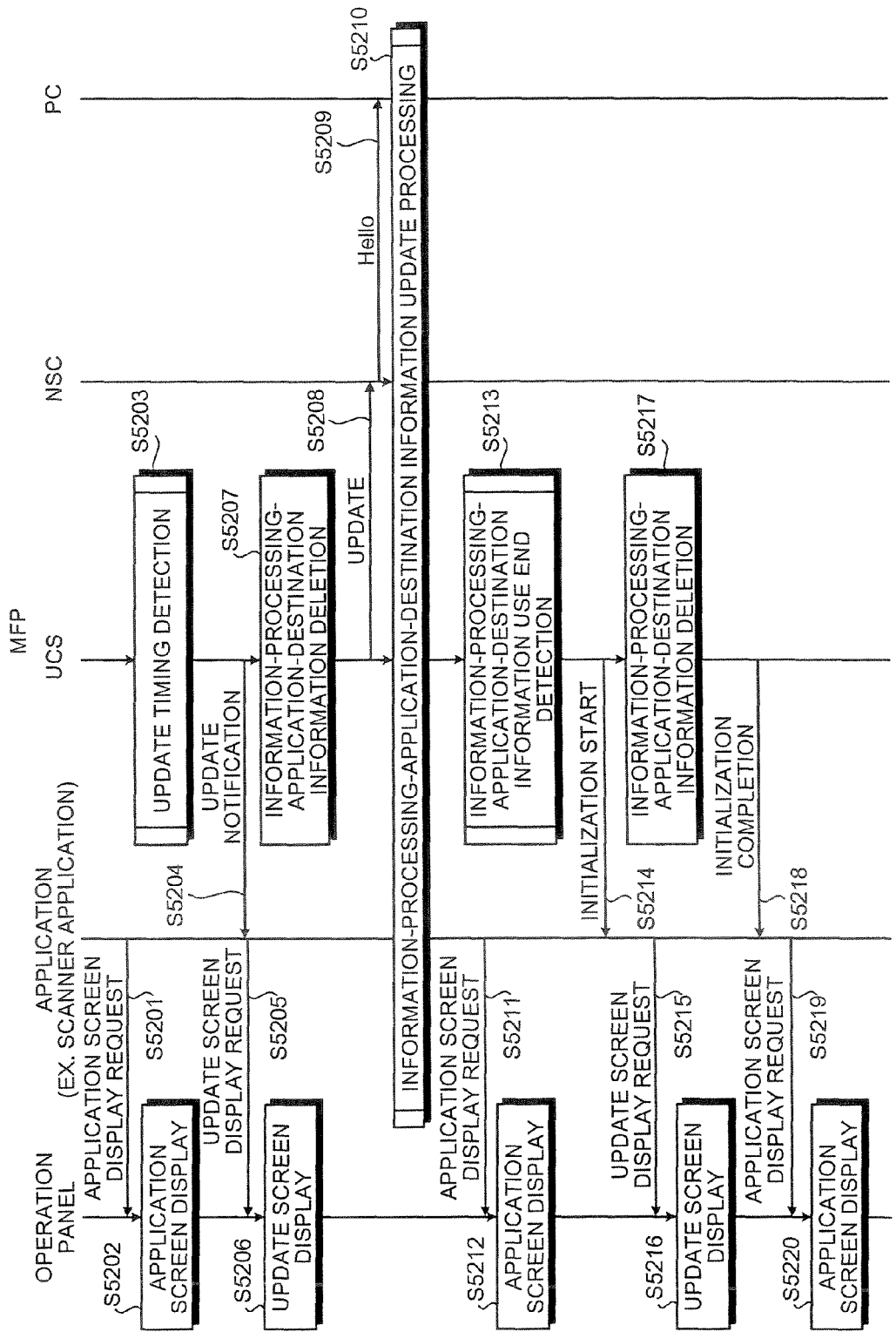
FIG. 53 is a sequence chart of an overall flow of processing for registering and displaying application information of a PC by the image processing system according to the fourth embodiment.

FIG. 53 is a sequence chart of an overall flow of processing for registering and displaying application information of a PC by the image processing system according to the fourth embodiment.

It is assumed that a plurality of pieces of information-processing-application-destination information for the PC-A 160 and the PC-B 161 shown in FIG. 3 are registered in the information-processing-application-destination DB 5040. In FIG. 53, the PC-A 160, the PC-B 161, and the PC-C 162 are simply shown as PC. In the following figures, the PC-A 160, the PC-B 161, and the PC-C 162 are also simply shown as PC. The application 3 described below is an application that can use the information-processing-application-destination information such as the scanner application 114.

When the application 130 on the MFP 5000 such as the scanner application 114 is used by the user, the user sends request for display of a screen of the application to the operation panel 170 (step S5201). This request includes an application screen generated by extracting an application display name, an application ID, and the like of the information-processing-application-destination information received from the UCS 5029 by the scanner application 114.

Figure 54:
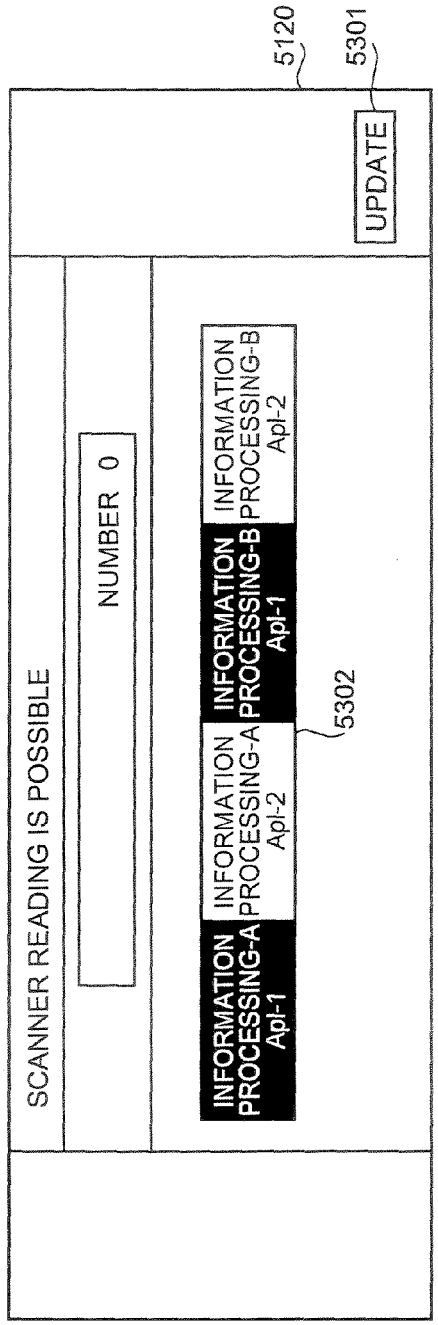
FIG. 54 is a diagram of an example of a screen of an application displayed on a liquid crystal display (LCD) touch panel of an operation panel.

The operation panel 170 displays a screen of the application according to the request displayed (step S5202). FIG. 54 is a diagram of an example of a screen of the application 130 displayed on the LCD touch panel 5120. As shown in FIG. 54, the information-processing-application-destination information registered in the information-processing-application-destination DB 5040 is displayed on the LCD touch panel 5120 as a list of information-processing-application destinations 5302. When the information-processing-application destinations 5302 are selected, a scanned image data is transmitted to the information-processing-application destinations 5302. Consequently, it is possible to use the scanned image data in the application installed in the PC-A 160, the PC-B 161, or the PC-C 162.

The UCS 5029 detects timing for updating the information-processing-application-destination information stored in the information-processing-application-destination DB 5040 (step S5203). Specific detection of timing is described later.

The UCS 5029 notifies the application 130 that the information-processing-application-destination information is updated (step S5204). The application 130 sends a request for display of an update screen to the operation panel 170 (step S5205).

The operation panel 170 displays the update screen (step S5206). This update screen is the same as the example of a screen shown in FIG. 28. As shown in FIG. 28, the update screen informs the user that the information-processing-application-destination information is being updated.

Thereafter, the UCS 5029 deletes the information-processing-application-destination information stored in the information-processing-application-destination DB 5040 (step S5207).

The UCS 5029 outputs an indication that update is performed to the NCS 5028 (step S5208). Consequently, the NCS 5028 sends Hello (inquiry) notification to the PC (step S5209).

The Hello notification is notification for sending an inquiry to communicatable information processing apparatus such as the PC-A 160, the PC-B 161, or the PC-C 162. When the PC-A 160, the PC-B 161, or the PC-C 162 receives this notification, the PC determines that the MFP 5000 is requesting transmission of a registration request and transmits a request for registration of an application.

Consequently, the processing for updating the information-processing-application-destination information is performed (step S5210). The update processing is described later.

Thereafter, the application 130 sends a request for displaying a screen of an application, which has used the information-processing-application-destination information stored in the information-processing-application-destination DB 5040 after the update, to the operation panel 170 (step S5211).

Figure 55:
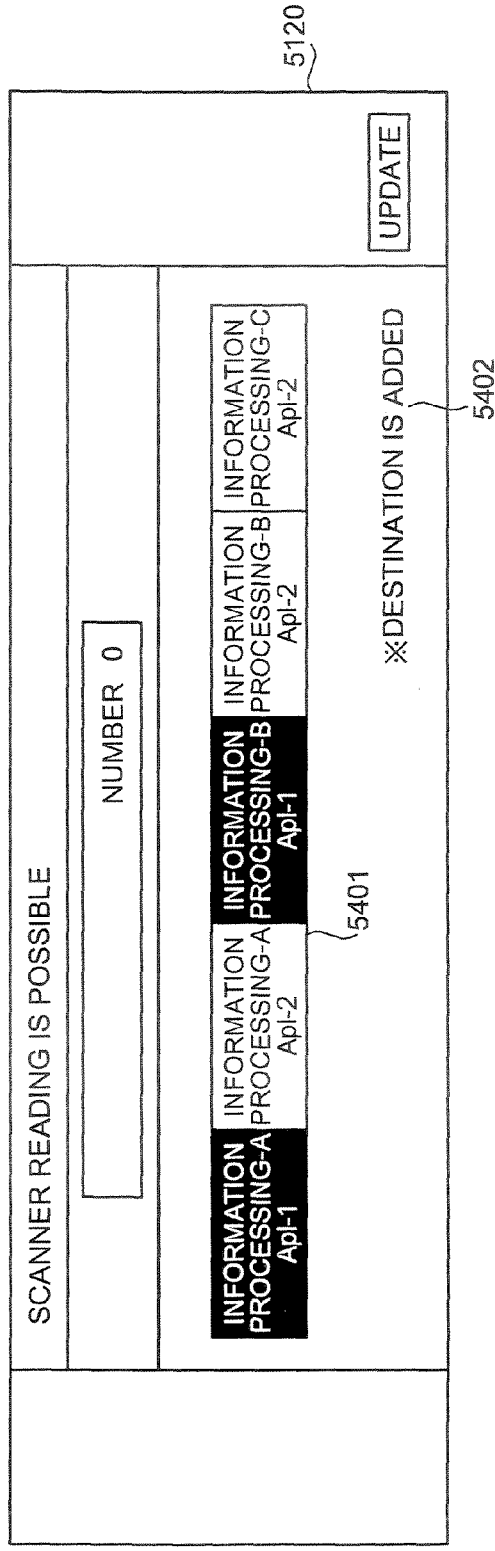
FIG. 55 is a diagram of an example of a screen of an application displayed on the LCD touch panel of the operation panel.

The operation panel 170 displays the screen of the application according to the display request (step S5212). FIG. 55 is a diagram of an example of a screen of the application 130 displayed on the LCD touch panel 5120 of the operation panel 170. As shown in FIG. 55, the information-processing-application-destination information registered in the information-processing-application-destination DB 5040 updated is displayed on the LCD touch panel 5120 as the information-processing-application destination 5401. It is possible to confirm that, in the information-processing-application destinations shown in FIG. 55, one application is added to the information-processing-application destinations 5302 shown in FIG. 54. When the application is added, as indicated by reference numeral 5402, the operation panel 170 displays an indication that the destination is added.

The UCS 5029 detects the end of the use of the information-processing-application-destination information (step S5213). Details of a procedure for detecting the end of the use are described later.

When the UCS 5029 detects the end of the use of the information-processing-application-destination information, the UCS 5029 notifies the application 130 that initialization is started (step S5214). When the application 130 receives the notification, the application 130 sends a request for display of an update screen to the operation panel 170 (step S5215).

The operation panel 170 displays the update screen (step S5216). This screen is the same as the example of a screen in FIG. 28 indicated at step S5206.

Thereafter, the UCS 5029 deletes the information-processing-application-destination information stored in the information-processing-application-destination DB 5040 (step S5217). Consequently, initialization is performed.

The UCS 5029 notifies the application 130 that the initialization is finished (step S5218). When the application 130 receives the notification, the application 130 sends a request for displaying a screen of an application after the initialization to the operation panel 170 (step S5219).

Figure 56:
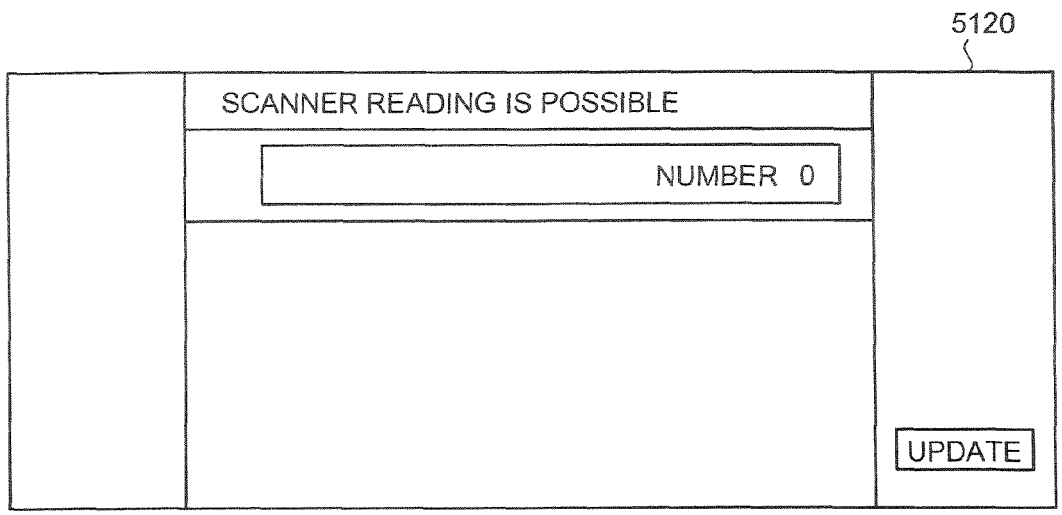
FIG. 56 is a diagram of an example of a screen of an application after initialization displayed on the LCD touch panel of the operation panel.

The operation panel 170 displays the screen of the application after the initialization according to the display request (step S5220). FIG. 56 is a diagram of an example of a screen of the application 130 after the initialization displayed on the LCD touch panel 5120 of the operation panel 170. As shown in FIG. 56, it is possible to confirm that an information-processing-application destination is not displayed on the screen of the application 130 after the initialization.

In the processing procedure described above, in using the information-processing-application-destination information, the processing for updating the information-processing-application-destination information is performed and, when the use is finished, the information-processing-application-destination information is initialized. Consequently, since it is possible to release unnecessary resources when the information-processing-application-destination information is not used, it is possible to reduce processing burdens on the MFP 5000.

Figure 57:
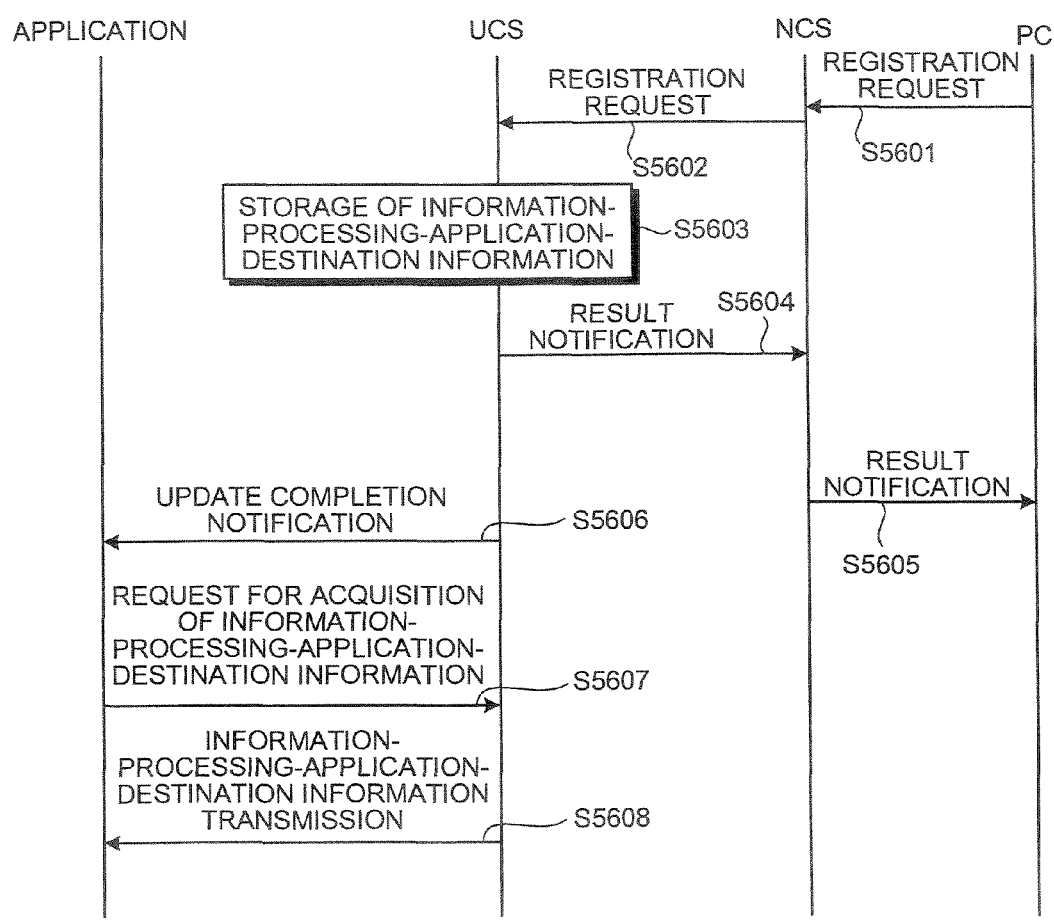
FIG. 57 is a sequence chart of a procedure of processing for updating information-processing-application-destination information stored in an information-processing-application-destination DB in the MFP.

FIG. 57 is a sequence chart of a procedure of the processing described above in the MFP 5000 according to the embodiment.

First, the PC transmits a request for registration of an application (step S5601). In the embodiment, this registration request is transmitted in response to the Hello notification received at step S5209 in FIG. 53. The registration request requests registration of an application that can be used from the scanner application 114 of the MFP 5000 among the applications installed in the PC.

The NCS 5028 transfers the registration request received to the UCS 5029 (step S5602). The UCS 5029 updates the information-processing-application-destination information registered in the information-processing-application-destination DB 5040 based on the registration request received (step S5603).

When the update of the information-processing-application-destination DB is completed, the UCS 5029 transmits notification of a result of the update to the NCS 5028 (step S5604). The NCS 5028 transfers the update result notification received to the PC (step S5605).

The UCS 5029 transmits update completion notification to the application 130 (step S5606). The application 130 receives the update completion notification and, to use the information-processing-application-destination information of the information-processing-application-destination DB 5040 updated, transmits a request for acquisition of the information-processing-application-destination information to the UCS 5029 (step S5607). The UCS 5029 receives such an acquisition request. The UCS 5029 accesses the information-processing-application-destination DB 5040 updated and reads the information-processing-application-destination information, and transmits the information-processing-application-destination information read to the application 130 (step S5608). Consequently, the application 130 can extract an application display name, an application ID, and the like of the information-processing-application-destination information received and generate an application screen.

According to the processing procedure described above, the MFP 5000 can replace the data in the information-processing-application-destination DB 5040 with latest data.

In the MFP 5000 according to the embodiment, a plurality of timings is set as timing for update and timing when the use of information-processing-application-destination information is finished, respectively. The timing for update and the timing when the use of information-processing-application-destination information is finished are explained separately.

Figure 58:
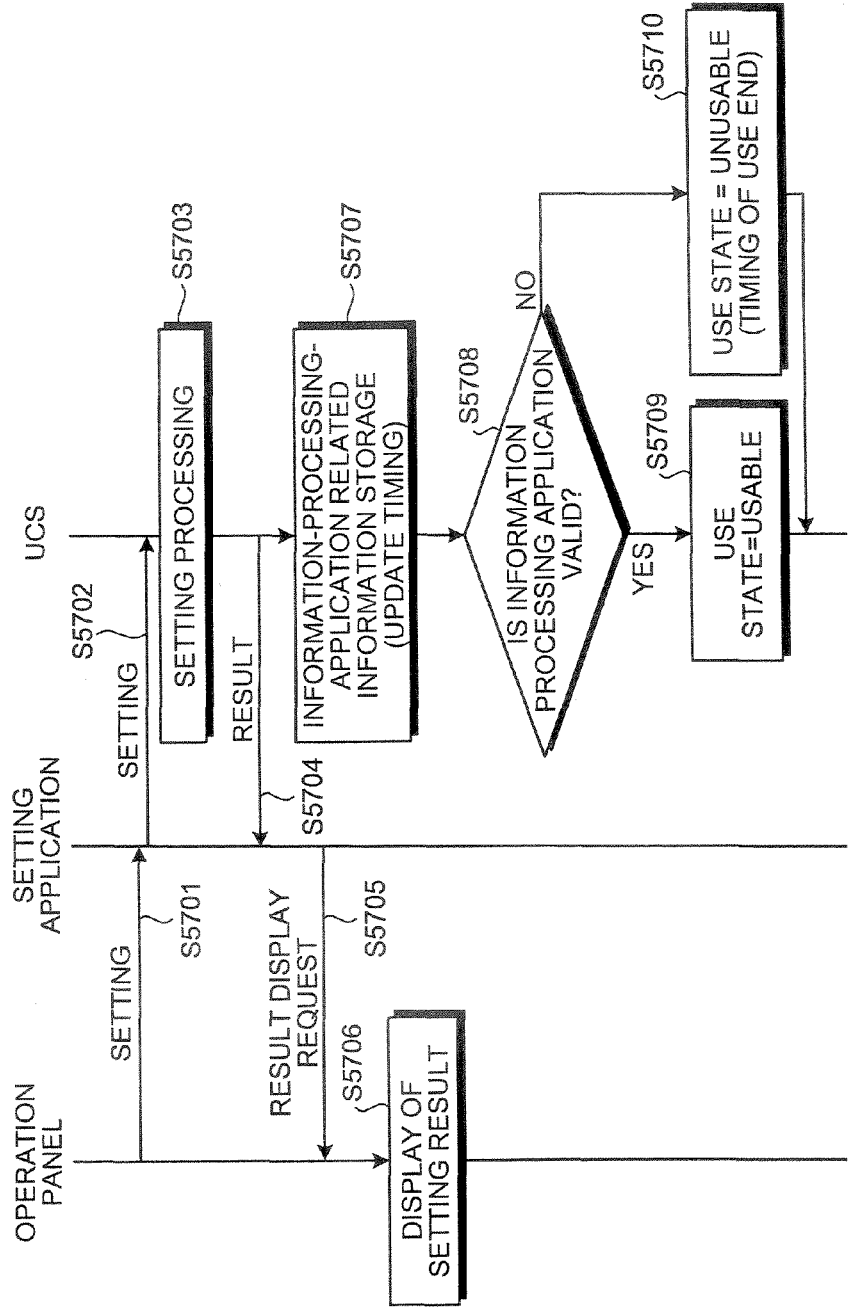
FIG. 58 is a sequence chart of a procedure of processing at the time when setting in the MFP is changed.

During the processing for changing setting in the MFP 5000 according to the embodiment, when the setting is changed in the MFP 5000, timing for updating the information-processing-application-destination information and timing when the use of the information-processing-application-destination information is finished are set. FIG. 58 is a sequence chart of a procedure of the processing in the MFP 5000 according to the embodiment.

It is assumed that the user presses the initial setting key 5101 of the operation panel 170. When the user performs setting concerning a PC at a network connection destination from the initial setting menu screen indicated by (1) shown in FIG. 31, the operation panel 170 transmits information indicating the setting to the setting application 5017 (step S5701).

The setting application 5017 transfers the setting information received to the UCS 5029 (step S5702). The UCS 5029 performs setting processing according to the setting information received (step S5703). The UCS 5029 notifies the setting application 5017 of a setting result after the setting processing is finished (step S5704).

The setting application 5017 sends a request for display of the setting result to the operation panel 170 (step S5705). The display request includes screen information including the setting result. Consequently, the operation panel 170 displays the setting result on the LCD touch panel 5120 (step S5706).

The UCS 5029 performs processing for storing a setting related to an information processing application in the setting processed (step S5707). The UCS 5029 detects timing for starting the processing for storing the setting as update timing. In other words, the MFP 5000 receives a request for registration of an application by the PC based on the setting stored anew. Consequently, the processing at steps S5203 to S5210 in FIG. 53 is performed.

After storing the setting related to the information processing application at step S5707, the UCS 5029 determines whether use of the information processing application is valid based on the setting stored (step S5708).

When it is determined that the use of the information processing application is valid, the UCS 5029 sets a state of use of the information processing application as usable (step S5709).

When it is determined that the use of the information processing application is invalid ("No" at step S5708), the UCS 5029 sets a state of use of the information processing application as unusable (step S5710). The UCS 5029 detects timing for setting the state of use as unusable as timing when the use of the information processing application is finished. Consequently, in the MFP 5000, the processing at steps S5213 to S5220 in FIG. 53 is performed. The information-processing-application-destination information is updated at the update timing at step S5707. However, since the state of use is set as unusable, the information-processing-application-destination DB 5040 is initialized before the user uses the same.

According to the processing procedure described above, according to the setting performed by the user from the operation panel 170, it is possible to detect timing for updating the information-processing-application-destination DB 5040 and timing when the use of the information-processing-application-destination information stored in the information-processing-application-destination DB 5040 is finished.

Figure 59:
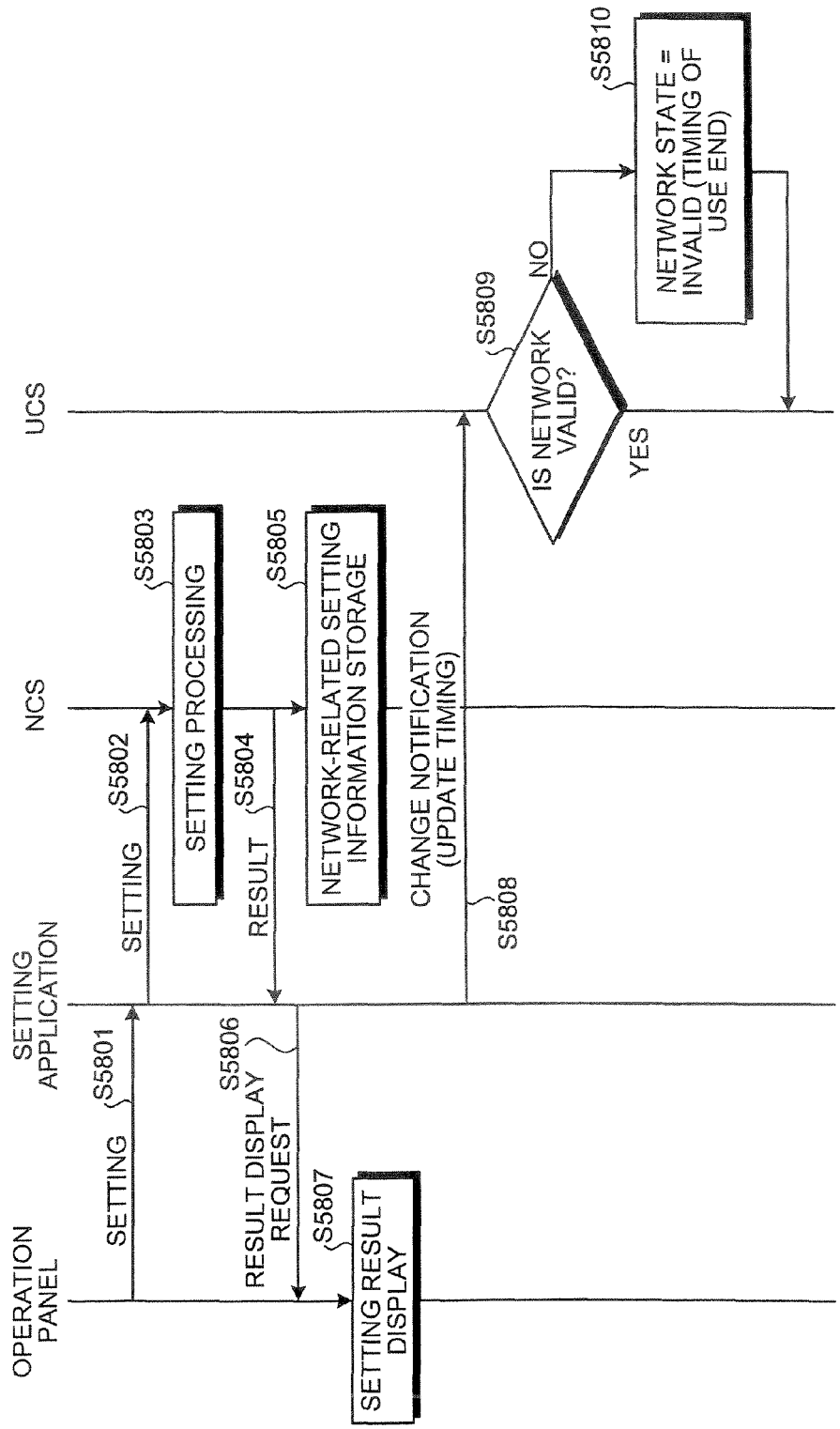
FIG. 59 is a sequence chart of a procedure of processing at the time when setting of a network in the MFP is changed.

During the processing for changing setting of the network in the MFP 5000 according to the embodiment, when the setting is changed in the MFP 5000, timing for updating the information-processing-application-destination information and timing when the use of the information-processing-application-destination information is finished when a network state becomes invalid are set. FIG. 59 is a sequence chart of a procedure of the processing in the MFP 5000 according to the embodiment.

The user performs operation for displaying a screen on which a network is set from the initial setting menu screen or the like of the operation panel 170. FIG. 60 is a diagram of an example of a network setting screen displayed on the LCD touch panel 5120 of the operation panel 170. In the example of a network setting screen in FIG. 60, for example, the user can set whether a network should be activated and whether a port through which a registration request or the like is sent from the image-processing-control OS should be activated and set an IP address.

When the user performs setting for the network from the network setting screen, the operation panel 170 transmits setting information indicating the setting to the setting application 5017 (step S5801).

The setting application 5017 transfers the setting information received to the NCS 5028 (step S5802). The NCS 5028 performs setting processing according to the setting information received (step S5803). After the setting processing is finished, the NCS 5028 notifies the setting application 5017 of a setting result (step S5804). Thereafter, the NCS 5028 performs processing for storing network-related setting information set (step S5805).

The setting application 5017 sends a request for display of the setting result related to the network to the operation panel 170 (step S5806). The display request includes screen information including the setting result related to the network. Consequently, the operation panel 170 displays the setting result of the network on the LCD touch panel 5120 (step S5807).

The setting application 5017 notifies the UCS 5029 that the setting of the network is changed (step S5808).

The UCS 5029 detects timing when the notification that the setting of the network is changed is received as update timing. The MFP 5000 receives a request for registration of an application from the PC based on the setting of the network changed anew. Consequently, the processing at steps S5203 to S5210 in FIG. 53 is performed.

The UCS 5029 determines whether the network is valid after the update (step S5809). When the UCS 5029 determines that the network is valid ("Yes" at step S5809), it is possible to use the application of the PC registered using the network.

When it is determined that the network is invalid ("No" at step S5809), to control a request for use of the network and the like from the respective applications such as the scanner application 114, the UCS 5029 sets a network state as invalid (step S5810). The UCS 5029 detects timing for setting the network state as invalid as timing when the use of the information processing application is finished. Consequently, the processing at steps S5213 to S5220 in FIG. 53 is performed in the MFP 5000. The information-processing-application-destination information is updated at the update timing at step S5808. However, since the network state is set as invalid, the information-processing-application-destination DB 5040 is initialized before the user uses the same.

According to the processing procedure described above, it is possible to detect, according to the setting of the network performed by the user, timing for updating the information-processing-application-destination DB 5040 and timing when the use of the information-processing-application-destination information stored in the information-processing-application-destination DB 5040 is finished.

Figure 61:
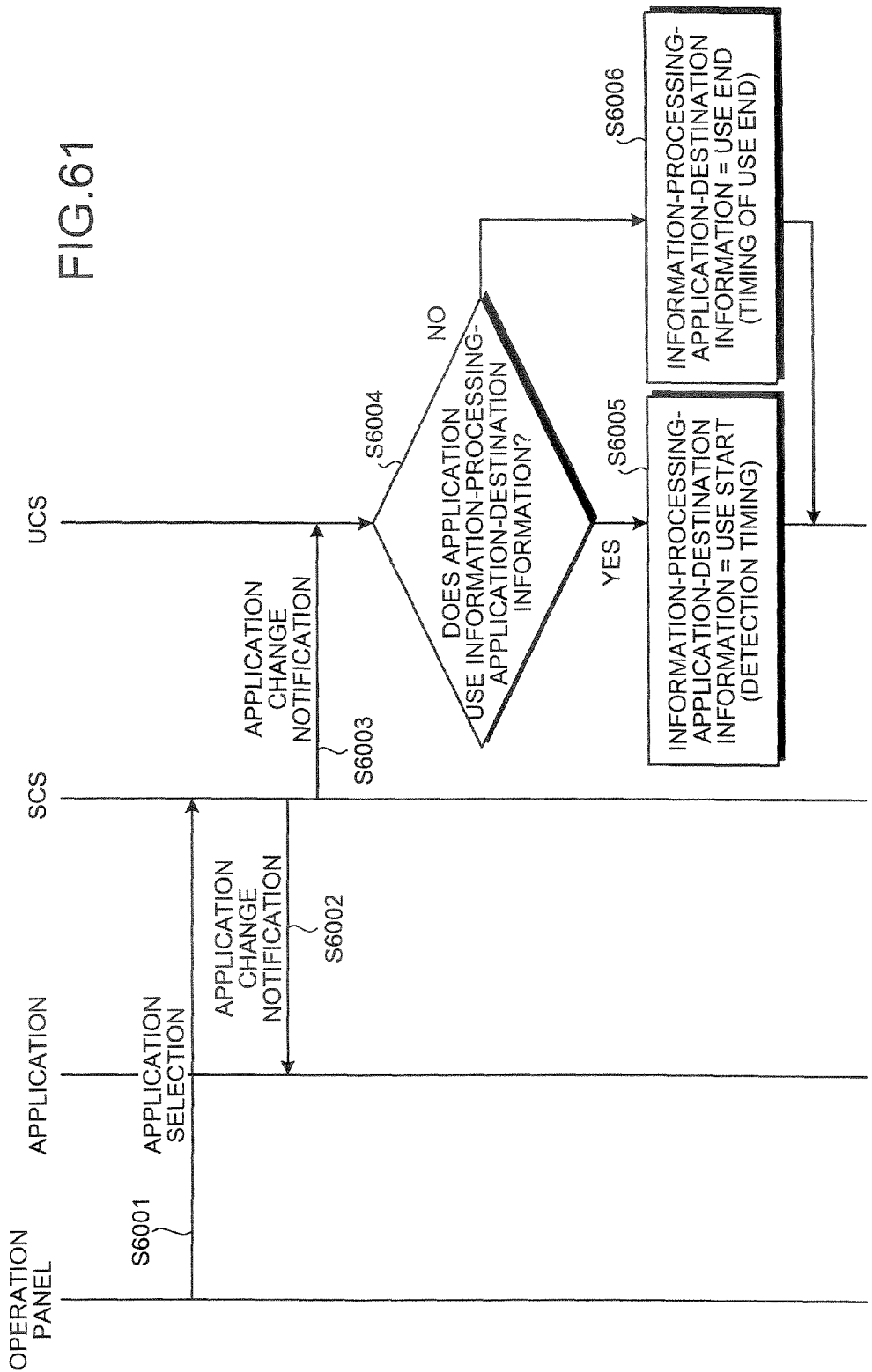
FIG. 61 is a sequence chart of a procedure of processing at the time when an application is selected according to operation by a user in the MFP.

During the processing for selecting an application used by the user in the MFP 5000 according to the embodiment, when information-processing-application-destination information is selected by an application that can use application information and when timing for updating the information-processing-destination information is selected by an application that cannot use the application information in the MFP 5000, timing when use of the information-processing-application-destination information is finished is set. FIG. 61 is a sequence chart of a procedure of the processing in the MFP 5000 according to the embodiment.

When the user selects an application from the operation panel 170, the operation panel 170 transmits selection information indicating the selection of the application to the SCS 122 (step S6001). An example of a screen at the time when the application is selected is as explained with reference to FIGS. 37 and 38. Thus, an explanation of the example of a screen is omitted.

When the application selected in this way is an application that can use an application of the PC such as the scanner application 114, update timing is detected. When the application is an application that cannot use an application of the PC such as the FAX application 113, timing when the use of the information-processing-application-destination information is finished is detected.

Referring back to FIG. 61, the SCS 122 receives the information indicating the selection and outputs notification of change of the application to the application 130 (step S6002). Consequently, the application selected by the user is started.

The SCS 122 transmits notification of the change of the application to the UCS 5029 (step S6003). When the UCS 5029 receives the notification of the change of the application, the UCS 5029 determines whether the application after the change is an application that uses the information-processing-application-destination information (step S6004).

When it is determined that the application after the change uses the information-processing-application-destination information ("Yes" at step S6004), the UCS 5029 starts processing for using the information-processing-application-destination information (step S6005). The UCS 5029 detects timing when it is determined that the information-processing-application-destination information is used as update timing. The processing at steps S5203 to S5210 in FIG. 53 is performed.

When it is determined that the application after the change does not use the information-processing-application-destination information ("No" at step S6004), if the information-processing-application-destination information is being used, the UCS 5029 starts processing for finishing the use (step S6006). The UCS 5029 detects timing when it is determined that the information-processing-application-destination information is not used as timing when the use is finished. The processing at steps S5213 to S5220 in FIG. 53 is performed.

According to the processing procedure described above, it is possible to detect timing when the application is selected by the user as timing for updating the information-processing-application-destination DB 5040 or timing when the use of the information-processing-application-destination information stored in the information-processing-application-destination DB 5040 is finished.

Figure 62:
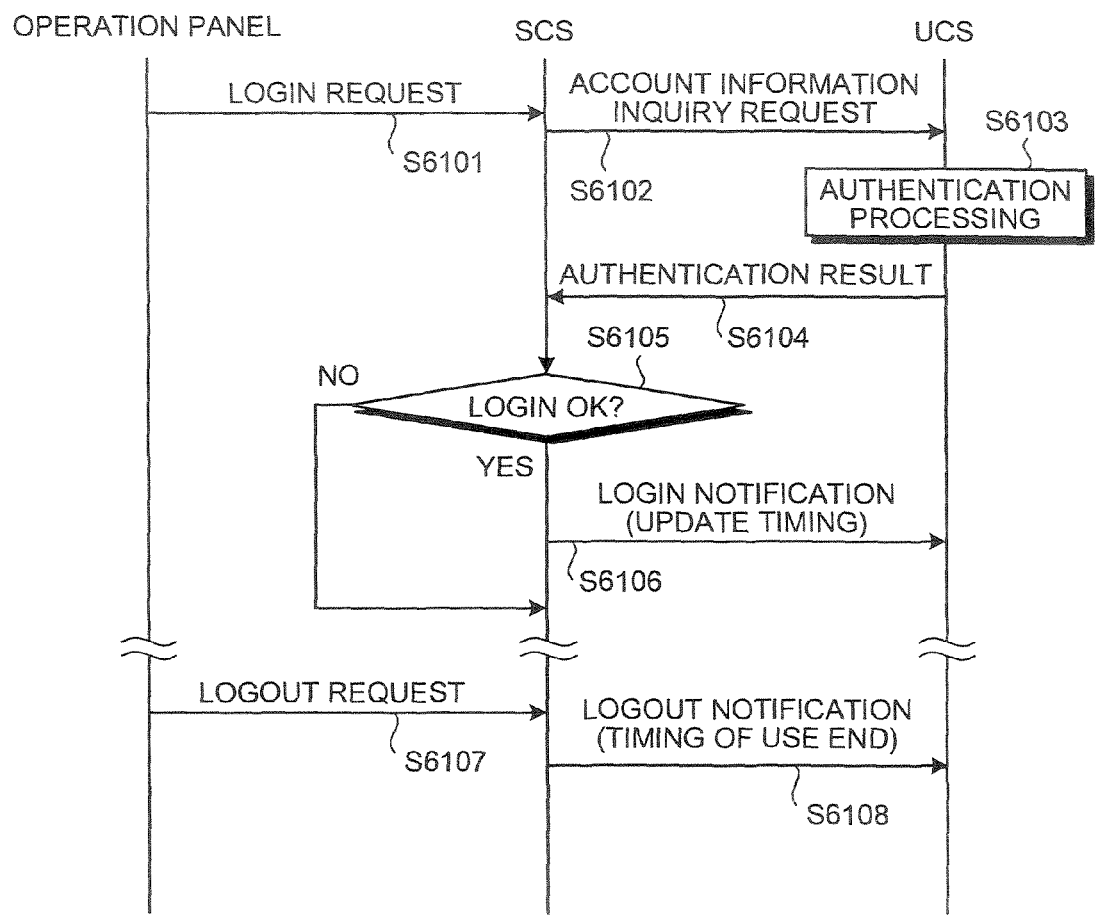
FIG. 62 is a sequence chart of a procedure of processing at the time when the user performs login and logout in the MFP.

Timing for updating the information-processing-application-destination information when login of the user is authenticated and timing when the use of the information-processing-application-destination information is finished when logout is performed by the user are set. FIG. 62 is a sequence chart of a procedure of the processing described above in the MFP 5000 according to the embodiment.

When the user performs operation for login from the operation panel 170, the operation panel 170 transmits information indicating this login request to the SCS 122 (step S6101). This information indicating the login request includes a user ID and a password of the user who performed the operation for login. A login screen is the same as the screen shown in FIG. 40. As shown in FIG. 40, on the login screen, login request is performed when the user presses the authentication button after inputting the user ID and the password.

Referring back to FIG. 62, the SCS 122 receives the information indicating the login request and transmits a request for inquiry about account information to the UCS 5029 (step S6102). This request for inquiry about the account information includes the user ID and the password of the user. The UCS 5029 receives the inquiry request and performs authentication processing for the user using the user ID and the password included in the inquiry request and a DB for authentication held for authentication (step S6103). After the authentication processing is finished, the UCS 5029 transmits an authentication result to the SCS 122 (step S6104). The SCS 122 determines from the authentication result received whether login of the user should be permitted (step S6105).

When it is determined that the login of the user should be permitted ("Yes" at sep S6105), the SCS 122 notifies the UCS 5029 that the user has logged in (step S6106). The UCS 5029 detects timing when the notification is received as update timing. The processing at steps S5203 to S5210 in FIG. 53 is performed.

After the user has finished the use of the MFP 5000, when operation for logout is performed on the operation panel 170, the operation panel 170 transmits information indicating a logout request to the SCS 122 (step S6107).

As shown in FIG. 40, when a logout button is pressed in a screen on which applications are displayed, logout request is performed and the screen returns to the login screen.

Referring back to FIG. 62, when the SCS 122 receives the information indicating the logout request, the SCS 122 notifies the UCS 5029 that the user logs out (step S6108). The UCS 5029 detects timing when the logout notification is received as timing when the use of the information-processing-application-destination information is finished. The processing at steps S5213 to S5220 in FIG. 53 is performed.

According to the processing procedure described above, it is possible to detect timing when the user logs in as timing for updating the information-processing-application-destination DB 5040 or detect timing when the user logs out as timing when the use of the information-processing-application-destination information is finished.

Figure 63:
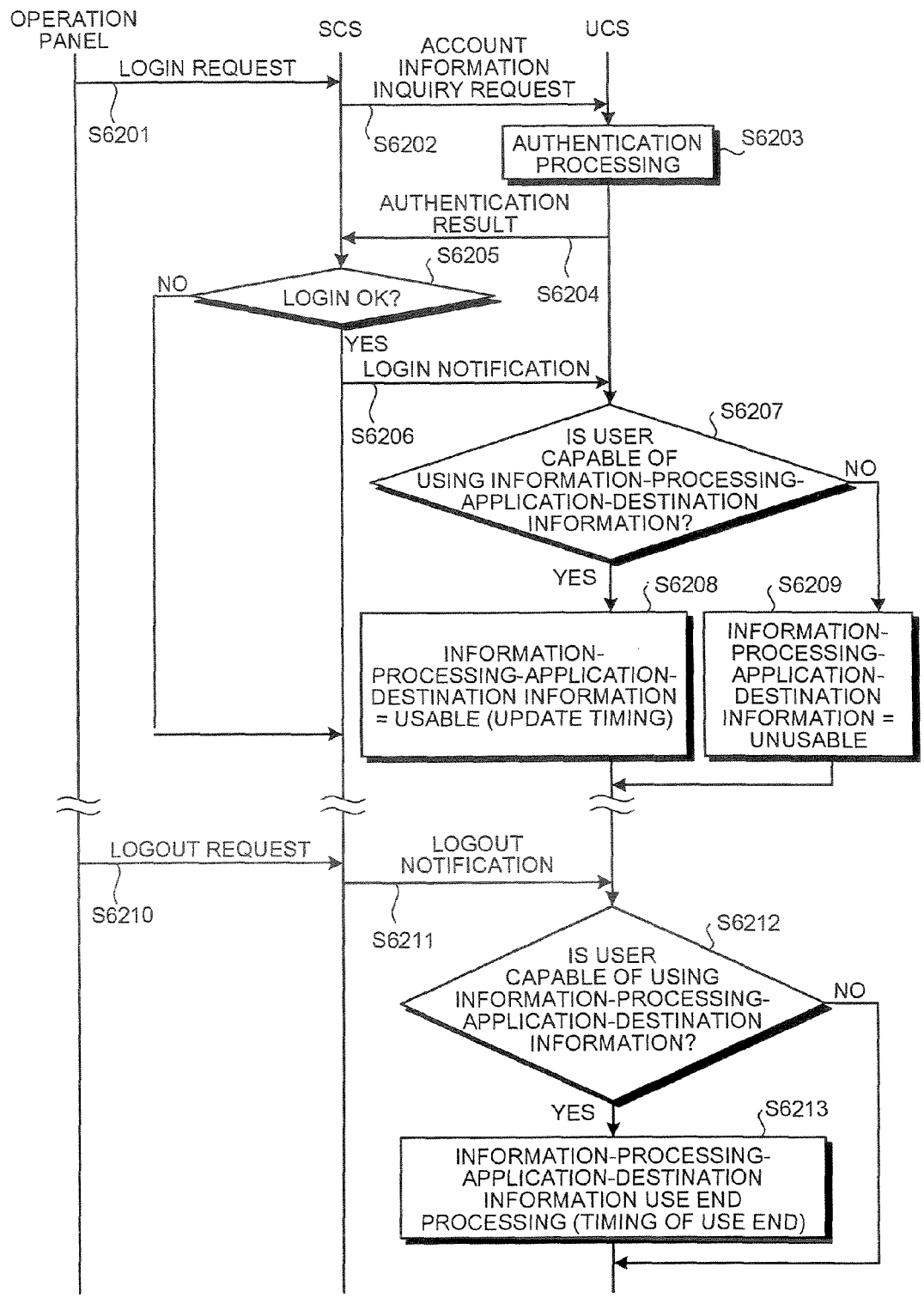
FIG. 63 is a sequence chart of a procedure of processing for login and logout at the time when there is a setting about usability of information-processing-application-destination information for the user in the MFP.

In the MFP 5000 according to the embodiment, as indicated by the processing procedure in FIG. 62, the user who has logs in the MFP 5000 can use the information-processing-application-destination information. However, it may be set for each user whether the user may use the information-processing-application-destination information. Thus, as a modification of the embodiment, a processing procedure for login and logout at the time when it is set whether a user may use information-processing-application-destination information is explained. Timing for updating the information-processing-application-destination information during the processing and timing when the use of the information-processing-application-destination information is finished are also explained. FIG. 63 is a sequence chart of a procedure of the processing described above in the MFP 5000 according to this modification.

When the user performs operation for login from the operation panel 170, the operation panel 170 transmits information indicating this login request to the SCS 122 (step S6201). This information indicating the login request includes a user ID and a password of the user who performed the operation for login.

The SCS 122 receives the information indicating the login request and transmits a request for inquiry about account information to the UCS 5029 (step S6202). The request for inquiry about the account information includes the user ID and the password of the user. The UCS 5029 receives the inquiry request and performs authentication processing for the user using the user ID and the password included in the inquiry request and the DB for authentication held for authentication (step S6203). After the authentication processing is finished, the UCS 5029 transmits an authentication result to the SCS 122 (step S6204). The SCS 122 determines from the authentication result received whether login of the user should be permitted (step S6205).

When it is determined that the login of the user should be permitted ("Yes" at step S6205), the SCS 122 notifies the UCS 5029 that the user has logged in (step S6206). The UCS 5029 determines whether the user who has logged in the MFP 5000 is a user who may use the information-processing-application-destination information (step S6207). When it is determined that the user is a user who may not use the information-processing-application-destination information ("No" at step S6207), the UCS 5029 performs setting for disallowing the user to use the information-processing-application-destination information (step S6209).

When it is determined that the user who has logged in the MFP 5000 is a user who may use the information-processing-application-destination information ("Yes" at step S6207), the UCS 5029 issues a permission for use of the information-processing-application-destination information and performs setting necessary for using the information-processing-application-destination information (step S6208). The UCS 5029 detects timing when the permission for using the information-processing-application-destination information is issued as timing for updating the information-processing-application-destination information. The processing at steps S5203 to S5210 in FIG. 53 is performed.

After the user has finished the use of the MFP 5000, when operation for logout is performed on the operation panel 170, the operation panel 170 transmits information indicating a logout request to the SCS 122 (step S6210).

When the SCS 122 receives the information indicating the logout request, the SCS 122 notifies the UCS 5029 that the user logs out (step S6211). The UCS 5029 determines whether the user who logs out is a user who may use the information-processing-application-destination information (step S6212). When it is determined that the user is a user who may not use the information-processing-application-destination information ("No" at step S6212), the UCS 5029 does not perform processing in particular.

When it is determined that the user is a user who may use the information-processing-application-destination information ("Yes" at step S6212), the UCS 5029 performs processing for finishing the use of the information-processing-application-destination information (step S6213). At timing when the processing for finishing the use of the information-processing-application-destination information is started, the processing at steps S5213 to S5220 in FIG. 53 is performed.

According to the processing procedure described above, it is possible to detect timing when the user who may use the information-processing-application-destination information logs in the MFP 5000 as timing for updating the information-processing-application-destination DB 5040 or detect timing when the user logs out as timing when the use of the information-processing-application-destination information is finished.

The fourth embodiment is explained again. A mode of the MFP 5000 is switched to the normal mode and the energy saving mode by turning on and off a power supply key. According to timing of this switching, timing for updating the information-processing-application-destination information and timing when the use of the information-processing-application-destination information is finished are detected.

Figure 64:
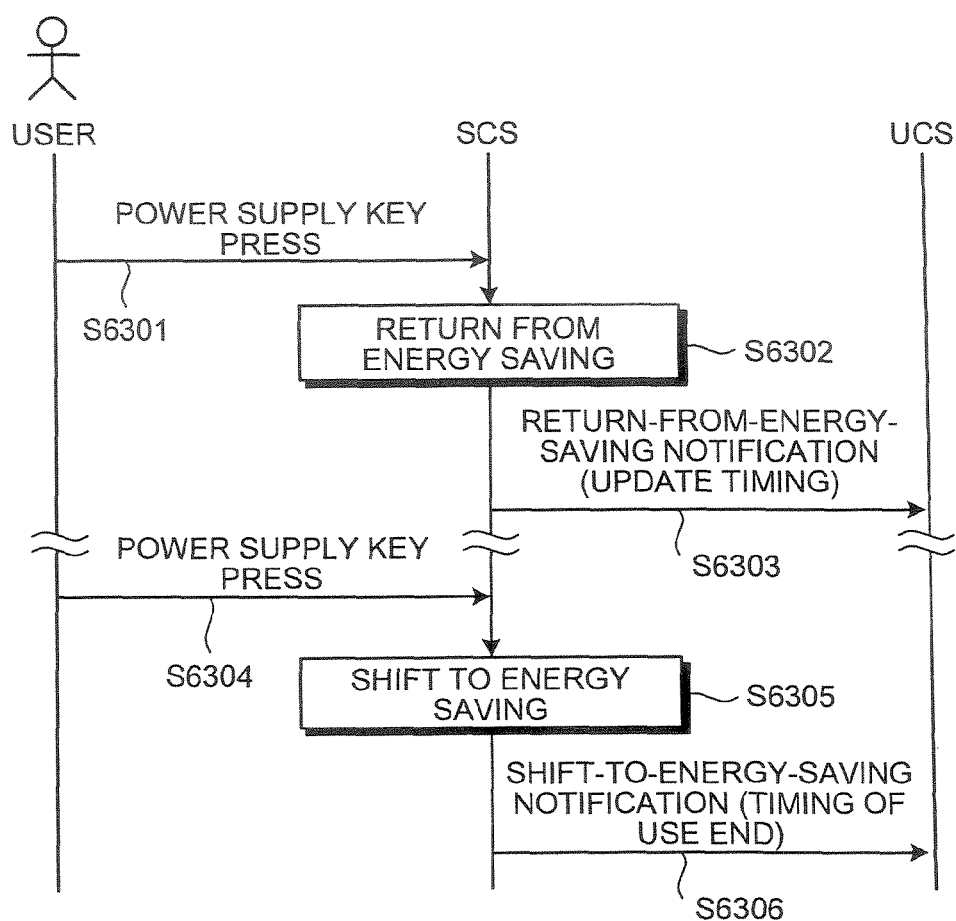
FIG. 64 is a sequence chart of a procedure of processing for switching a normal mode and an energy saving mode according to on/off of a power supply key in the MFP.

FIG. 64 is a sequence chart of a procedure of the processing described above in the MFP 5000 according to the embodiment.

The user presses a power supply key provided in the MFP 5000 (step S6301). In that case, the user applies processing for returning to the normal mode from the energy saving mode according to the press of the power supply key to the SCS 122 (step S6302).

The SCS 122 sends notification indicating that the MFP 5000 has returned from the energy saving mode to the UCS 5029 (step S6303). The UCS 5029 detects timing when the notification indicating that the MFP 5000 has returned from the energy saving mode as timing for updating the information-processing-application-destination information. The processing at steps S5203 to S5210 in FIG. 53 is performed.

The user presses the power supply key after finishing the use of the MFP 5000 (step S6304). In that case, the SCS 122 performs processing for shifting from the normal mode to the energy saving mode according to the press of the power supply key (step S6305). Thereafter, the SCS 122 sends notification indicating that the MFP 5000 has shifted to the energy saving mode to the UCS 5029 (step S6306). The UCS 5029 detects timing when the notification indicating that the MFP 5000 has shifted to the energy saving mode is received as timing when the use of the information-processing-application-destination information is finished. The processing at steps S5213 to S5220 in FIG. 53 is performed.

According to the processing procedure described above, it is possible to detect timing of on/off of the power supply key of the MFP as timing for updating the information-processing-application-destination information and timing when the use of the information-processing-application-destination information is finished.

The MFP 5000 according to the embodiment may receive an input concerning whether the information-processing-application-destination information should be updated from the user and set timing when the input is received as timing for updating the information-processing-application-destination information.

Figure 65:
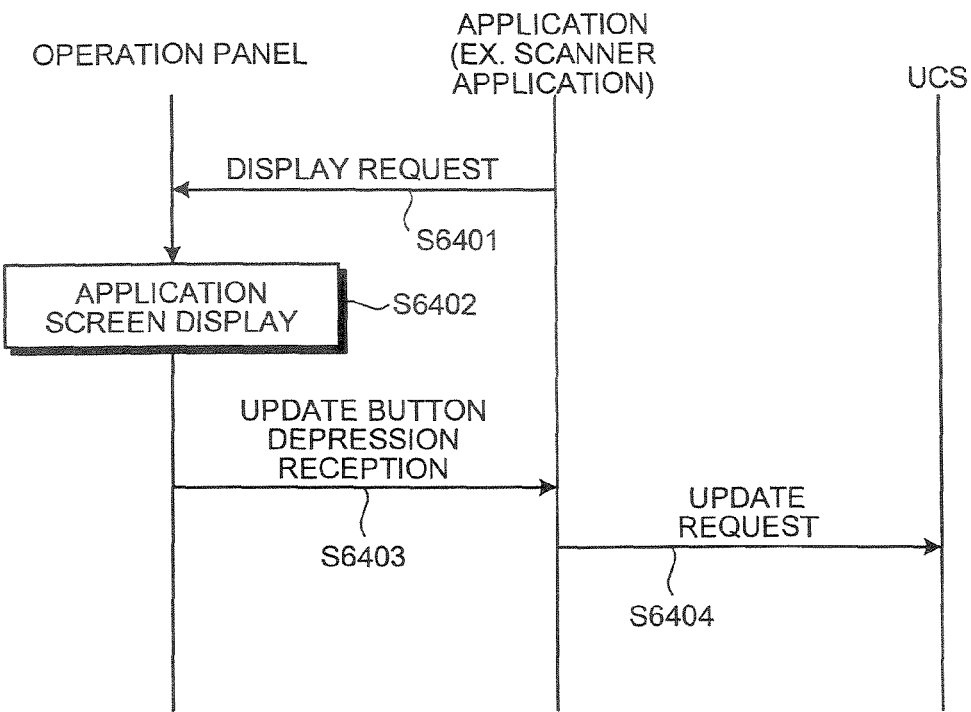
FIG. 65 is a sequence chart of a procedure of processing until update timing is detected by press of an update key by the user after the application displays an application screen in the MFP.

FIG. 65 is a sequence chart of a procedure of processing until update timing is detected according to press of an update key by the user after an application in the MFP 5000 according to the embodiment displays an application screen.

First, the application 130 sends a request for display of the application screen to the operation panel 170 (step S6401). The operation panel 170 displays a screen of the application on the LCD touch panel 5120 (step S6402). For example, the screen shown in FIG. 54 is displayed. As shown in FIG. 54, an update button 5301 is provided in the screen of the application.

When the update button 5301 is pressed by the user, the operation panel 170 notifies the application 130 that the press of the update button 5301 is received (step S6403).

The application 130 notifies the UCS 5029 of a request for update of the information-processing-application-destination information (step S6404). The UCS 5029 detects timing when the notification of the update request is received as timing for updating the information-processing-application-destination information. The processing at steps S5203 to S5210 is performed.

According to the processing procedure, it is possible to detect timing when the request for update of the information-processing-application-destination information is received from the user as timing for updating the information-processing-application-destination information.

By performing the processing for updating the information-processing-application-destination information at the update timing, it is possible to prevent initialization and update of the information-processing-application-destination information from being performed while the user is using the application of the MFP 5000. Consequently, operability in operating the MFP 5000 is improved.

Figure 66:
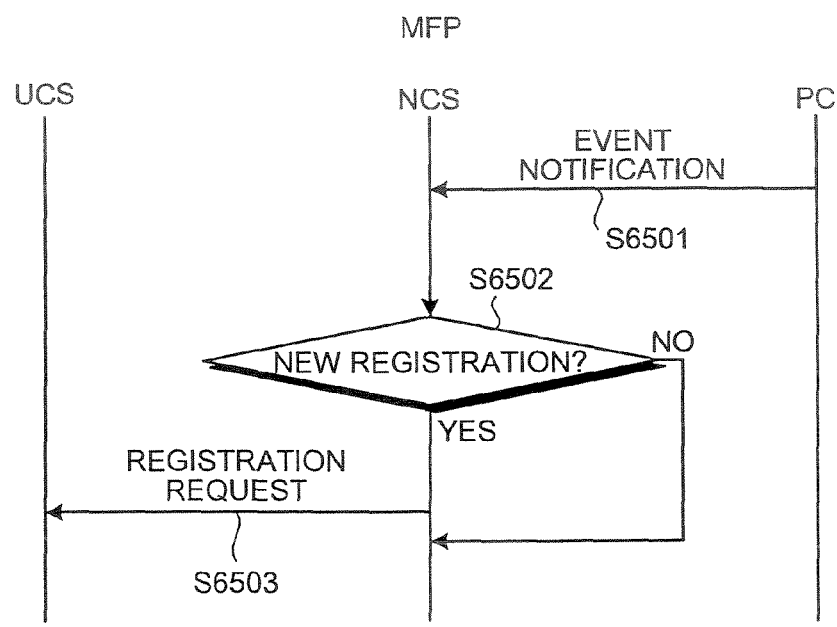
FIG. 66 is a sequence chart of a procedure of processing at the time when event notification is received from a PC in the MFP.

After the processing for updating the information-processing-application-destination information at S5210 in FIG. 53 is finished, the MFP 5000 receives various kinds of event notification concerning the information-processing-application-destination information from the PC. However, the MFP 5000 receives only a registration request. FIG. 66 is a sequence chart of a procedure of processing at the time when event notification from the PC is received in the MFP 5000.

In the embodiment, the event notification transmitted from the PC is only a registration request, a change request, and a deletion request. However, other kinds of event notification may be transmitted. The registration request is a request for registration processing necessary for an application installed in the PC to realize processing from the MFP 5000. The change request is a request for change of a setting of the application installed in the PC subjected to the registration processing. The deletion processing is a request for deletion processing necessary for the registered application installed in the PC to stop the processing from the MFP 5000.

First, the PC transmits event notification to the NCS 5028 of the MFP 5000 (step S6501). The PC installed with the image-processing-control OS transmits the event notification in every fixed period. This event notification includes deletion of registration and the like other than new registration.

When the NCS 5028 receives the event notification, the NCS 5028 determines whether the event notification received relates to new registration (step S6502). When it is determined that event notification is not new registration ("No" at step S6502), the NCS 5028 finishes the processing.

When it is determined that the event notification is new registration ("Yes" at step S6502), the NCS 5028 transmits a registration request to the UCS 5029 (step S6503). Consequently, the UCS 5029 updates a record in or adds a record to a record to the information-processing-application-destination information stored in the information-processing-application-destination DB 5040.

The registration request transmitted by the PC installed with the image-processing-control OS needs to update the information-processing-application-destination information stored in the information-processing-application-destination DB 5040 in every fixed period because the expiration date is set. Therefore, the PC transmits a new registration request or the like in every fixed period. The MFP 5000 can update the expiration date of the information-processing-application-destination information stored in the information-processing-application-destination DB 5040 by performing the processing procedure described above. When the registration request from the PC is not received by the expiration date, the NCS 5028 determines that a power supply of the PC is isolated and deletes the record from the information-processing-application-destination DB 5040.

In the processing procedure described above, since new registration is received, it is likely that a new destination is added during operation of an application. However, there is no change or deletion of the information-processing-application-destination information being operated. In other words, it is possible to prevent an inconvenience that a selected destination is not displayed while the user is selecting a destination. Therefore, the user can select a destination of the application without being affected by a state of the PC.

In performing update, the MFP 5000 sends a Hello notification to the PC such as the PC-A 160 and receives event notification. Therefore, the MFP 5000 does not need to be always on standby and receive event notification transmitted from the PC and may shift to the energy saving mode. Consequently, the MFP 5000 can reduce energy consumption.

The present invention is not limited to the fourth embodiment. Various modifications of the embodiment described below are possible.

In the MFP 5000 according to the fourth embodiment, the processing for updating the information-processing-application-destination information stored in the information-processing-application-destination DB 5040 is automatically performed when update timing is detected. However, update of the information-processing-application-destination information is not limited to the update processing automatically performed. For example, when update timing is detected, the MFP may confirm with a user whether update should be performed. Thus, in a first modification of the fourth embodiment, the MFP confirms with a user whether update should be performed. An MFP according to this modification has the same structure as the MFP 5000 according to the fourth embodiment. Thus, an explanation of the structure is omitted.

Figure 67:
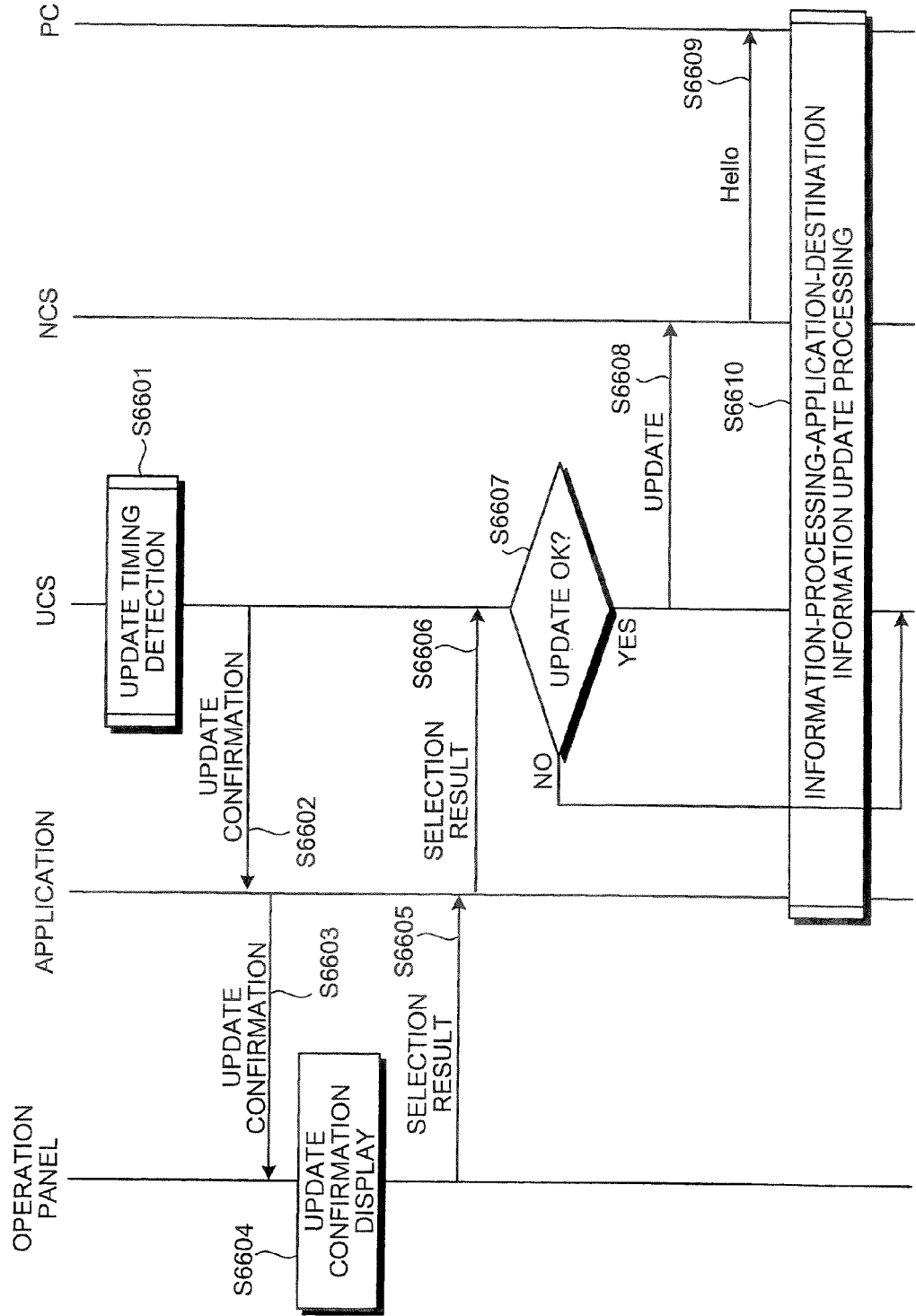
FIG. 67 is a sequence chart of a procedure of processing for updating information-processing-application-destination information by a UCS of an MFP according to a first modification of the fourth embodiment.

FIG. 67 is a sequence chart of a procedure of processing for updating information-processing-application-destination information by the UCS 5029 of the MFP 5000 according to this modification.

First, the UCS 5029 detects timing for updating the information-processing-application-destination information stored in the information-processing-application-destination DB 5040 (step S6601). A method of detecting update timing is the same as that in the fourth embodiment. Thus, an explanation of the method is omitted.

The UCS 5029 transmits a request for confirmation of the update of the information-processing-application-destination information to the application 130 (step S6602). The application 130 sends a request for display of update confirmation to the operation panel 170 (step S6603).

Figure 68:
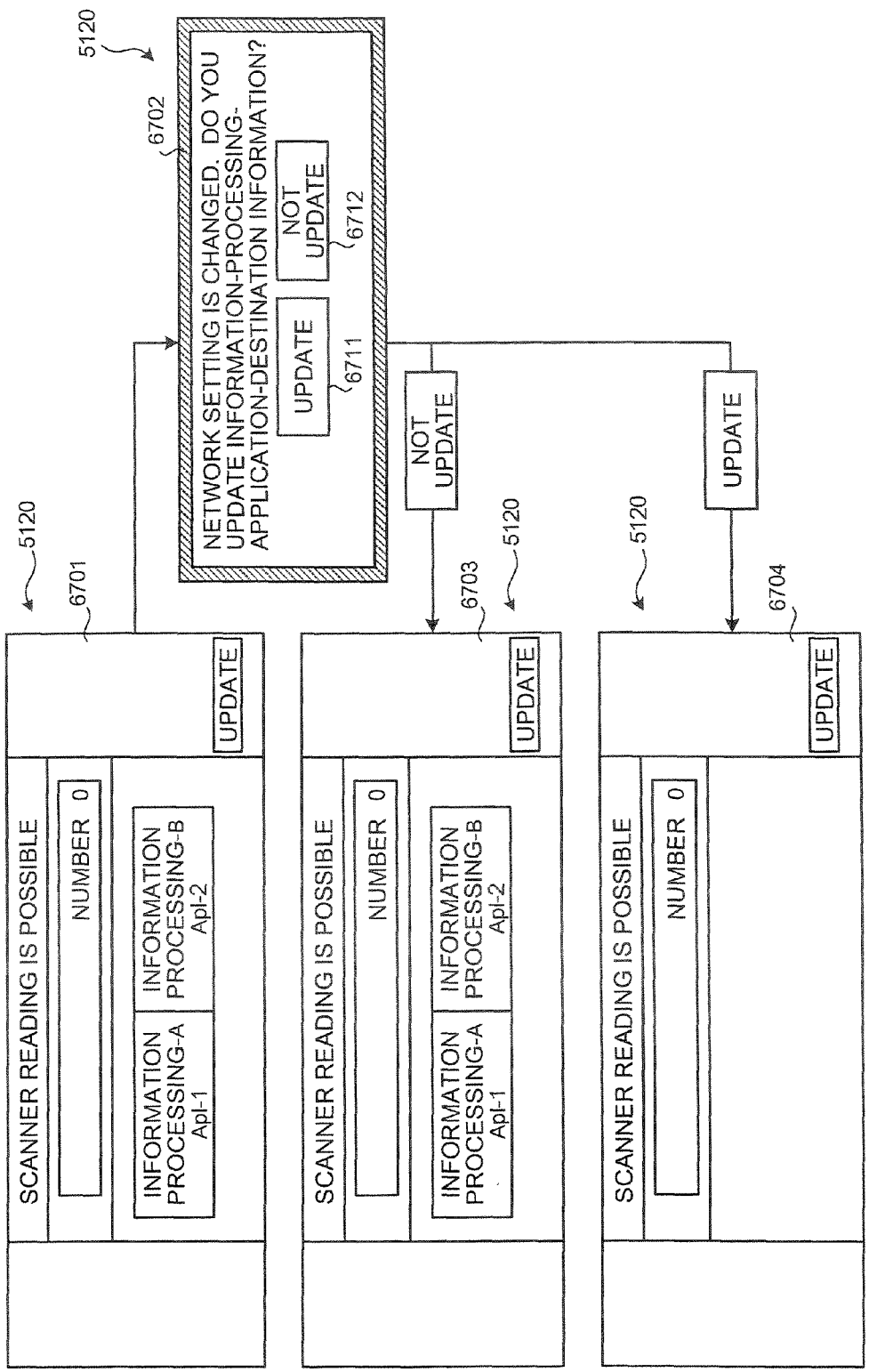
FIG. 68 is a diagram for explaining transition of screens displayed on a LCD touch panel when update confirmation is performed in the first modification of the fourth embodiment.

The operation panel 170 displays an update confirmation screen (step S6604). FIG. 68 is a diagram for explaining transition from the update confirmation screen displayed on the LCD touch panel 5120 according to the first modification of the fourth embodiment. As shown in FIG. 68, first, a screen 6701 of applications is displayed. An update confirmation screen 6702 is displayed on the LCD touch panel 5120 according to the display processing at step S6604 in FIG. 67. The user presses an "update" button 6711 or a "not update" button 6712 of the update confirmation screen 6702. In an example of an update confirmation screen 602, a setting of a network is changed. However, the update is not limited to such an example.

Referring back to FIG. 67, the operation panel 170 transmits information on the button selected by the user to the application 130 as a selection result (step S6605). Thereafter, the application 130 transfers the selection result received to the UCS 5029 (step S6606).

The UCS 5029 determines based on the selection result received whether update should be performed (step S6607). When it is determined that update is unnecessary, i.e., the "not update" button 6712 is pressed by the user ("No" at step S6607), the UCS 5029 finishes the processing without performing update processing. In this case, as shown in FIG. 68, the operation panel 170 displays the application screen 6703 same as that before the update.

When it is determined that update is necessary, i.e., the "update" button is pressed by the user ("Yes" at step S6607), the UCS 5029 outputs an indication that update is performed to the NCS 5028 (S6608).

Thereafter, the NCS 5028 sends Hello notification to the PC (step S6609). Consequently, processing for updating the information-processing-application-destination information is performed (step S6610). Since the update processing is the same as that in the fourth embodiment, an explanation of the update processing is omitted.

As shown in FIG. 68, after the update processing at step S6610 is performed, the operation panel 170 performs processing for displaying the application screen 6704 after the update. Since the information-processing-application destination information stored in the information-processing-application-destination DB 5040 is updated in this way using the network setting changed, it is possible to confirm that selectable information-processing-application-destination information is changed.

In the MFP 5000 according to the fourth embodiment, update timing and timing when the use of the information-processing-application-destination information is finished is detected as timing for applying reading and writing to the information-processing-application-destination information stored in the information-processing-application-destination DB 5040. On the other hand, in a second modification of the fourth embodiment, only update timing is detected. An MFP according to this modification has the same structure as the MFP 5000 according to the fourth embodiment. Thus, an explanation of the structure is omitted.

Figure 69:
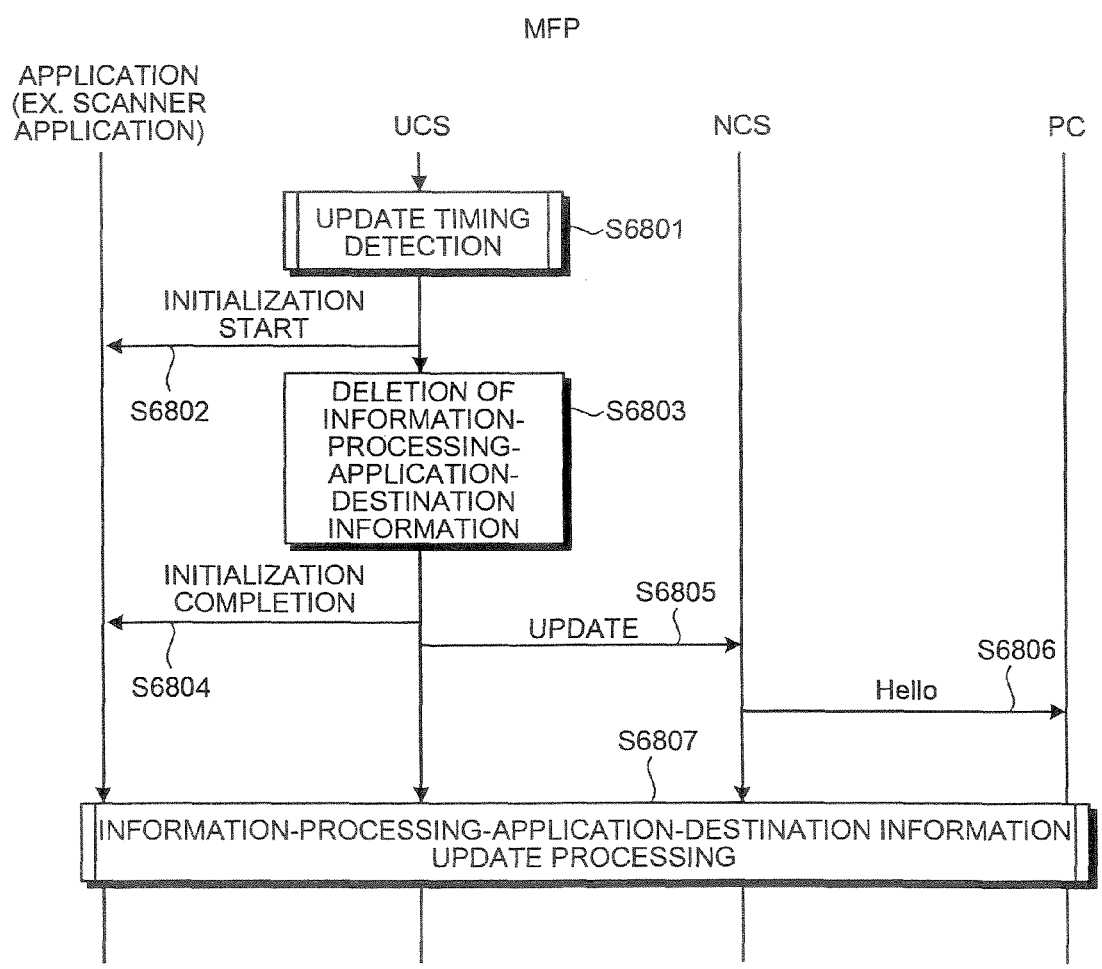
FIG. 69 is a sequence chart of a procedure of processing for updating information-processing-application-destination information by a UCS of an MFP according to a second modification of the fourth embodiment.

FIG. 69 is a sequence chart of a procedure of processing for updating information-processing-application-destination information by the UCS 5029 of the MFP 5000 according to this modification.

First, the UCS 5029 detects timing for updating the information-processing-application-destination information stored in the information-processing-application-destination DB 5040 (step S6801). Since a method of detecting update timing is the same as that in the fourth embodiment, an explanation of the method is omitted.

The UCS 5029 notifies the application 130 that initialization is started (step S6802). Consequently, the application 130 sends, for example, a request for display of a screen indicating initialization.

The UCS 5029 deletes the information-processing-application-destination information stored in the information-processing-application-destination DB 5040 (step S6803). Consequently, initialization is performed.

The UCS 5029 notifies the application 130 that the initialization is completed (step S6804). Consequently, the application 130 sends, for example, a request for display of an indication that the update of the information-processing-application-destination information is started.

The UCS 5029 outputs an indication that the update is performed to the NCS 5028 (step S6805).

Thereafter, the NCS 5028 sends Hello notification to the PC (step S6806). Consequently, processing for updating the information-processing-application-destination information is performed (step S6807). Since the update processing is the same as that in the fourth embodiment, an explanation of the update processing is omitted.

According to the processing procedure described above, initialization of the information-processing-application-destination DB 5040 is performed before the information-processing-application-destination information is updated. Thus, it is unnecessary to detect, as in the fourth embodiment, timing when the use of the information-processing-application-destination information is finished, As described above, the image processing system according to the fourth embodiment includes the information-processing-application-destination DB 5040 in which application IDs, application display names, and apparatus IDs of applications on the PC-A 160, the PC-B 161, and the PC-C 162 are associated with one another. Thus, it is possible to easily transmit a scan image to the PC-A 160, the PC-B 161, and the PC-C 162 that send requests for registration of the applications on the PCs. It is possible to realize the scan processing function of the MFP 5000 without installing the driver software for the MFP 5000 on the PC-A 160, the PC-B 161, and the PC-C 162 side.

The image processing system according to the fourth embodiment receives registration requests including application IDs and application display names from the PC-A 160, the PC-B 161, and the PC-C 162 and registers the application IDs, the application display names, and apparatus IDs in the information-processing-application-destination DB 5040 in association with one another from the registration request received. Thus, it is possible to easily transmit scan data to the PC-A 160, the PC-B 161, and the PC-C 162 that send requests for registration of applications. It is possible to realize the scan processing function of the MFP 5000 without installing the driver software for the MFP 5000 on the PC-A 160, the PC-B 161, and the PC-C 162 side.

The MFP 5000 performs processing for updating the information-processing-application-destination DB 5040 updated. Thus, since update is prevented from being started while the user is using the application 130, operability is improved.

In the MFP 5000 according to the fourth embodiment, after update timing is detected, Hello notification is sent to the PC to acquire a registration request. On the other hand, in an MFP according to a fifth embodiment of the present invention, a registration request transmitted from a PC is stored in advance and, when update timing is detected, processing for updating the information-processing-application-destination DB 5040 is performed using the registration request stored in advance.

Figure 70:
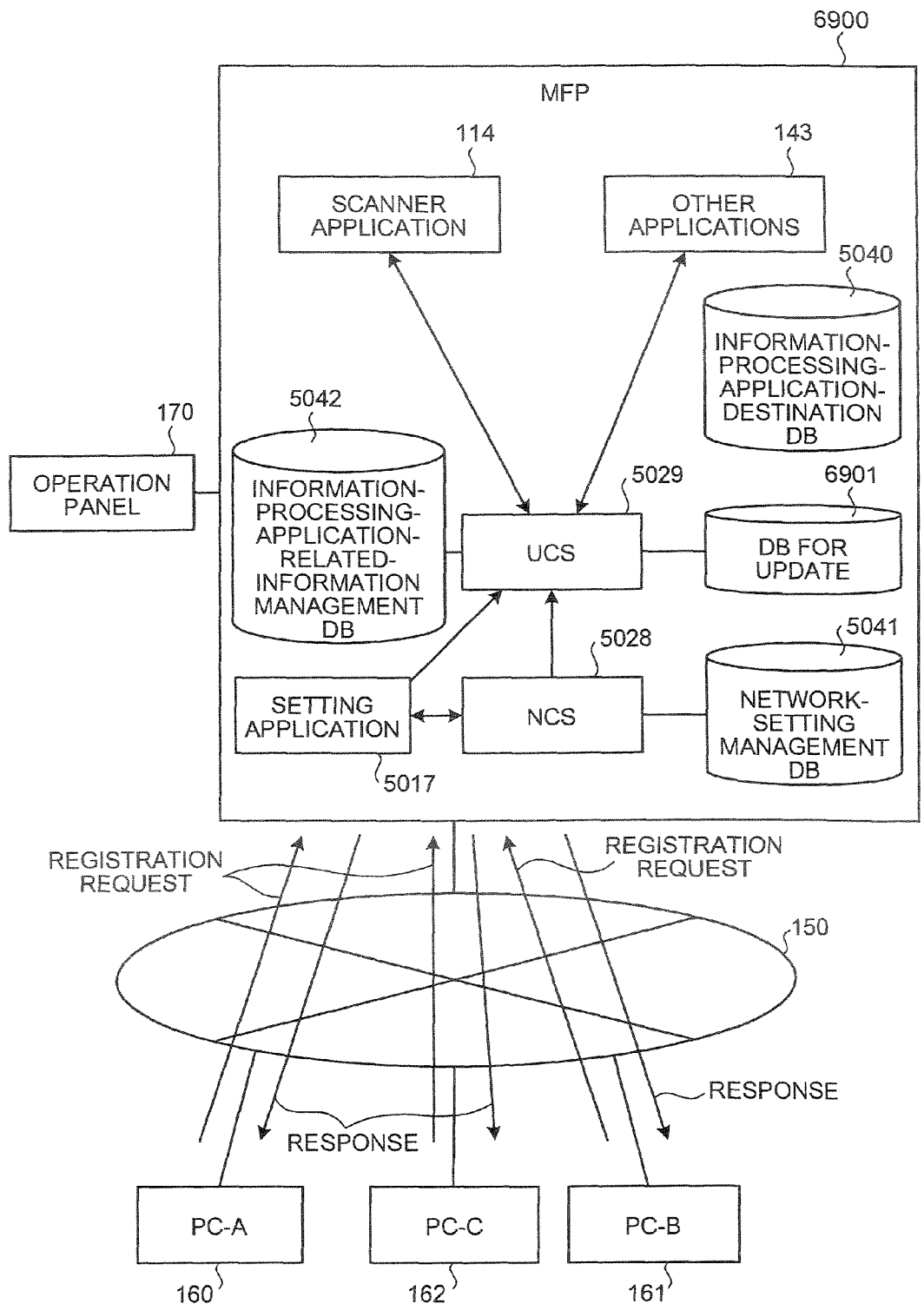
FIG. 70 is a block diagram of a structure of an MFP according to a fifth embodiment of the present invention.

FIG. 70 is a block diagram of a structure of an MFP 6900 according to the fifth embodiment. The MFP 6900 is different from the MFP 5000 according to the fourth embodiment in that an update DB 6901 is added and the UCS 5029 is changed to a UCS 6902 that performs different processing. In the following explanation, components identical with those in the fourth embodiment are denoted by the identical reference numerals and signs and explanations of the components are omitted.

The UCS 6902 performs, as managing means, processing for storing a registration request and a deletion request transmitted from a PC in the update DB 6901. The UCS 6902 performs, as deleting means, initialization, i.e., deletion of the information-processing-application-destination information stored in the information-processing-application-destination DB 5040 when use of the information-processing-application-destination information is finished.

The UCS 6902 performs, as updating means, processing for updating the information-processing-application-destination DB 5040 using the data stored in the update DB 6901 when update timing is detected. Since other kinds of processing are the same as those in the UCS 5029 according to the fourth embodiment, explanations of the processing are omitted.

Figure 71:
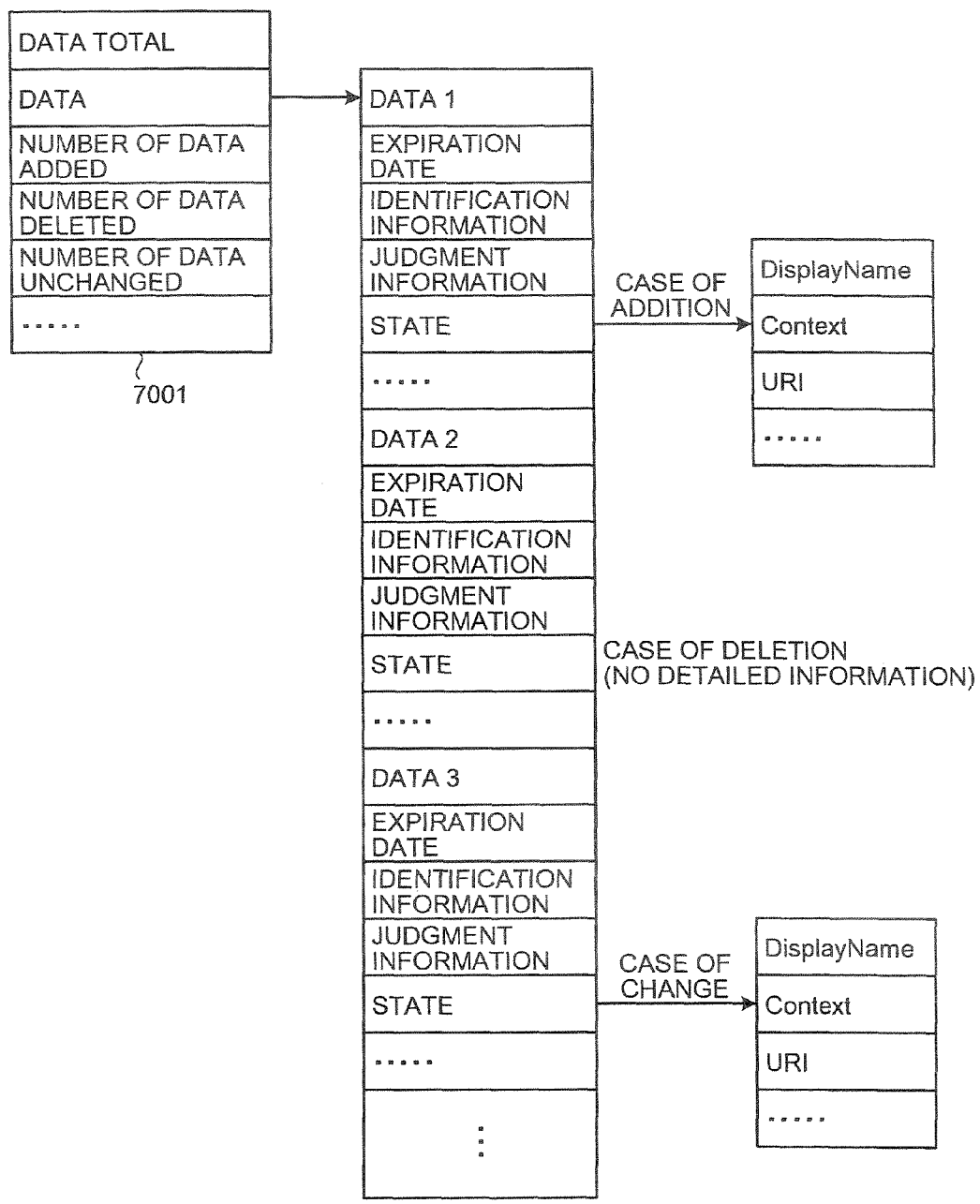
FIG. 71 is a diagram of an example of a table structure of a update DB.

The update DB 6901 temporarily stores a registration request and a deletion request transmitted from the PC. FIG. 71 is a diagram of an example of a table structure of the update DB 6901. As indicated by reference numeral 7001 in FIG. 71, statistics of all data stored are held. The update DB 6901 stores an expiration date, identification information, determination information, a state, detailed information, and the like for each of data such as the registration request stored. The identification information is an ID for identifying an application installed in the PC. The determination information is determination information obtained on the PC side. A determination result indicating whether the registration request has changed from a registration request transmitted last time. As the state, addition, deletion, or no change is stored. The detailed information is information stored as required. When the state is addition or change, Client Display Name (a name displayed on the LCD touch panel 5120) Client Context, Client URI, and the like are stored.

Figure 72:
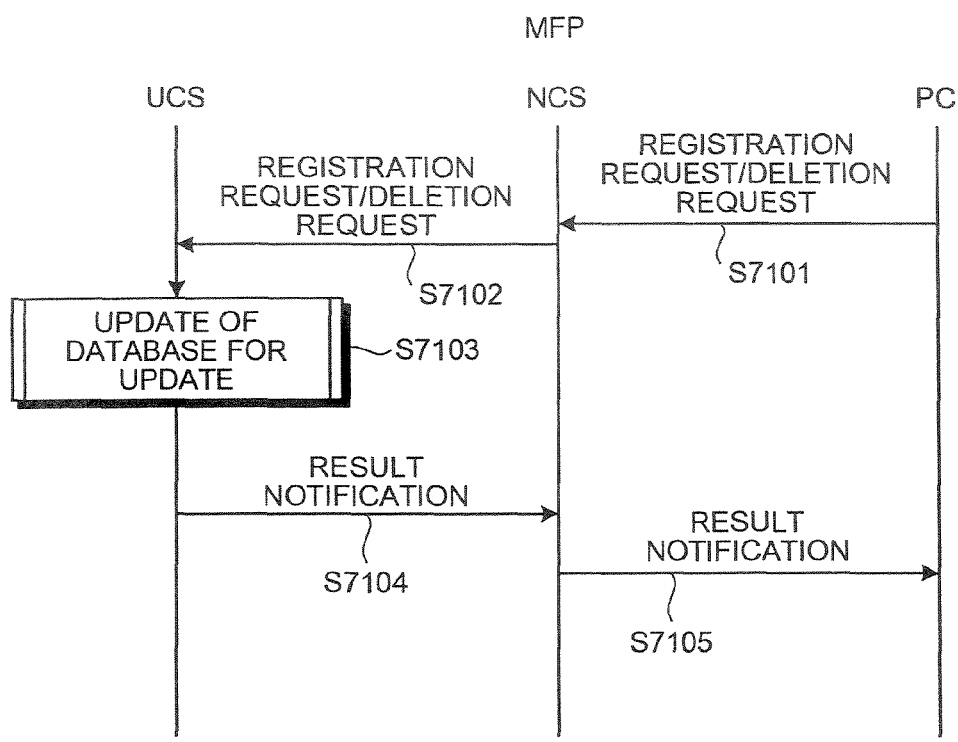
FIG. 72 is a sequence chart of a procedure of processing in the MFP and the PC according to the fifth embodiment at the time when a registration request and a deletion request transmitted from the PC are received.

FIG. 72 is a sequence chart of a procedure of the processing described above in the MFP 6900 and the PC according to the embodiment.

First, the PC installed with the image-processing-control OS periodically transmits a registration request, a deletion request, or the like for an installed application to the MFP 6900 (step S7101).

The NCS 5028 transfers the registration request, the deletion request, or the like received to the UCS 6902 (step S7102).

The UCS 6902 performs processing for updating the update DB 6901 according to the registration requests the deletion request, or the like transferred (step S7103). A detailed processing procedure is described later.

After the update processing is finished, the UCS 6902 transmits result notification to the NCS 5028 (step S7104). The NCS 5028 transfers the result notification about the update processing received to the PC (step S7105).

According to the processing procedure described above, it is possible to store event notification (a registration request or a deletion request) periodically transmitted from the PC without disturbing operation by the user.

Figure 73:
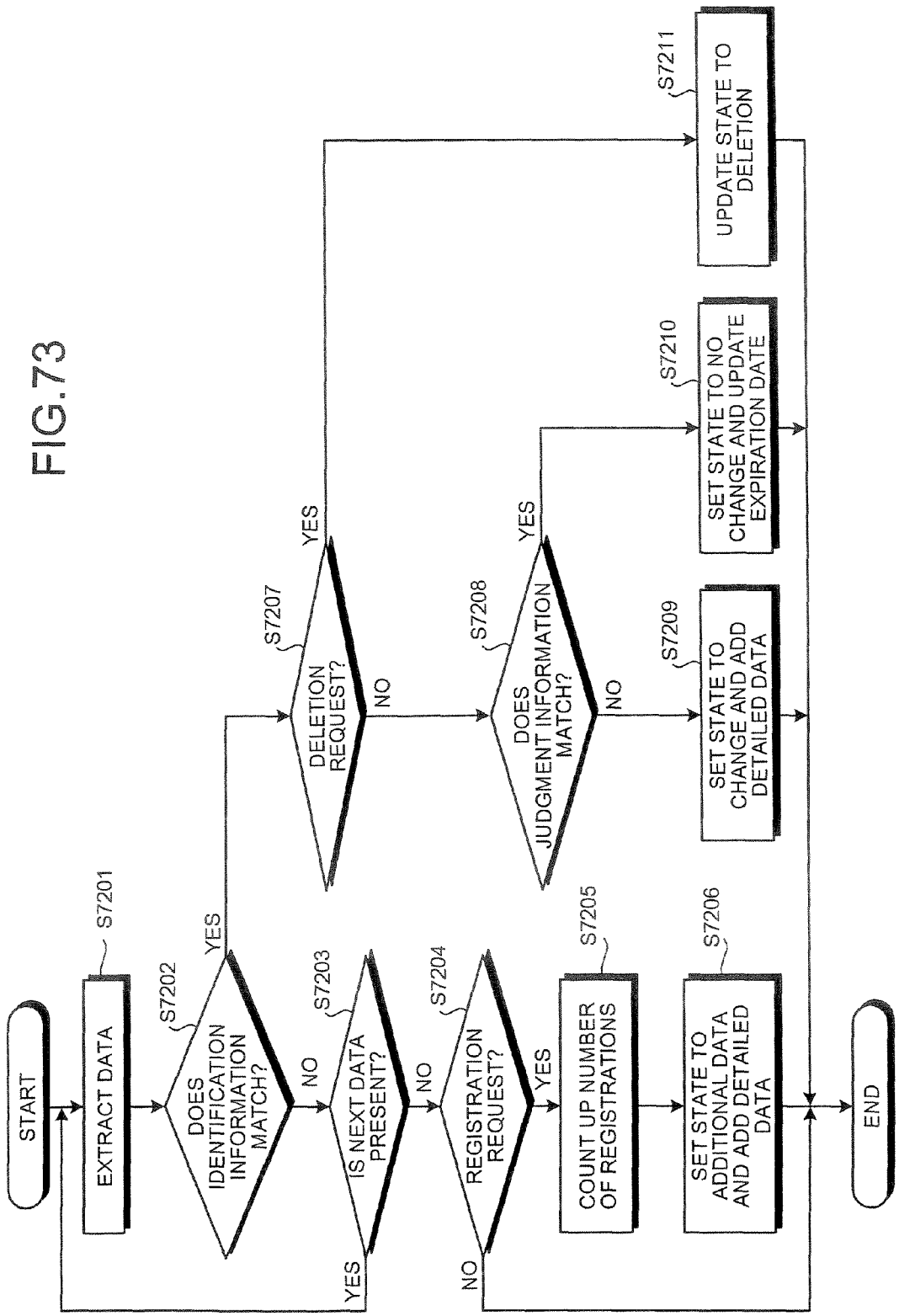
FIG. 73 is a flowchart of a procedure of processing for updating the update DB in a UCS of the MFP according to the fifth embodiment.

FIG. 73 is a flowchart of a procedure of the processing described above in the UCS 6902 of the MFP 6900 according to the embodiment.

First, when the UCS 6902 receives event notification (a registration request or a deletion request), the UCS 6902 performs processing for extracting the data stored in the update DB 6901 for each record (step S7201).

The UCS 6902 determines whether identification information stored in the record extracted and identification information included in the event notification coincide with each other (step S7202).

When it is determined that the pieces of identification information do not coincide with each other ("No" at step S7202), the UCS 6902 determines whether there is a record not extracted yet in the update DB 6901 (step S7203). When it is determined that there is a record not extracted yet ("Yes" at step S7203), the UCS 6902 starts the processing from extraction of the record (step S7201).

When it is determined that there isn't a record not extracted yet ("No" at step S7203), the UCS 6902 determines whether the event notification is a registration request (step S7204). Since information of an application of the PC held by the event notification is not stored in the update DB 6901, the UCS 6902 determines whether it is necessary to add the event notification to the update DB 6901.

When it is determined that the event notification is not a registration request ("No" at step S7204), the UCS 6902 determines that it is unnecessary to register the event notification in the update DB 6901 and finishes the processing.

When it is determined that the event notification is a registration request ("Yes" at step S7204), the UCS 6902 performs count-up of the number of registrations in the update DB 6901 (step S7205). The UCS 6902 performs processing for further adding a state "addition" and data stored in details to data included in the registration request in association with each other (step S7206).

When it is determined that the identification information of the record extracted from the update DB 6901 and the identification information included in the event notification coincide with each other ("Yes" at step S7202), the UCS 6902 determines whether the event notification is a deletion request (step S7207).

When it is determined that the event notification is a deletion request ("Yes" at step S7207), the UCS 6902 performs processing for changing a state of the record stored in the update DB 6901 to "deletion" (step S7211).

When it is determined that the event notification is not a deletion request ("No" at step S7207), the UCS 6902 determines whether determination information included in the event information and determination information of the record extracted from the update DB 6901 coincide with each other (step S7208). When it is determined that the pieces of determination information do not coincide with each other ("No" at step S7208), the UCS 6902 changes the state of the record to "change" and changes an expiration date of the record in the update DB 6901 and adds detailed data in the update DB 6901 (step S7209).

When it is determined that the pieces of determination information coincide with each other ("Yes" at step S7208), the UCS 6902 changes the state of the record to "no change" and updates the expiration date (step S7210).

According to the processing procedure described above, information stored in the update DB 6901 is updated or added according to event notification transmitted from the PC.

Figure 74:
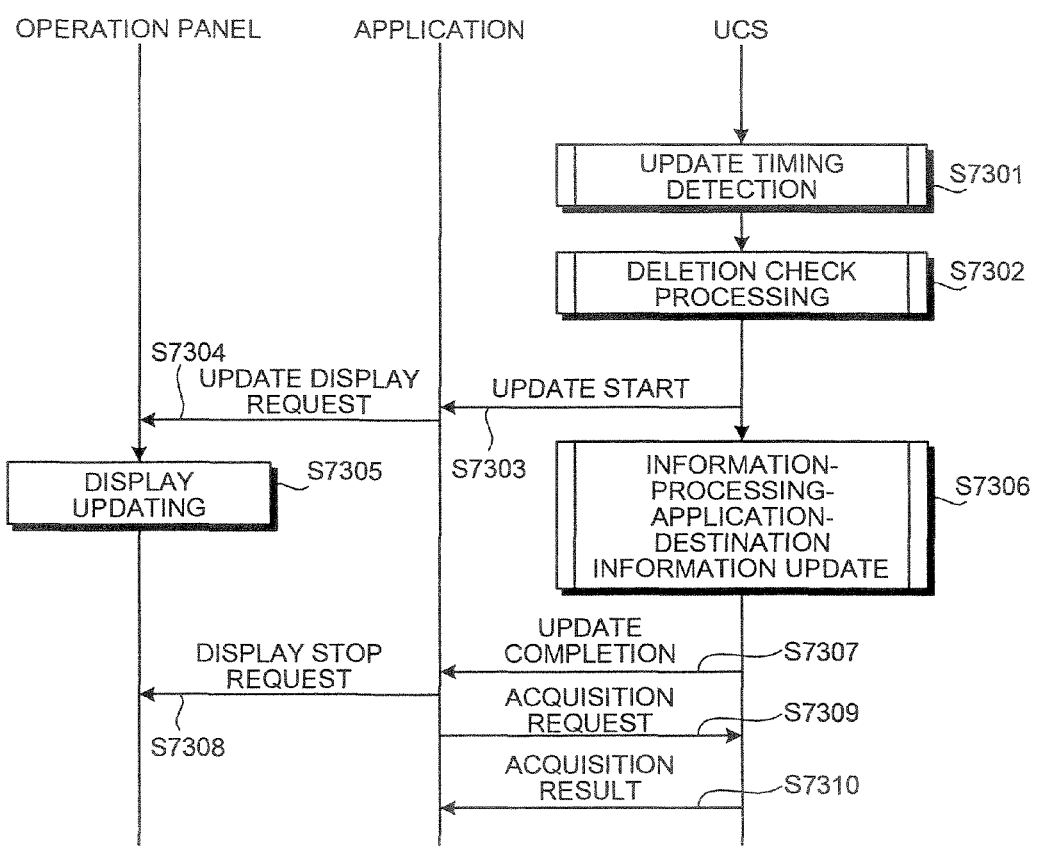
FIG. 74 is a sequence chart of a procedure of processing for updating information-processing-application-destination information in the MFP according to the fifth embodiment.

FIG. 74 is a sequence chart of a procedure of the procedure described above in the MFP 6900 according to the embodiment.

The UCS 6902 detects timing for updating the information-processing-application-destination information stored in the information-processing-application-destination DB 5040 (step S7301). Since the update timing is the same as that in the fourth embodiment, an explanation of the update timing is omitted.

The UCS 6902 performing processing for checking deletion of the data stored in the update DB 6901 (step S7302). A detailed processing procedure is described later.

The UCS 6902 notifies the application 130 that update is started (step S7303). The application 130 transmits a request for display of an update screen to the operation panel 170 (step S7304). Consequently, the operation panel 170 displays an indication that the update is being performed (step S7305).

The UCS 6902 performs processing for updating the information-processing-application-destination information stored in the information-processing-application-destination DB 5040 using the information stored in the update DB 6901 (step S7306). A detailed processing procedure is described later.

Thereafter, the UCS 6902 notifies the application 130 that the update is completed (step S7307).

After receiving the notification, the application 130 transmits a request for stopping the indication of update to the operation panel 170 (step S7308). Consequently, the indication of update on the operation panel 170 is finished.

The application 130 requests the UCS 6902 to acquire information-processing-application-destination information after the update from the information-processing-application-destination DB 5040 updated (step S7309). The UCS 6902 transmits the information-processing-application-destination information acquired from the information-processing-application-destination DB 5040 to the application 130 (step S7310).

According to the processing procedure described above, it is possible to update the information-processing-application-destination DB 5040 with the information stored in the update DB 6901 at timing when operation by the user is not disturbed.

Figure 75:
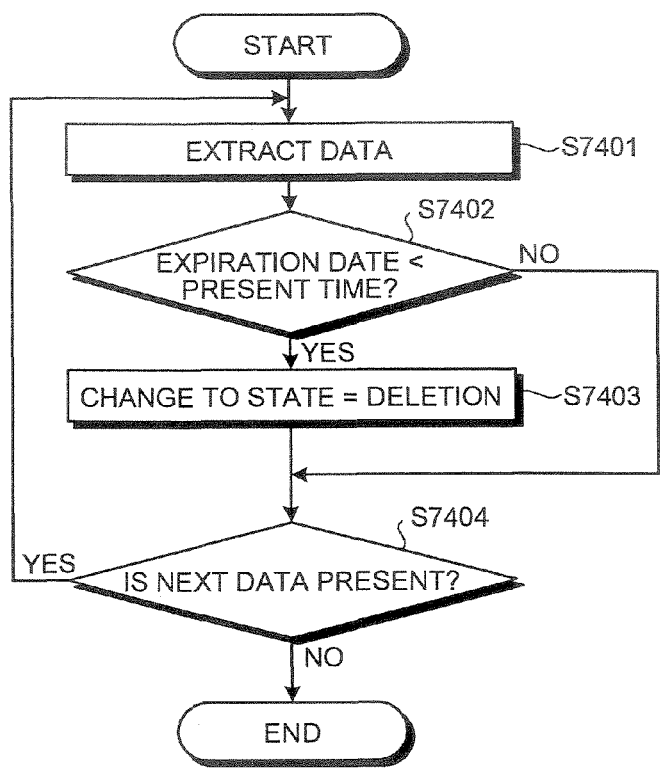
FIG. 75 is a flowchart of a procedure of processing for checking deletion of data stored in the update DB in the MFP according to the fifth embodiment.

FIG. 75 is a flowchart of a procedure of the processing described above in the MFP 6900 according to the embodiment.

First, the UCS 6902 performs processing for extracting the records stored in the update DB 6901 one by one (step S7401).

The UCS 6902 determines whether an expiration data included in the record extracted indicates time before the present time (step S7402).

When it is determined that the expiration date is later than the present time ("No" at step S7402), the UCS 6902 does not perform processing for the record extracted in particular. When it is determined that the expiration date is earlier than the present time ("Yes" at step S7402) the UCS 6902 changes a state of the record stored in the update DB 6901 to "deletion" (step S7403).

The UCS 6902 determines whether there is a record not extracted yet in the update DB 6901 (step S7404). When it is determined that there is a record not extracted yet ("Yes" at step S7404), the UCS 6902 starts the processing from extraction of the data (step S7401).

When it is determined that all the records stored in the update DB 6901 are extracted ("No" at step S7404), the UCS 6902 finishes the processing.

Figure 76:
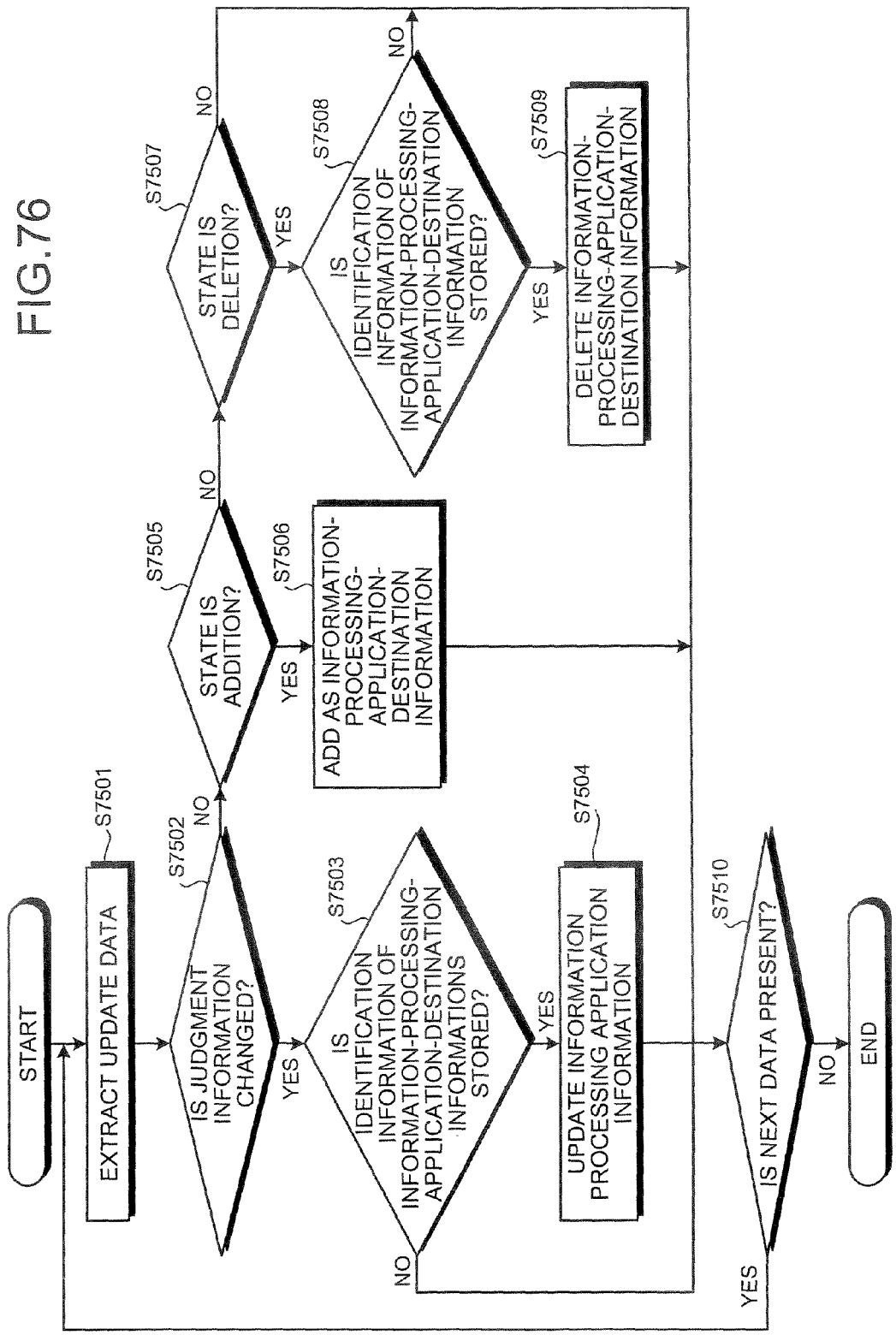
FIG. 76 is a flowchart of a procedure of processing for updating information-processing-application-destination information stored in an information-processing-application-destination DB in the MFP according to the fifth embodiment.

FIG. 76 is a flowchart of a procedure of the processing described above in the MFP 6900 according to the embodiment.

First, the UCS 6902 performs processing for extracting update data stored in the update DB 6901 (step S7501). The update data is a registration request or the like stored in a record of the update DB 6901.

The UCS 6902 determines whether determination information included in the update data extracted is "changed" (step S7502). When it is determined that the determination information is "changed" ("Yes" at step S7502), the UCS 6902 determines whether information-processing-application-destination information including identification information identical with that of the update data is stored in the information-processing-application-destination DB 5040 (step S7503). When it is determined that the information-processing-application-destination information is stored ("Yes" at step S7503), the UCS 6902 performs processing for updating the information-processing-application-destination information stored in the information-processing-application-destination DB 5040 using the update data (step S7504).

When it is determined that the determination information is "not changed" ("No" at step S7502), the UCS 6902 determines whether a state of the update data extracted is "addition" (step S7505). When it is determined that the state is "addition" ("Yes" at step S7505), the UCS 6902 adds the update data to the information-processing-application-destination DB 5040 as information-processing-application-destination information (step S7506).

When it is determine that the state of the update data is not "addition" ("No" at step S7505), the UCS 6902 further determines whether the state of the update data is "deletion" (step S7507). When it is determined that the state of the update data is not "deletion" ("No" at step S7507), the UCS 6902 does not perform the processing for changing the information-processing-application-destination DB 5040 using the update data.

When it is determined that the state of the update data is "deletion" ("Yes" at step S7507), the UCS 6902 determines whether information-processing-application-destination information including identification information identical with that of the update data is stored in the information-processing-application-destination DB 5040 (step S7508). When it is determined that the information-processing-application-destination information is stored ("Yes" at step S7508), the UCS 6902 performs processing for deleting the information-processing-application-destination information from the information-processing-application-destination DB 5040 (step S7509).

The UCS 6902 determines whether update data not extracted yet is stored in the update DB 6901 (step S7510). When it is determined that there is update data not extracted yet ("Yes" at step S7510), the UCS 6902 resumes the processing from extraction of the update data (step at S7501). When it is determined that the processing is applied to all the update data ("No" at step S7510), the UCS 6902 finishes the processing.

According to the MFP 6900 according to the fifth embodiment, data necessary for update is already stored in the update DB. Thus, it is possible to quickly perform update processing after update timing is detected without sending an inquiry or the like to the PC-A 160, the PC-B 161, and the PC-C 162 connected to the MFP 6900.

According to the MFP 6900, event notification such as a registration request is stored in the update DB on a RAM Thus, an HDD or the like does not have to be started and it is possible to perform processing for storing event notification in the energy saving mode from the PC-A 160, the PC-B 161, and the PC-C 162. As a result, it is possible to save energy consumption.

In the fourth embodiment, registration requests of the PCs connected to the MFP 5000 concentrate at one time. Thus, network loads and processing loads for performing registration processing are large. On the other hand, in the MFP 6900 according to the embodiment, event notification transmitted from the PCs is temporarily stored in the memory. Thus, it is possible to reduce network loads and loads of registration processing.

In the example explained above, in the MFP 6900 according to the fifth embodiment, after update timing is detected, the processing for updating the information-processing-application-destination DB 5040 is performed using a registration request stored in advance. On the other hand, in an MFP according to a sixth embodiment of the present invention, a plurality of information-processing-application-destination DBs are held and switched according to switching timing.

Figure 77:
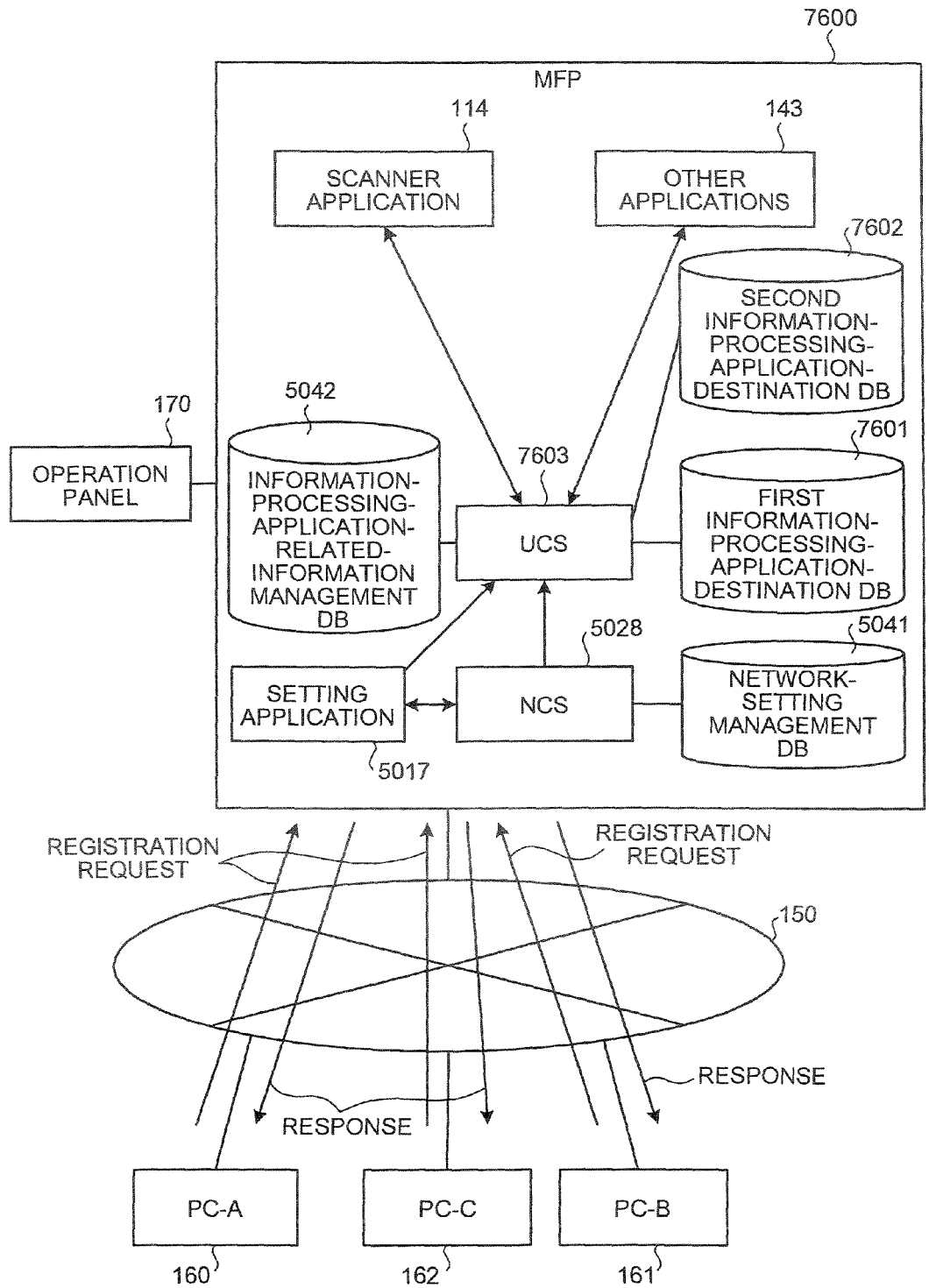
FIG. 77 is a block diagram of a structure of an MFP according to a sixth embodiment.

FIG. 77 is a block diagram of a structure of an MFP 7600 according to the sixth embodiment. The MFP 7600 is different from the MFP 6900 according to the fifth embodiment in that the MFP 7600 includes a plurality of information-processing-application-destination DBs, i.e., a first information-processing-application-destination DB 7601 and a second information-processing-application-destination DB 7602 and the UCS 6902 is changed to a UCS 7603 that performs different processing. In the following explanation, components identical with those in the fifth embodiment are denoted by the identical reference numerals and signs and explanations of the components are omitted.

The first information-processing-application-destination DB 7601 and the second information-processing-application-destination DB 7602 have a table structure same as that of the information-processing-application-destination DB 5040 according to the fifth embodiment. When one information-processing-application-destination DB is used by an application, the other information-processing-application-destination DB is subjected to update processing by the UCS 7603 and keeps a latest state.

The UCS 7603 performs processing for storing event notification (e.g., a registration request or a deletion request) transmitted from the PC in one of the first information-processing-application-destination DB 7601 and the second information-processing-application-destination DB 7602 not in use. When switching timing is detected, the UCS 6902 performs processing for switching an information-processing-application-destination DB to be used. Since other kinds of processing are the same as those by the UCS 5029 according to the fourth embodiment, explanations of the processing are omitted.

Figure 78:
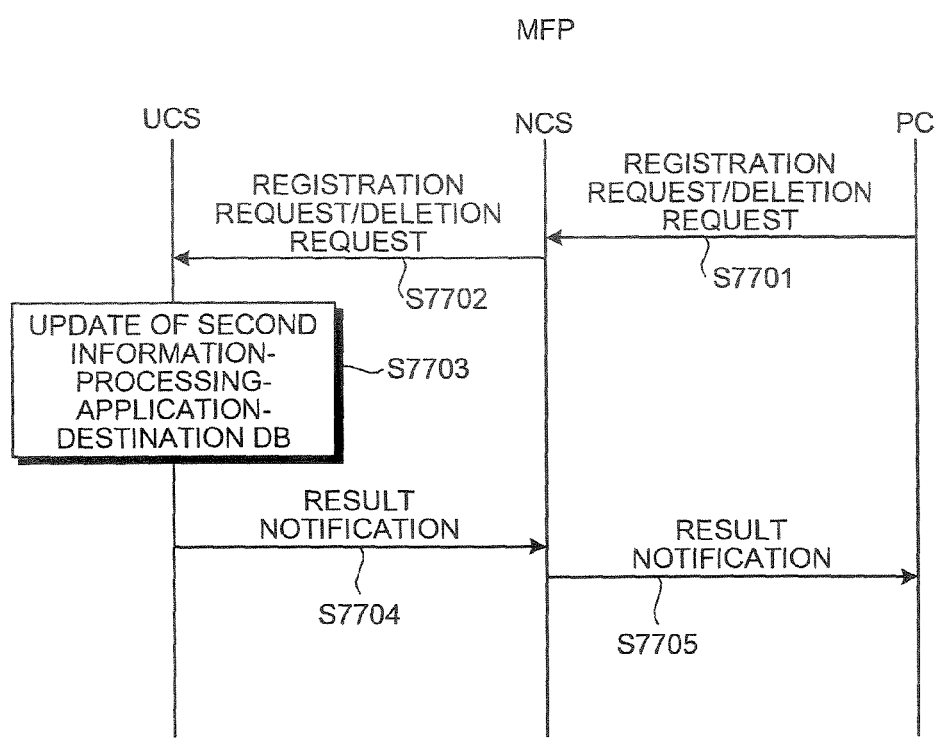
FIG. 78 is a sequence chart of a procedure of processing at the time when a registration request and a deletion request transmitted from a PC are received in the MFP and the PC according to the sixth embodiment.

FIG. 78 is a sequence chart of a procedure of the processing described above in the MFP 6900 and the PC according to the embodiment.

In the processing procedure shown in FIG. 78, the first information-processing-application-destination DB 7601 is used by the application 130. The UCS 7603 applies update processing to the second information-processing-application-destination DB 7602.

The PC installed with the image-processing-control OS periodically transmits a registration request, a deletion request, or the like of an installed application to the MFP 7600 (step S7701).

The NCS 5028 transfers the registration request, the deletion request, or the like received to the UCS 7603 (step S7702).

The UCS 7603 performs processing for updating the second information-processing-application-destination DB 7602 according to the registration request or the deletion request transferred (step S7703).

After the update processing is finished, the UCS 7603 transmits result notification to the NCS 5028 (step S7704). The NCS 5028 transfers the result notification about the update processing received to the PC (step S7705).

According to the processing procedure described above, it is possible to store event notification (a registration request or a deletion request) periodically transmitted from the PC without disturbing operation by the user.

Figure 79:
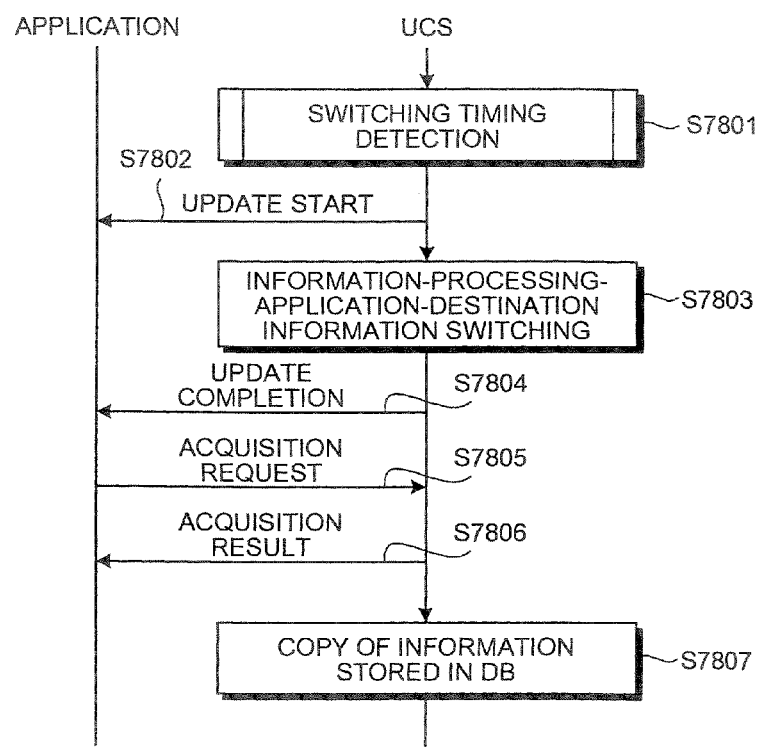
FIG. 79 is a sequence chart of a procedure of processing for switching the information-processing-application-destination DB to be an object of use in the MFP according to the sixth embodiment.

FIG. 79 is a sequence chart of a procedure of the processing described above in the MFP 7600 according to the embodiment.

In the processing procedure, it is assumed that the first information-processing-application-destination DB 7601 is already used by the application 130 and the second information-processing-application-destination DB 7602 maintains a latest state because event notification is stored therein by the UCS 7603.

First, the UCS 7603 detects timing for switching an information-processing-application-destination DB (step S7801). Since the switching timing is the same as the update timing in the fourth and the fifth embodiments, an explanation of the switching timing is omitted.

The UCS 7603 notifies the application 130 that update is started (step S7802). Consequently, the application 130 transmits a request for display of an update screen to the operation panel 170. Since this step is the same as that in the embodiments described above, an explanation of the step is omitted.

The UCS 7603 performs processing for switching an information-processing-application-destination DB to be used by the application 130 from the first information-processing-application-destination DB 7601 to the second information-processing-application-destination DB 7602 (step S7803).

Thereafter, the UCS 7603 notifies the application 130 that the update is completed (step S7804). Consequently, the application 130 transmits a request for stopping an indication of update to the operation panel 170.

The application 130 requests the UCS 7603 to acquire information-processing-application-destination information from the second information-processing-application-destination DB 7602 (step S7805). The UCS 7603 transmits the information-processing-application-destination information acquired from the second information-processing-application-destination DB 7602 to the application 130 (step S7806).

Thereafter, the UCS 7603 performs processing for updating the first information-processing-application-destination DB 7601 using application information stored in the second information-processing-application-destination DB 7602 (step S7807). Consequently, the first information-processing-application-destination DB 7601 is kept in a latest state.

When the UCS 7603 receives even notification after that, the UCS 7603 updates the information-processing-application-destination DB 7601 not used by the application 130. When switching timing is detected, the information-processing-application-destination DB is switched again.

According to the MFP 7600 according to the sixth embodiment, simply by performing the processing for switching the first information-processing-application-destination DB 7601 and the second information-processing-application-destination DB 7602 at switching timing, the application 130 can use latest application information. Thus, it is possible to perform quicker update processing.

The MFP 7600 does not perform processing such as update processing and copy processing when the information-processing-application-destination DB is switched. Thus, it is possible to reduce processing loads at the time of switching.

Figure 80:
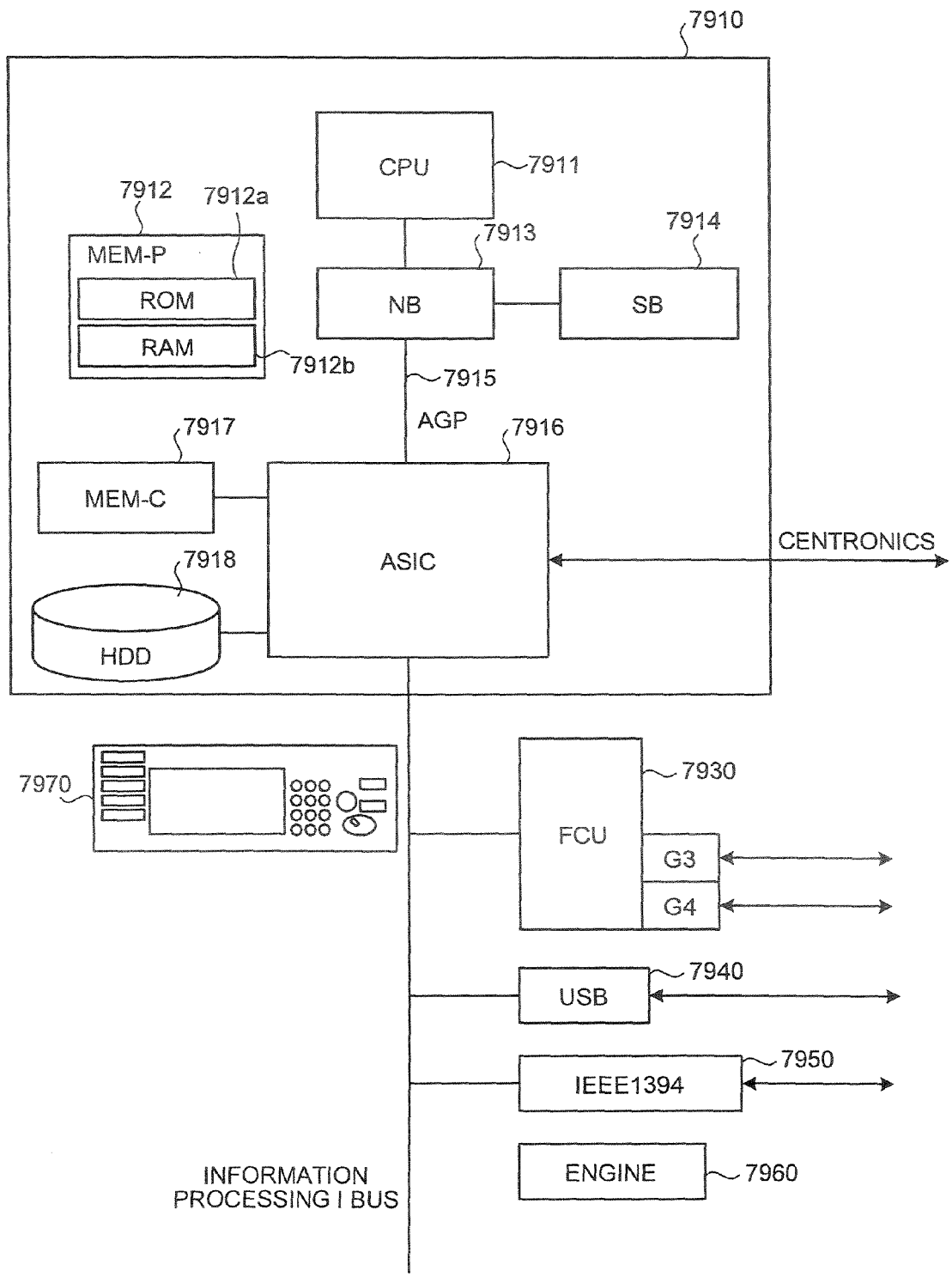
FIG. 80 is a block diagram of a hardware configuration of the MFP according to the present invention.

FIG. 80 is a block diagram of a hardware configuration of the MFPs 100, 1700, 5000, 6900, and 7600 according to the embodiments described above. As shown in FIG. 80, in the MFPs 100, 1700, 5000, 6900, and 7600, a controller 7910, an engine unit (engine) 7960, a FAX control unit (FCU) 7930, a universal serial bus (USB) 7940, and an Institute of Electrical and Electronics Engineers (IEEE) 1394 interface 7950 are connected by a peripheral component interconnect (PCI) bus. The controller 7910 is a controller that controls control of the entire MFP, rendering, communication, and input from an operation unit 7970. The engine unit 7960 is a printer engine or the like connectable to the PCI bus. For example, the engine unit 7960 is a white-and-block plotter, a one-drum color plotter, a four-drum color plotter, a scanner, or a FAX unit. The engine unit 7960 includes an image processing section such as error diffusion and gamma conversion in addition to a so-called engine section such as a plotter.

The controller 7910 includes a CPU 7911, a north bridge (NB) 7913, a system memory (MEM-P) 7912, a south bridge (SB) 7914, a local memory (MEM-C) 7917, an application specific integrated circuit (ASIC) 7916, and a hard disk (HD) 7918. The NB 7913 and the ASIC 7916 are connected by an accelerated graphics port (AGP) bus 7915. The MEM-P 7912 includes a read only memory (ROM) 7912a and a random access memory (RAM) 7912b.

The CPU 7911 performs overall control of the MFP. The CPU 7911 includes a chip set including the NB 7913, the MEM-P 7912 and the SB 7914 and is connected to other devices.

The NB 7913 is a bridge for connecting the CPU 7911 and the MEM-P 7912, the SB 7914, and the AGP bus 7915. The NB 7913 includes a memory controller that controls reading from and writing in the MEM-P 7912, a PCI master, and an AGP target.

The MEM-P 7912 is a system memory used as a memory for storing programs and data, a memory for expanding programs and data, a memory for rendering by a printer, and the like. The MEM-P 7912 includes the ROM 7912*a* and the RAM 7912*b*. The ROM 7912*a* is a read only memory used as memory for storing programs and data. The RAM 7912*b* is a random access memory used as a memory for expanding programs and data, a memory for rendering by a printer, and the like.

The SB 7914 is a bridge for connecting the NB 7913, a PCI device, and peripheral devices. The SB 7914 is connected to the NB 7913 via a PCI bus. A network interface (I/F) unit and the like are also connected to the PCI bus.

The ASIC 7916 is an integrated circuit (IC) for use in image processing that has a hardware element for image processing. The ASIC 7916 has a role of a bridge that connect the AGP bus 7915, the PCI bus, the HD 7918, and the MEM-C 7917. The ASIC 7916 includes a PCI target and an AGP master, an arbiter (ARB) at the core of the ASIC 7916, a memory controller that controls the MEM-C 7917, a plurality of direct memory access controllers (DMACs) that perform rotation and the like of image data according to a hardware logic and the like, and a PCI unit that performs data transfer via the PCI bus to and from the engine unit 7960. The FCU 7930, the USB 7940, the IEEE1394 interface 7950 are connected to the ASIC 7916 via the PCI bus.

The MEM-C 7917 is a local memory used as an image buffer for copying and a code buffer. The HD 7918 is a storage device for storing image data, programs, font data, and forms.

The AGP bus 7915 is a bus interface for a graphics accelerator card proposed for speeding up graphic processing. The AGP bus 7915 directly accesses the MEM-P 7912 at high throughput to operate the graphics accelerator card at high speed.

An image processing program executed on the MFPs 100, 1700, 5000, 6900, and 7600 according to the embodiments is stored in a ROM and the like in advance and provided.

The image processing program executed in the MFPs 100, 1700, 5000, 6900, and 7600 according to the embodiments may be recorded in a computer-readable recording medium such as a compact disk-read only memory (CD-ROM), a flexible disk, a compact dick-recordable (CD-R), a digital versatile disk (DVD) as a file of an installable format or an executable format and provided.

The image processing program executed in the MFPs 100, 1700, 5000, 6900, and 7600 according to the embodiments may be stores on a computer connected to a network such as the Internet and provided by causing a user to download the image processing program through the network. The image processing program executed in the MFPs 100, 1700, 5000, 6900, and 7600 according to the embodiments may be provided or distributed through a network such as the Internet.

The image processing program executed in the MFPs 100, 1700, 5000, 6900, and 7600 according to the embodiments is formed as a module including the units described above (the UCS, the NCS, the scanner application, etc.). As actual hardware, when a CPU (a processor) reads the image processing program from the ROM and executes the image processing program, the units are loaded onto a main storage and the units are generated on the main storage.

In the MFPs 100, 1700, 5000, 6900, and 7600 according to the embodiments, address information and display names of the PC-A 160 and the PC-B 161 are stored in a DB different from the information-processing-application-destination DB. However, the address information and the display names may be held in information-processing-application-destination information in the information-processing-application-destination DB in association with apparatus IDs.

The present invention is not limited to the embodiments per se. It is possible to modify and embody elements of the present invention without departing from the spirit thereof at a stage when the present invention is carried out. It is possible to form various inventions according to appropriate combinations of a plurality of elements disclosed in the embodiments. For example, some elements may be deleted from all the elements disclosed in the embodiments. Moreover, elements disclosed in different embodiments may be appropriately combined.

As described above, the image processing apparatus, the image processing method, and the image processing program according to the present invention are useful in using an application installed in a PC. In particular, the image processing apparatus, the image processing method, and the image processing program according to the present invention are suitable when an image-processing-control OS is used as an OS of the PC and a driver for using an MFP is not installed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus for processing an image and communicating with an information processing apparatus which does not have an image processing apparatus driver software used for receiving a scanned image, comprising:
    at least a scanning unit that scans the image;
    a first destination storing unit that stores therein application destination information in which an application display name that is a display name of a destination of an information processing application of the information processing apparatus is included, the information processing application being a software for information processing, the information processing apparatus being connected to a network and configured to execute the information processing application, the information processing apparatus including an operating system configured to send to the image processing apparatus, in response to the information processing apparatus being powered on, a request for registration of the information processing application in the image processing apparatus, and configured to receive data generated by the image processing apparatus;
    a receiving unit that receives the request for registration of the information processing application including the application display name from the information processing apparatus;
    an operation displaying unit that displays the application display name stored in the first destination storing unit as an application screen to a user, such that the user can select the application display name; and
    a transmitting unit that transmits the scanned image to the information processing apparatus in response to the selection of the application display name, the scanned image being in a data format of the information processing application.

2. The image processing apparatus according to claim 1, further comprising:
    a destination managing unit that extracts the application display name from the request for registration of the information processing application received by the receiving unit and registers extracted application display name in the application destination information stored in the first destination storing unit.

3. The image processing apparatus according to claim 1, further comprising:
a display control unit that reads the application display name registered in the application destination information and displays the application screen on which the application display name is rendered to allow the user to input the application display name on the operation displaying unit, wherein the operation displaying unit displays thereon various screens with which the user performs an input operation.

4. The image processing apparatus according to claim 3, wherein when the request for registration of the information processing application is received by the receiving unit while the application screen is displayed on the operation displaying unit, the display control unit reads the application display name registered in the application destination information updated based on the request for registration of the information processing application, updates the application screen, and displays updated application screen on the operation displaying unit.

5. The image processing apparatus according to claim 3, wherein
the receiving unit receives the request for registration of the information processing application including application identification information unique to the information processing application, the application display name, and apparatus identification information unique to the information processing apparatus from each of a plurality of information processing apparatuses,
the destination managing unit extracts the application identification information, the application display name, and the apparatus identification information from the request for registration of the information processing application, and stores the extracted application identification information, the application display name, and the apparatus identification information in the first destination storing unit as the application destination information in a corresponding manner, and
the display control unit reads a plurality of pieces of apparatus identification information and corresponding application display names registered in the application destination information, and displays the application screen on the operation display unit for each apparatus identification information.

6. The image processing apparatus according to claim 5, wherein the display control unit reads the plurality of pieces of apparatus identification information and corresponding application display names registered in the application destination information, displays a first application screen to allow the user to instruct a selection of an information processing apparatus corresponding to the apparatus identification information on the operation display unit, and displays a second application screen on which the application display name corresponding to the apparatus identification information of the information processing apparatus for which an selection instruction is received from the first application screen is rendered to allow the user to input the application display name on the operation displaying unit.

7. The image processing apparatus according to claim 1, further comprising:
a second destination storing unit that stores therein application destination information for display generated based on the application destination information, in which application identification information unique to the information processing application, the application display name, and delivery destination information concerning the information processing apparatus that made the request for registration of the information processing application are associated with each other;
the receiving unit receiving the request for registration of the information processing application including the application display name and also including the delivery destination information from the information processing apparatus;
a network managing unit that extracts the application display name and the delivery destination information from the request for registration of the information processing application received by the receiving unit, and registers the extracted application display name and the delivery destination information in the application destination information stored in the first destination storing unit;
a destination managing unit that registers the application identification information, the application display name, and the delivery destination information in the application destination information for display stored in the second destination storing unit based on the application destination information stored in the first destination storing unit; and
a display control unit that reads the application display name registered in the application destination information for display, and displays the application screen on which the application display name is rendered to allow the user to input the application display name on the operation displaying unit, wherein the operation displaying unit displays thereon various screens with which the user performs an input operation.

8. The image processing apparatus according to claim 7, wherein
the application destination information for display includes a master table in which a record that associates the application identification information, the application display name, and the delivery destination information can be sequentially written and a header table in which positional information of the record written in the master table can be classified and registered by a header based on the application name, and
the display control unit reads the header and the application display name registered in the master table from the positional information registered in the header table of the header, and displays an application screen on which the header and the application display name are rendered to allow the user to input the header and the application display name on the operation display unit.

9. The image processing apparatus according to claim 7, wherein
the network managing unit transmits a status of an update of the application destination information to the destination managing unit, and
when a notification indicating that the application destination information is updated is received from the network managing unit, the destination managing unit updates the application destination information for display by acquiring the application display name and the delivery destination information from the application destination information stored in the first destination storing unit, registering a record that associates acquired application display name, delivery destination information with the application identification information in the master table, and registering the positional information of the application display name in the header table based on a character string of the acquired application display name.

10. The image processing apparatus according to claim 9, wherein
when a notification indicating that the application destination information is not updated is received from the network managing unit, the destination managing unit notifies the display control unit that there is no change in display, and
when notified from the destination managing unit that there is no change in display, the display control unit does not change the application screen displayed on the operation display unit.

11. The image processing apparatus according to claim 7, wherein
when an instruction for updating the application destination information for display is received from the user by the operation displaying unit, the display control unit transmits an update request to the destination managing unit, and
when the update request is received from the display control unit, the destination managing unit updates the application destination information for display.

12. The image processing apparatus according to claim 7, further comprising:
an information storing unit that stores therein information-processing-application-related information and a timer set time, the information-processing-application-related information being information on the information processing application of the information processing apparatus;
a network-setting storing unit that stores therein network setting information indicating setting contents concerning the network;
an authentication-information storing unit that stores therein authentication information of the user;
a system managing unit that performs a change of the information-processing-application-related information, a switching of an application executed in the image processing apparatus, and a control of a normal mode and an energy saving mode; and
a timer managing unit that determines whether the timer set time has elapsed, wherein
the network managing unit performs a change of the network setting information, and
when a login input is performed by the user, the destination managing unit performs an authentication of the user based on the authentication information, and when any one of change of the information-processing-application-related information, change of the network setting information, and switching of an application executed in the image processing apparatus is executed, when the authentication of the user is successful, when the image processing apparatus returns from the energy saving mode to the normal mode, or when it is determined that the timer set time has elapsed, updates the application destination information for display.

13. The image processing apparatus according to claim 7, wherein while the application destination information for display is updated, the destination managing unit does not perform an update of the application destination information for display, even when a request for updating the application destination information for display is received.

14. The image processing apparatus according to claim 13, wherein while the application display name is read from the application destination information for display by the display control unit, the destination managing unit does not perform an update of the application destination information for display, even when a request for updating the application destination information for display is received.

15. The image processing apparatus according to claim 7, further comprising a searching unit that searches for, when a search instruction for a destination of the information processing application is received from the user by the operation displaying unit together with a search condition, the application display name corresponding to the destination of the information processing application that satisfies the search condition from the application destination information for display stored in the second destination storing unit, wherein
the display control unit displays the application display name searched by the searching unit on the operation display unit.

16. The image processing apparatus according to claim 15, further comprising a search-result storing unit that stores therein a search-result table in which positional information of a record including the application display name in the master table can be registered, wherein
the searching unit registers positional information of a record including searched application display name in the search-result table, and
the display control unit reads the application display name registered in the master table based on the positional information registered in the search-result table, and displays read application display name on the operation display unit.

17. The image processing apparatus according to claim 7, wherein while the application destination information is updated, the network managing unit does not perform an update of the application destination information, even when the request for registration of the information processing application is received from the information processing apparatus.

18. The information processing apparatus according to claim 7, further comprising:
an image processing unit that processes the scanned image by the scanning unit into the data format that can be processed in the information processing application corresponding to a destination of the application display name for which a designation by the user is received from the operation display unit by the display control unit, wherein
the transmitting unit transmits the scanned image that is processed into the data format that can be processed in the information processing application by the image processing unit to the information processing apparatus of the delivery destination information corresponding to the application display name.

19. An image processing apparatus for processing an image and communicating with an information processing apparatus which does not have an image processing apparatus driver software used for receiving a scanned image, the image processing apparatus comprising:
at least a scanning unit that scans the image;
a processing unit that processes the scanned image;
a storing unit that stores therein application destination information in which application identification information unique to an application of the information processing apparatus is associated with an application display name that is a display name of the application, the information processing apparatus being connected to a network and being configured to send to the image processing apparatus, in response to the information processing apparatus being powered on, a request for registration of the application in the image processing apparatus;

a receiving unit that receives the request for registration of the application including the application identification information and the application display name from the information processing apparatus;

a timing determining unit that determines whether there is a predetermined time at which the application destination information is not used; and an updating unit that extracts, when determined by the timing determining unit that the predetermined time has occurred, the application identification information and the application display name from the request for registration of the application received by the receiving unit, and stores extracted application identification information and application display name in the storing unit as the application destination information in association with each other;

an operation displaying unit that displays the application display name stored in the storing unit as an application screen to a user, such that the user can select the application display name; and a transmitting unit that transmits the scanned image to the information processing apparatus in response to the selection of the application display name, the scanned image being in a data format of the information processing application.

20. An image processing method for an image processing apparatus that includes at least a scanning unit that scans an image and a processing unit that processes the scanned image, the image processing apparatus including a first destination storing unit that stores therein application destination information in which an application display name that is a display name of a destination of an information processing application of an information processing apparatus is included, the information processing application being a software for an information processing, the information processing apparatus being connected to a network and configured to execute the information processing application, the information processing apparatus including an operating system configured to send to the image processing apparatus, in response to the information processing apparatus being powered on, a request for registration of the information processing application in the image processing apparatus, configured to operate the image processing apparatus without installing an image processing apparatus driver software used for receiving data, and configured to receive data generated by the image processing apparatus, a second destination storing unit that stores therein application destination information for display generated based on the application destination information, in which application identification information unique to the information processing application, the application display name, and delivery destination information concerning the information processing apparatus that made the request for registration of the information processing application are associated with each other, an operation displaying unit that displays thereon various screens with which a user performs an input operation, and a display control unit that reads the application display name registered in the application destination information for display, and displays an application screen on which the application display name is rendered to allow the user to input the application display name on the operation displaying unit, the image processing method comprising:

receiving the request for registration of the information processing application including the application display name and the delivery destination information from the information processing apparatus;

extracting the application display name and the delivery destination information from the request for registration of the information processing application;

registering the extracted application display name and the delivery destination information in the application destination information stored in the first destination storing unit;

registering, based on the application destination information stored in the first destination storing unit, the application identification information, the application display name, and the delivery destination information in the application destination information for display stored in the second destination storing unit;

reading the application display name registered in the application destination information for display stored in the second destination storing unit;

displaying an application screen including the read application display name such that the user can select the application display name on the operation display unit; and transmitting the processed scanned image to the information processing apparatus in response to the selection of the application display name, the processed scanned image being in a data format of the information processing application and the information processing apparatus receiving the processed scanned image without having the image processing apparatus driver software used for receiving the processed scanned image.

* * * * *